United States Patent
Sokawa et al.

(10) Patent No.: US 6,353,460 B1
(45) Date of Patent: Mar. 5, 2002

(54) TELEVISION RECEIVER, VIDEO SIGNAL PROCESSING DEVICE, IMAGE PROCESSING DEVICE AND IMAGE PROCESSING METHOD

(75) Inventors: Kenta Sokawa, Hirakata; Kazuki Ninomiya, Kadoma; Yoichiro Miki, Kawachinagano; Naoya Tokunaga, Moriguchi; Masahiro Tani, Muko; Hiroshi Miyaguchi, Tokyo; Yuji Yaguchi, Ibaragi-ken; Tsuyoshi Akiyama, Tsuchiura, all of (JP)

(73) Assignees: Matsushita Electric Industrial Co., Ltd., Osaka (JP); Texas Instruments, Inc., Dallas, TX (US)

( * ) Notice: Subject to any disclaimer, the term of this patent is extended or adjusted under 35 U.S.C. 154(b) by 0 days.

(21) Appl. No.: 09/162,740

(22) Filed: Sep. 29, 1998

(30) Foreign Application Priority Data

| Sep. 30, 1997 | (JP) | ............................................ 9-267514 |
| Oct. 3, 1997 | (JP) | ............................................ 9-288059 |
| Dec. 25, 1997 | (JP) | ............................................ 9-358529 |

(51) Int. Cl.[7] ............................ H04N 3/27; H04N 5/46; H04N 5/268
(52) U.S. Cl. ........................ 348/555; 348/558; 348/554
(58) Field of Search .................................. 348/554, 555, 348/556, 557, 558, 706; H04N 3/27, 5/46, 5/268

(56) References Cited

U.S. PATENT DOCUMENTS

| 5,105,387 A | | 4/1992 | Childers et al. |
| 5,132,793 A | | 7/1992 | Hirahata et al. |
| 5,151,783 A | * | 9/1992 | Faroudja ..................... 348/554 |
| 5,387,939 A | | 2/1995 | Naimpally |
| 5,448,300 A | * | 9/1995 | Yamada et al. ............. 348/571 |
| 5,453,796 A | * | 9/1995 | Duffield ....................... 348/565 |
| 5,475,442 A | * | 12/1995 | Matsushita et al. ......... 348/554 |
| 5,499,375 A | | 3/1996 | Miyaguchi |
| 5,537,157 A | * | 7/1996 | Washino ...................... 348/554 |
| 5,703,658 A | * | 12/1997 | Tsuru et al. ................. 348/554 |
| 5,898,463 A | * | 4/1999 | Nishiyama ................... 348/554 |
| 5,926,228 A | * | 7/1999 | Jeon et al. ................... 348/554 |
| 5,943,097 A | * | 8/1999 | Horii ........................... 348/555 |
| 5,982,449 A | * | 11/1999 | Nagai et al. ................. 348/553 |
| 5,999,220 A | * | 12/1999 | Washino ...................... 348/555 |
| 6,023,266 A | * | 2/2000 | Eglit et al. ................... 345/202 |
| 6,137,537 A | * | 10/2000 | Tsuji et al. .................. 348/554 |
| 6,211,918 B1 | * | 4/2001 | Uwabata et al. ............ 348/554 |

FOREIGN PATENT DOCUMENTS

| EP | 0 317 218 | 5/1989 |
| EP | 0 536 901 | 4/1993 |
| EP | 0 574 901 | 6/1993 |
| EP | 0 594 241 | 4/1994 |
| EP | 0 620 681 | 10/1994 |

OTHER PUBLICATIONS

European Search Report dated Dec. 22, 1999 for EP 98 11 8460.

(List continued on next page.)

Primary Examiner—Michael Lee
Assistant Examiner—Brian P. Yenke
(74) Attorney, Agent, or Firm—Ratner & Prestia

(57) ABSTRACT

The television receiver including a display device capable of displaying a video signal having a predetermined display former of this invention includes; a plurality of video signal sources; a selection circuit for selecting one of a plurality of video signals output from the plurality of video signal sources; and an image processor for converting a format of the video signal selected by the selection circuit into the predetermined display format, wherein a video signal output from the processor is supplied to the display device.

23 Claims, 33 Drawing Sheets

OTHER PUBLICATIONS

Hiroshi Miyaguchi et al., "Digital TV with Serial Video Processor", IEEE Transactions on Consumer Electronics, vol. 36, No. 3, Aug. 1990, pp. 318–325.

Vishal Markandey et al., "Motion Adaptive Deinterlacer for DMD (Digital Micromirror Device) Based Digital Television", IEEE Transactions on Consumer Electronics, No. 3, Aug. 1994, pp. 735–741.

Kenji Nakayama et al., 'EDTV–II Decoder by SVP2, IEEE Transactions on Consumer Electronics, vol. 41, No. 3, Aug. 1995, pp. 634–641.

Petri Liuha et al., "Implemenation of PALplus Decoder with Programmable Video Signal Processor", IEEE Transactions on Circuit and Systems for Video Technology, No. 5, Oct. 1995, pp. 429–435.

* cited by examiner

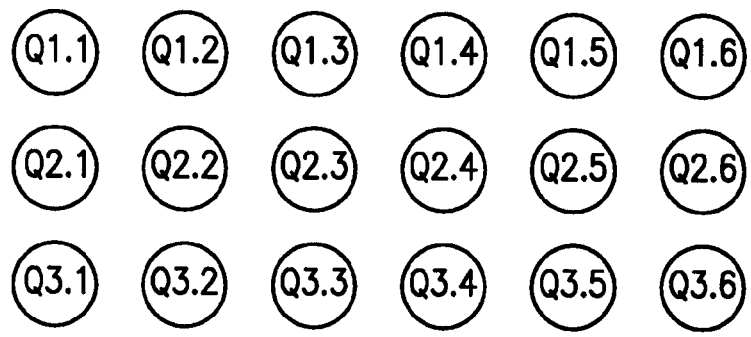
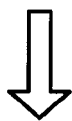
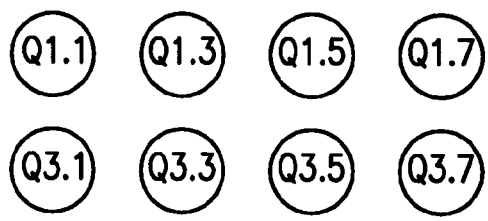
FIG. 18
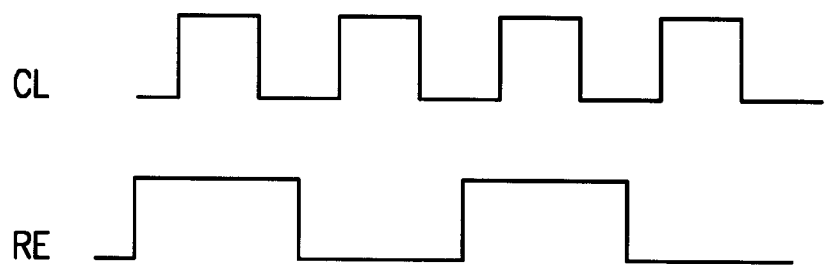
FIG. 19

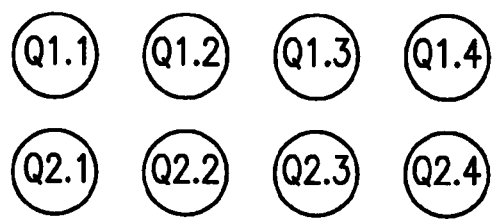
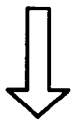
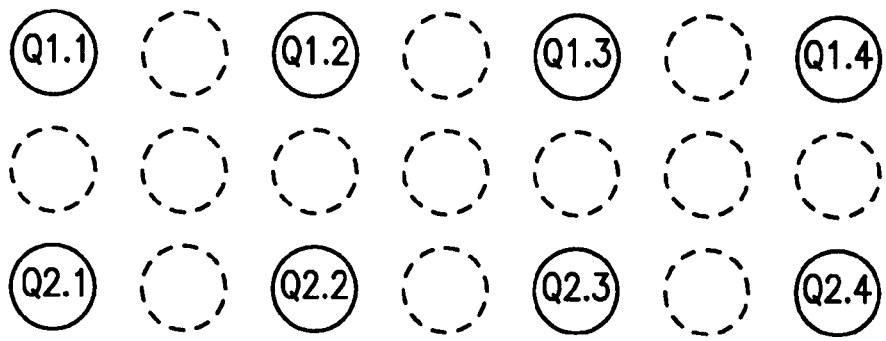
FIG. 20

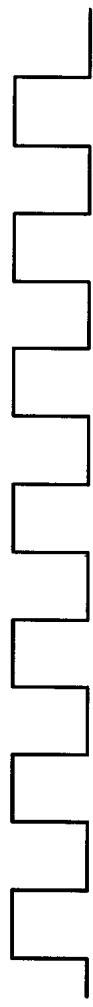
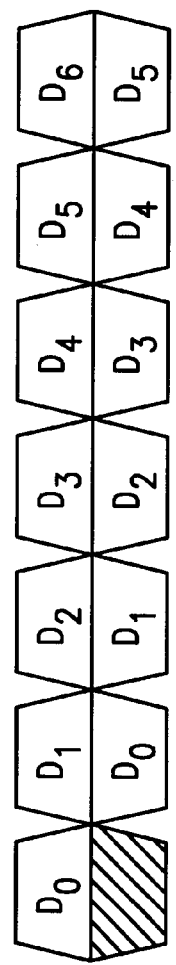
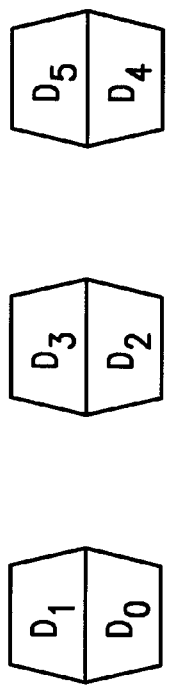
FIG. 29A  Video clock
FIG. 29B  Input video signal S3001
FIG. 29C  Video signal S3003
FIG. 29D  Write enable signal WE
FIG. 29E  Video data set input into data input register 3011

TELEVISION RECEIVER, VIDEO SIGNAL PROCESSING DEVICE, IMAGE PROCESSING DEVICE AND IMAGE PROCESSING METHOD

BACKGROUND OF THE INVENTION

1. Field of the Invention

The present invention relates to a television receiver; a video signal processing device, an image processing device, and an image processing method.

2. Description of the Related Art

In recent years, the methods of broadcasting television signals have been diversified. For instance, not only have NTSC (National Television System Committee) signals been broadcasted using a ground wave but also both NTSC signals and high-definition signals have been broadcasted using a broadcasting satellite (BS). Further, just recently, digital signals have been broadcasted using a communication satellite (CS).

With the diversified methods of broadcasting, television receivers are demanded to have a capability of receiving various types of signals from such diversified broadcasting methods to display corresponding images.

Each of the different broadcasting methods uses a video format which is different from one another. For example, the NTSC signal broadcasting uses a video format of 525 horizontal scanning lines/interlace scanning, while the high-definition signal broadcasting uses a video format of 1125 horizontal scanning lines/interlace scanning. Further, in recent years, television receivers have been requested to display video signals having video formats of VGA (video graphics array) and SVGA (super VGA) which are output from computes. As such, the demands on the display function of television receivers have increasingly become strong.

When a television receiver capable of displaying video signals having a variety of video formats is attempted to be realized, one may consider providing different conversion devices for input signals having different image formats. Such a configuration, however, requires the same number of conversion devices as that of the possible different image formats, thereby increasing the circuits size and the cost.

A conventional image processing device for performing digital image processing for video signals such as television signals is shown in FIG. 26. Referring to FIG. 26, the image processing device includes a digital signal processing circuit 2200 constructed to perform a predetermined image processing for video signals and at least one field memory and/or frame memory 2202.

In the case of a moving-image real-time processing, for example, a frame memory 2202A and a field memory 2202B are used for motion detection, while a frame memory 2202C is used for motion adaption interpolation. An additional frame memory (not shown) may be used for time-axis conversion for converting a high-definition signal into an NTSC signal, for example.

Thus, a conventional digital image processing circuit heads more field memories or frame memories as more types of image processing are required. This is disadvantageous in the aspects of reducing the cost and size of the device. Dynamic random access memories (DRAMs) having a capacity of 1 to 2 M bits are used for general type field memories and frame memories. These DRAMs are extremely small in memory capacity compared with presently mainstream 10M-bit and 54M-bit dynamic RAMs, but are not so different in cost and chip size from the latter.

As the number of field memories and/or frame memories increases; the number of terminal pins of the digital signal processing circuit 2200 increases propertionally, thereby increasing the size of the resultant IC package.

Another problem is that the system with the above configuration is poorly adaptive to a variety of applications. For example, a system constructed for the NTSC signal using field memories having a capacity of 1.5 M bits is not used for the high-definition signal which needs field memories having a capacity of about 4 M bits.

Moreover, the usage of each of such a number of field memories and/or frame memories in restricted or specified in accordance with functions defined by a processing section of the digital signal processing circuit 2200. Such a conventional image processing device therefore generally fails to be used for a variety of applications.

Conventionally, therefore, when one television receiver is intended to receive a variety of video signals such as an NTSC signal, a RS signal, a high-definition signal, and a signal output from a computer, it is required to incorporate all of the different types of digital signal processing circuits, together with relevant field/frame memories, exclusive for respective types of video signals. The resultant device is extremely high in cost and large in size.

In addition to the current demands being placed on the digital signal processing circuitry, with the onset of digital broadcasting and the enhancement of the broadcasting image quality, a video signal processing circuit incorporated in a television receiver and the like similarly has been demanded to have a function of processing video signals having different formats. Moreover, such a video signal processing circuit has been demanded to have a function of displaying as such information as possible simultaneously, such as a double-screen display end a multi-screen display. Under these circumstances, a single-instruction multiple-data (SIMD) type video signal processor has been used as the video signal processing circuit.

The SIMD video signal processor processes a video signal for each horizontal scanning line, and includes N processor elements $PE_1$ to $PE_N$ wherein N is an integer more than the number of effective phials connected to one horizontal scanning line. Each of the N processor elements $PE_1$ to $PE_N$ processes video data corresponding to one of the pixels connected to one horizontal scanning line.

FIG. 32 illustrates a configuration of a conventional video signal processor 3100. The video signal processor 3100 includes a data input register 3101, an operator 3102, and a data output register 3105.

The data input register 301 outputs a plurality of serially input video data units to the operator 3102 in parallel. The data input register 3101 has a width of a bits and a depth of N words. The bit width a of the data input register 3101 is larger than a bit width of a general video signal to be processed. This is because there arises instances where a current luminance signal and a luminance signal delayed by one field must be input into the data input register 3101 simultaneously, for example.

The operator 3102 performs a predetermined arithmetic operation for the plurality of video data units output from the data input register 3101 in parallel. The operator 3102 includes N processor elements $PE_1$ to $PE_N$. Each of the processor elements $PE_1$ to $PE_N$ includes a small-capacity memory 3103 which holds the input data and operation results and an operating element 3104 which performs a predetermined signal processing operation.

The data output register 3105 outputs the plurality of video data units processed by the operator 3102 in series.

The data output register 3105 has a width of t bits and a depth of N words. The bit width t of the data output register 3108 is also larger than a bit width of a general video signal to be processed. This is because there arises instances where an output video signal and data relating to a motion delayed by one field must be output from the data output register 3105 simultaneously, for example.

Hereinbelow, the operation of the video signal processor 3100 will be described, taking as an example a process of removing a horizontal high frequency band component included in a video signal, i.e., a processing of performing horizontal low-pass filtering for a video signal (hereinbelow, referred to as an LPF processing).

FIG. 33 illustrates operations of the data input register 3101, the operator 3102, and the data output register 3105 in the LPF processing. In FIG. 33, the x-axis represents the time.

The video signal processor 3100 operates in accordance with a horizontal synchronous signal which defines horizontal blanking periods and effective video periods as shown in FIG. 33.

During an effective video period $P_i$, a plurality of video data units corresponding to a plurality of effective images connected to one horizontal scanning lines are input into the data input register 3101 in series. For example, one horizontal scanning line may be the i-th horizontal scanning line. Hereinbelow, the i-th horizontal scanning line is referred to as the i line wherein i is an arbitrary integer.

During a horizontal blanking period $B_i$ following the effective video period $P_i$, the plurality of video data units corresponding to the i line input into the data input register 3101 are transferred to the operator 3102 in parallel.

During an effective video period $F_{i+1}$ following the horizontal blanking period $B_i$, the LPF processing is performed for the plurality of video data units corresponding the i line.

During a horizontal blanking period $B_{i+1}$ following the effective video period $P_{i+1}$, a plurality of LPF-processed video data units corresponding to the i line are transferred to the data output register 3105 in parallel.

During an effective video period $P_{i+2}$ (not shown in FIG. 33) following the horizontal blanking period $B_{i+1}$, the plurality of LPF-processed video data units corresponding the i line are output from the data output register 3105 in series.

The above-descried process is also performed for a plurality of video data units corresponding to an (I–1) line and a plurality of video data units corresponding to an (i+1) line.

FIG. 34 diagrammatically illustrates the LPF processing performed by the operator 3102. In FIG. 34, the operator 3102 is shown to performs the LPF processing for video data units $D_{j-2}, D_{j-1}, D_j, D_{j+1}, D_{j+2}$ corresponding to the i line, and output LPF-processed video data units $D'_{j-2}, D'_{j-1}, D'_j, D'_{j+1}, D'_{j+2}$ corresponding to one i line.

The LPF-processed video data unit $D'_j$ is obtained by the calculation of expression (1) below:

$$D'_j = \tfrac{1}{4} \cdot D_{j-1} + \tfrac{1}{2} \cdot D_j + \tfrac{1}{4} \cdot D_{j+i} \tag{1}$$

The calculation of expression (1) is performed by the processor element $PE_j$. Similar calculations to that of expression (1) are performed by the processor elements $PD_{j-2}$, $PE_{j-1}$, $PE_{j+1}$, $PE_{j+2}$. Only one LPF processing is performed by each of the processor elements $PE_{j-2}$, $PE_{j-1}$, $PE_j$, $PE_{j+1}$, $PE_{j+1}$ for one line. In this way, the LPF-processed video data units $D'_{j-2}, D'_{j-1}, D'_j, D'_{j+1}, D'_{j-30\;2}$ corresponding to the i line are obtained.

Thus, as described above, a plurality of video data units corresponding to one horizontal scanning line can be processed using a video signal processor including the number of processor elements equal to or more than the number of effective pixels connected to one horizontal scanning line.

In order to make video apparatuses such as television receivers more prevailing, further cost reduction of the video signal processor, as well as the sophistication thereof, are essential.

In the above-described conventional video signal processor, however, if the number of processor elements included in the video signal processor is smaller than the number of effective pixels connected to one horizontal scanning line, video data units corresponding to the effective pixels which have no corresponding processor elements fail to be processed. To avoid this problem, the number of processor elements included in the video signal processor must be increased as the number of effective pixels connected to one horizontal scanning line increases. This causes an increase in the cost of the video signal processor when the processing of high-precision video signals is involved.

An object of the present invention is to provide a television receiver and a video signal processing device which are adaptive to a variety of broadcasting methods without increasing the circuit size and the cost.

Another object of the present invention is to provide image processing device/method with a small-size circuit configuration which can be used for a variety of applications.

Still another object of the present invention is to provide image processing device/method which effectively utilize resources inside the device to perform efficient high-level image processing.

Still another object of the present invention is to provide an video signal processing device with a reduced cost.

SUMMARY OF THE INVENTION

The television receiver including a display device capable of displaying a video signal having a predetermined display format of this invention includes: a plurality of video signal sources; a selection circuit for selecting one of a plurality of video signals output from the plurality of video signal sources; and an image processor for converting a format of the video signal selected by the selection circuit into the predetermined display format, wherein a video signal output from the processor is supplied to the display device.

In one embodiment of the invention, each of the plurality of video signal sources includes at least one of a NTSC decoder, a MUSE decoder, and a digital decoder.

Alternatively, the television receiver including a display device capable of displaying a video signal having a predetermined display format of this invention includes; a plurality of video signal sources; a selection circuit for selecting at least two of a plurality of video signals output from the plurality of video signal sources; and an image processor for converting a format of each of the at least two video signals selected by the selection circuit into a predetermined display format, and processing the at least two video signals so that synthesized images are displayed on the display device, wherein a video signal output from the processor is supplied to the display device.

In one embodiment of the invention, each of the plurality of video signal sources includes at least one of an NTSC decoder, a MUSE decoder, and a digital decoder.

According to another aspect of the invention, a video signal processing apparatus is provided. The video signal processing apparatus includes: a plurality of video signal input terminals for receiving a plurality of video signals; a selection circuit for selecting one of the plurality of video signals input via the plurality of video signal input terminals; and an image processor for converting a format of the video signal selected by the selection circuit into a predetermined display format.

Alternatively, the video signal processing apparatus of this invention includes: a plurality of video signal input terminals for receiving a plurality of video signals; a selection circuit for selecting at least two of the plurality of video signals input via the plurality of video signal input terminals; and an image processor for converting a format of each of the at least two video signals selected by the selection circuit into a predetermined display format, and synthesizing the at least two video signals.

According to still another aspect of the invention, an image processing device is provided. The image processing device includes: an input section for receiving image data to be processed; a digital signal processing section including a plurality of processing elements allocated to respective pixels corresponding to one scanning line in a one-to-one relationship for performing a same operation in accordance with a common instruction, the digital signal processing section receiving, processing, and outputting the image data for each scanning line; an image memory having a fixed memory region and capable of performing a write operation and a read operation in parallel and independently, the image memory receiving and outputting the image data for each scanning line; an output section for outputting processed image data; data bus means for connecting the input section, the digital signal processing section, the image memory, and the output section with one another; and control means for controlling the input section, the digital signal processing section, the image memory, and the output section in accordance with program data.

In one embodiment of the invention, the digital signal processing section includes; a data input portion for receiving in parallel for each scanning line at least one image data unit corresponding to at least one respective video signal; and a data output portion for outputting in parallel for each scanning line the at least one image data unit processed for each scanning line by the plurality of processing elements, wherein a data input operation for each scanning line by the data input portion, a processing operation for each scanning line by the plurality of processing elements, and a data output operation for each scanning line by the date output section are performed in a pipeline manner.

In another embodiment of the invention, the image memory includes: data write means for sequentially writing the input image data into the memory region in sequential addresses; data read means for reading the images data to be output from the memory region in sequential addresses; and pointer control means for controlling a write pointer and a read pointer for indicating a write address and a read address in the memory region, respectively, in accordance with the program data.

In still another embodiment of the invention, the image memory further includes: a plurality of input buffers each having at least first and second input buffer portions with a respective predetermined memory capacity; and means for controlling the plurality of input buffers such that when the first input buffer portion of the input buffer is filled with image data, writing of input image data into the second input buffer portion is started, and image data is read from the first input buffer portion to be written into the memory region, and when the second input buffer portion is filled with image data, writing of input image data into the first input buffer portion is started, and image data is read from the second input buffer portion to be written into the memory region.

In still another embodiment of the invention, a data rate at which image data is written into the memory region from the input buffer is selected to be different from a data rate at which image data is written into the input buffer.

In still another embodiment of the invention, the image memory further includes: a plurality of output buffers each having at least first and second output buffer portions with a respective predetermined memory capacity; and means for controlling the plurality o output buffers such that when the first output buffer portion of the output buffer has no image data, reading of image data from the second output buffer portion is started, and image data read from the memory region is written into the first output buffer portion, and when the second output buffer portion has no image data, reading of image data from the first output buffer portion is started, and image data read from the memory region is written into the second output buffer portion.

In still another embodiment of the invention, a data rate at which image data is written into the output buffer from the memory region is selected to be different from a data rate at which image data is read from the output buffer.

In still another embodiment of the invention, the data bus means includes; a first data bus portion for electrically connecting a data output terminal of the input section with a data input terminal of the digital signal processing section; a second data bus portion for electrically connecting a data output terminal of the input section with a data input terminal of the image memory; a third data bus portion for electrically connecting a data output terminal of the digital signal processing section with a data input terminal of the image memory; a fourth data bus portion for electrically connecting a data output terminal of the image memory with a data input terminal of the digital signal processing section; a fifth data bus portion for electrically connecting a data output terminal of the input section with a data input terminal of the output section; a sixth data bus portion for electrically connecting a data output terminal of the digital signal processing section with a data input terminal of the output section; and a seventh data bus portion for electrically connecting a data output terminal of the image memory with a data input terminal of the output section.

It still another embodiment of the invention, all of the first to seventh data bus portions are formed on a semiconductor chip.

In still another embodiment of the invention, the control means includes; program data holding means for holding program data defining operation modes for the input section, the digital signal processing section, the image memory, the output section, and the data bus means; and program data distribution means for receiving program data and distributing the program data into the program data holding means.

According to still another aspect of the invention, an image processing method for processing image data by the image processing device is provided. The method includes the steps of: receiving image data corresponding to one video signal by the input section; performing a first processing for the image data output from the input section to the digital signal processing section by the digital signal processing section; writing the image data output from the digital signal processing section after the first processing into the image memory to temporarily store the image data in the image memory; and receiving the image data read from the image memory by the digital signal processing section again to perform a second processing.

In one embodiment of the invention, the image processing method further includes the steps of: writing the image data output from the digital signal processing section after the second processing into the image memory to temporarily store the image data into the image memory; and receiving the image data read from the image memory by the digital signal processing section again to perform a third processing.

Alternatively, the image processing method for processing image data by the image processing device of this invention includes the steps of: receiving image data corresponding to one video signal by the input section; writing the image data output from the input section into the image memory to temporarily store the image data in the image memory; supplying the image data from the input section and the image data read from the image memory to the digital signal processing section in parallel, and performing a predetermined processing between these image data.

In one embodiment of the invention, the image data is read from two output ports of the image memory by delaying the image data by a predetermined delay amount and input in parallel into the digital signal processing section, and the predetermined processing is performed between the two units of image data from the image memory and the image data from the input section.

Alternatively, the image processing method for processing image data by the image processing device of this invention includes the steps of: writing only a portion of the image data corresponding to a portion of pixels for each scanning line and/or a portion of scanning lines for each field among the image data corresponding to one video signal into the image memory to temporarily store the portion of the image data in the image memory; and reading from the image memory the image data in the order in which the pixels and scanning lines have been written to the image memory.

Alternatively, the image processing method for processing image data by the image processing device of this invention includes the steps of: writing image data corresponding to one video signal into the image memory to temporarily store the image data in the image memory; reading the image data from the image memory intermittently for each pixel or for each scanning line; and supplying the image data read from the image memory to the digital signal processing section, and interpolating image data at positions of pixels or scanning lines which had been skipped in the intermittent reading of the image memory.

Alternatively, the image processing method for processing image data by the image processing device of this invention includes the steps of: receiving first and second image data units corresponding to two image signals which are asynchronous from each other by the input section; writing the first image data unit output from the input section into the image memory to temporarily store the first image data in the image memory; supplying the second image data unit output from the input section to the digital signal processing section, and simultaneously reading the first image data unit from the image memory to supply to the digital signal processing section in synchronization with the supply of the second image data unit; and performing a predetermined processing for the first and second image data units input in synchronization with each other by the digital signal processing section.

Alternatively, the image processing method for processing image data by the image processing device of this invention includes the steps of: receiving first and section image data units corresponding to two image signals which are asynchronous from each other by the input section; supplying the first image data unit output from the input section to the digital signal processing section to perform a predetermined processing; supplying the first image data unit output from the digital signal processing section to the image memory, and simultaneously supplying the second image data unit output from the input section to the image memory; and reading the first and second image data units from the image memory in synchronization with a synchronous signal other than synchronous signals relating to the first and second image data units.

Alternatively, the image processing method for processing image data by the image processing device of this invention includes the steps of: receiving image data corresponding to one video signal by the input section; supplying a former half of the image data output from the input section to the digital signal processing section during a first period; writing the image data output from the input section into the image memory and reading the written image data after a predetermined delay time; and supplying a letter half of the image data output from the image memory to the digital signal processing section during a second period.

In one embodiment of the invention, the image processing method further includes the steps of: writing the former half of the image data output from the digital signal processing section into the image memory and reading the written image data after a predetermined delay time; outputting the former half of the image data read from the image memory from the output section; outputting the letter half of the image data from the digital signal processing section; and outputting the latter half of the image data output from the digital signal processing section from the output section in succession with the former half of the image data.

In another embodiment of the invention, the image processing method further includes the steps of: adding a first overlap portion which overlaps a head portion of the latter half of the image data by a predetermined number of pixels to a tail portion of the former half of the image data input into the digital signal processing section during the first period; adding a second overlap portion which overlaps a tail portion of the former half of the image data by a predetermined number of pixels to a head portion of the latter half of the image data input into the digital signal processing section during the second period; and removing the first and second overlap portions at a stage of outputting the image data outside from the output section.

Alternatively, the image processing method for processing image data by the image processing device of this invention includes the steps of: receiving image data corresponding to one video signal by the input section and performing a low-pass filtering processing by the input section; and supplying the image data output from the input section to the digital signal processing section or the image memory, and performing a decimation processing for information compression of the image data.

According to still another respect of the invention, a video signal processing device is provided. The video signal processing device includes: a first converter for receiving a plurality of video data units corresponding to a plurality of pixels connected to one scanning line as an input video signal, and converting the plurality of video data units into a plurality of video data sets, each of the plurality of video data sets including at least two video data units; an operator for processing the plurality of video data sets and outputting a plurality of processed video data sets; and a second converter for converting the plurality of processed video data sets into a plurality of processed video data units corresponding to a plurality of pixels connected to one scanning line, and outputting the plurality of processed video data units as an output video signal.

In one embodiment of the invention, the operator includes a plurality of processor elements, and each of the plurality of processor elements processes at least two image data units included in each of the plurality of video data sets.

Thus, the invention described herein makes possible the advantages of (1) providing a television receiver and a video signal processing device which are adaptive to a variety of broadcasting methods, without increasing the circuit size and the cost, (2) providing image processing device/method with a small-size circuit configuration which can be used for a variety of applications, (3) providing image processing device/method which effectively utilize resources inside the device to parform efficient high-level image processing, and (4) providing an video signal processing device with a reduced cost.

These and other advantages of the present invention will become apparent to those skilled in the art upon reading and understanding the following detailed description with reference to the accompanying figures.

BRIEF DESCRIPTION OF THE DRAWINGS

FIG. 18 is a view illustrating an exemplary pixel pattern obtained by an image processing method in the image processor of Example 5.

FIG. 19 is a timing chart for describing another image processing method in the image processor of Example 5.

FIG. 20 is a view illustrating an exemplary pixel pattern obtained by the method of FIG. 19.

FIGS. 29A to 29E are timing charts showing the operations of a serial-parallel converter and the data input register in Example 6.

DESCRIPTION OF THE PREFERRED EMBODIMENTS

Hereinbelow, the present invention will be described by way of example with reference to the accompanying drawings.

EXAMPLE 1

Figure 1:
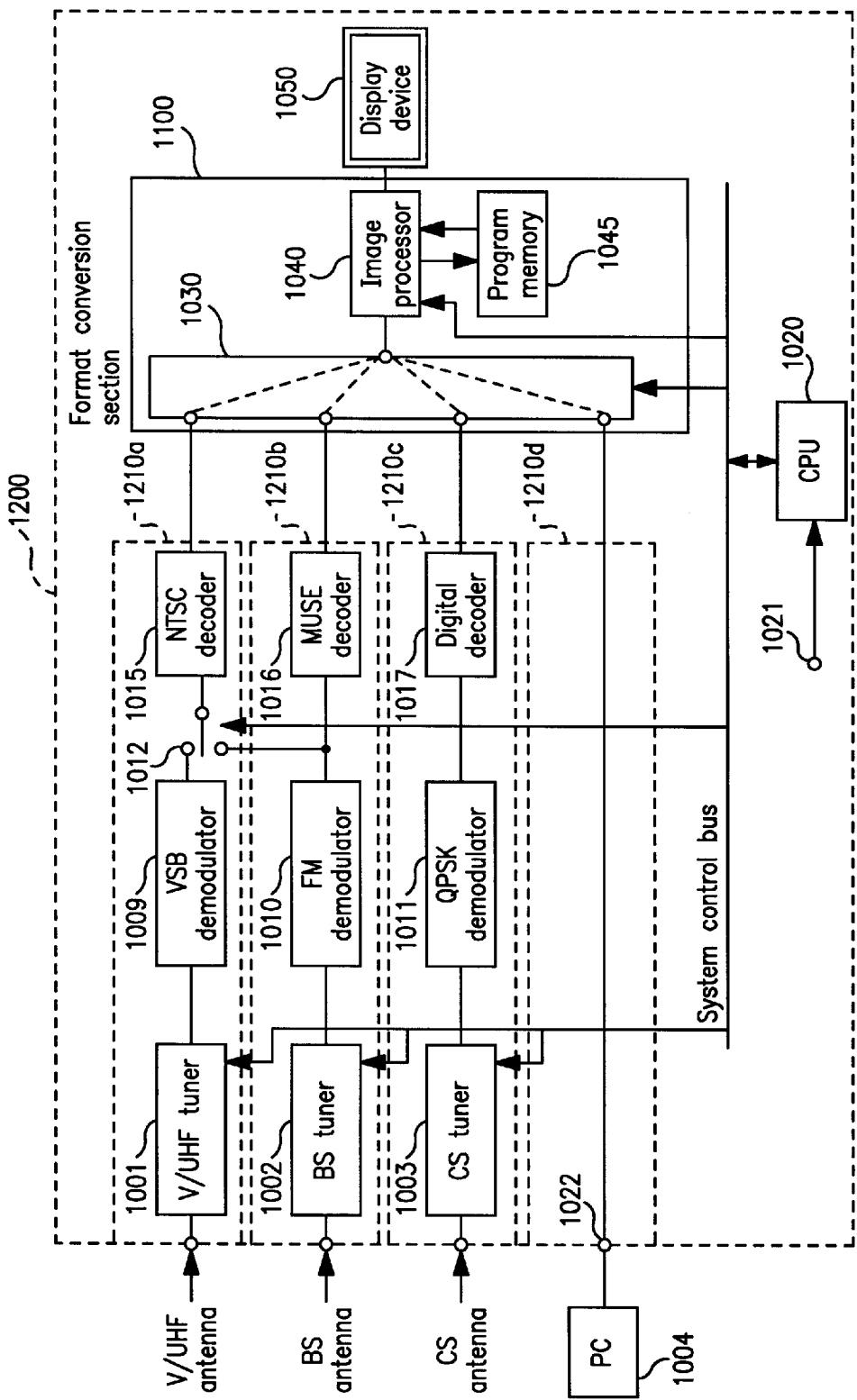
FIG. 1 is a block diagram illustrating a configuration of a television receiver of Example 1 according to the present invention.

FIG. 1 illustrates a configuration of a television receiver 1200 of Example 1 according to the present invention.

The television receiver 1200 of this example includes a display device 1050 capable of displaying a video signal having a predetermined display format. The predetermined display format is, for example, a format of 1125 horizontal scanning lines/interlace scanning.

The television receiver 1200 further includes a plurality of video signal sources 1210a, 1210b, 1210c, 1210d which output a plurality of video signals and a format conversion section 1100 which converts a video format of each of the plurality of video signals into the display format which is acceptable by the display device 1050. The "video device" and the "display format" as used herein are defined to include the number of horizontal scanning lines, the aspect ratio, interlace scanning/non-interlace scanning, and the frequency of fields.

The video signal source 1210a includes a V/URF tuner 1001, a VSB demodulator 1009, a selection circuit 1012, and an NTSC decoder 1015. An NTSC broadcast signal sent via a ground wave is received by a V/UHF antenna (not shown). The NTSC broadcast signal received by the V/UHF antenna is supplied to the VSB demodulator 1009 via the V/UHF tuner 1001. The VSB demodulator 1009 converts the NTSC broadcast signal into a base-band NTSC signal. The base-band NTSC signal is then supplied to the NTSC decoder 1015 via the selecton circuit 1012. The NTSC decoder 1015 decodes the base-band NTSC signal to output a RGB signal, which is supplied to the format conversion section 1100. Thus, the RGB signal is supplied from the video signal source 1210a to the format conversion section 1100.

The video signal source 1210b includes a BS tuner 1002, an FM demodulates 1010, and a MUSE decoder 1016. A high-definition broadcast signal sent via a broadcasting satellite (BS) is received by a BS antenna (not shown). The high-definition broadcast signal received by the BS antenna is supplied to the FM demodulator 1010 via the BS tuner 1002. The FM demodulator 1010 converts the high-definition broadcast signal into a base-band MUSE signal. The base-band MUSE signal is then supplied to the MUSE decoder 1016. The MUSE decoder 1016 decodes the base-band MUSE signal to output a high-definition RGB signal, which is supplied to the format conversion section 1100. Thus, the high-definition RGB signal is supplied from the video signal source 1210b to the format conversion section 1100.

The video signal source 1210c includes a communication satellite (CS) tuner 1003, a QPKS deomdulator 1011, and a digital decoder 1017. A digital broadcast signal sent via a communications satellite is received by a CS antenna (not shown). The digital broadcast signal received by the CS antenna is supplied to the QPSK demodulator 1011 via the CS tuner 1003. The QPSK demodulator 1011 converts the digital broadcast signal into a digital bit stream. The digital bit stream is then supplied to the digital decoder 1017. The digital decoder 1017 decodes the digital bit stream in accordance with an MPEG2 method to output a RGB signal, which is supplied to the format conversion section 1100. Thus, the RGB signal is supplied from the video signal source 1210c to the format conversion section 1100.

The video signal source 1210d includes an input terminal 1022. The television receiver 1200 is connected to a personal computer (PC) 1004 via the input terminal 1022. A RGB signal output from the PC 1004 is supplied to the format conversion section 1100 via the input terminal 1022. Thus, the RGB signal is supplied from the video signal source 1210d to the format conversion section 1100.

The RGB signals output from the video signal sources 1210a and 1210c, the high-definition RGB signal output from the video signal source 1210b, and the RGB signal output from the video signal source 1210d have different video formats from one another. For example, the RGB signals output from the video signal sources 1210a and 1210c have a video format of 525 horizontal scanning lines/interlace scanning. The high-definition RGB signal output from the video signal source 1210b has a video format of 1125 horizontal scanning lines/interlace scanning. The RGB signal output from the video signal source 1210d has a video format of VGA, SVGA, or the like.

The format conversion section 1100 includes a selection circuit 1030 which selects one of the plurality of video signals output from the plurality of video signal sources 1210a to 1210d and an image processor 1040 which converts the video format of the video signal selected by the selection circuit 1030 into a predetermined display format capable of being displayed by the display device 1050. A general processor may be used in place of the image processor 1040.

The selection circuit 1030 selects one of the plurality of video signals in accordance with a control signal output from a CPU 1020. The video signal selected by the selection circuit 1030 is supplied to the image processor 1040.

The image processor 1040 is a programmable real-time video signal processing device which performs a video signal processing in accordance with a program. The image processor 1040 reads a program corresponding to the format of the video signal selected by the selection circuit 1030 from a program memory 1045 in accordance with the control signal output from the CPU 1020, to execute the program. This converts the format of the video signal selected by the selection circuit 1030 into a predetermined display format which can be displayed by the display device 1050.

For example, when the RGB signal output from the NTSC decoder 1015 is selected by the selection circuit 1030, the image processor 1040 receives a program for converting the video format of "525 horizontal scanning lines/interlaces scanning" into a display format of "1125 horizontal scanning lines/interlace scanning" from the program memory 1045 under the control of the CPU 1020. The image processor 1040 executes this format conversion program, resulting in providing the video signal of which format has been converted into the display format capable of being displayed by the display device 1050. The video signal is supplied to the display device 1050 for display.

When the high-definition RGB signal output from the MUSE decoder 1016 is selected by the selection circuit 1030, the image processor 1040 receives a program for allowing the high-definition RGB signal output from the MUSE decoder 1016 to pass therethrough witbout any processing from the program memory 1045 under the control of the CPU 1020. This is because the video format of the high-definition RGB signal is the same as the display format capable of being displayed by the display device 1050, thereby requiring no format conversion.

When the RGB signal output from the digital decoder 1017 is selected by the selection circuit 1030. The processing performed by the image processor 1040 is similar to that performed when the RGB signal output from the NTSC decoder 1015 is selected by the selection circuit 1030. That is, the video format of "525 horizontal scanning lines/ interlace scanning" is converted into the display format of "1125 horizontal scanning lines/interlace scanning". As a result, the video signal of which format has been converted into the display format capable of being displayed by the display device 1050 is provided as the output of the image processor 1040. The video signal is supplied to the display device 1050 for display.

When the RGB signal input into the input terminal 1022 is selected by the selection circuit 1030, the image processor 1040 receives a program for converting the video format of the input RGB signal (e.g., VGA, SVGA) into the display format of "1125 horizontal scanning lines/interlace scanning" from the program memory 1045 under the control of the CPU 1020. The image processor 1040 executes this format conversion program, resulting in providing the video signal of which format has been converted into the display format capable of being displayed by the display device 1050 as the output of the image processor 1040. The video signal is supplied to the display device 1050 for display.

As described above, the CPU 1020 controls the selection circuit 1030 and the image processor 1040. The control signals output from the CPU 1020 are supplied to the selection circuit 1030 and the image processor 1040 via system control buses. The values of the control signals are determined in accordance with user operation information input via a control input terminal 1021. The user operation information includes a channel selection signal.

The CPU 1020 also controls the tuning of the V/UHF tuner 1001, the BS tuner 1002, and the CS tuner 1003.

The CPU 1020 further controls the selection circuit 1012 which selects the input into the NTSC decoder 1015. The selection circuit 1012 is controlled so as to connect the output of the VSB demodulator 1009 to the NTSC decoder 1015 when it receives the NTSC broadcast signal via a ground wave, or connect the output of the FM demodulator 1010 to the NTSC decoder 1015 when it receives the NTSC broadcast signal via a BS.

Thus, according to the television receiver 1200, video signals having different video formats can be converted into video signals having a predetermined display format by executing format conversion programs corresponding to the respective formats of the video signals. As a result, one television receiver becomes adaptive to a variety of broadcasting methods without increasing the circuit size and the cost.

In particular, a scan-line video processor (SVP) type image processor described in Japanese Laid-Open Publication No. 3-258179 can be preferably used as the image processor 1040. The SVP type image processor is constructed to process a scanning-line type signal for each scanning line, which is suitable for the format conversion processing such as the conversion of the number of scanning lines.

However, the SVP type image processor is not suitable for the synchronous processing in the decoding of the NTSC signal. Further, the SVP type image processor is not suitable to perform the processing such as inverse discrete cosine transformation or perform error correction in the decoding of the digital broadcast signal. In Example 1, the decoders 1015 to 1017 for decoding video signals and the format conversion section 1100 including the image processor 1040 are separately disposed so that only the scanning-line type signal can be supplied to the image processor 1040. With this configuration, the image processor 1040 is optimized to obtain a high cost performance.

EXAMPLE 2

Figure 2:
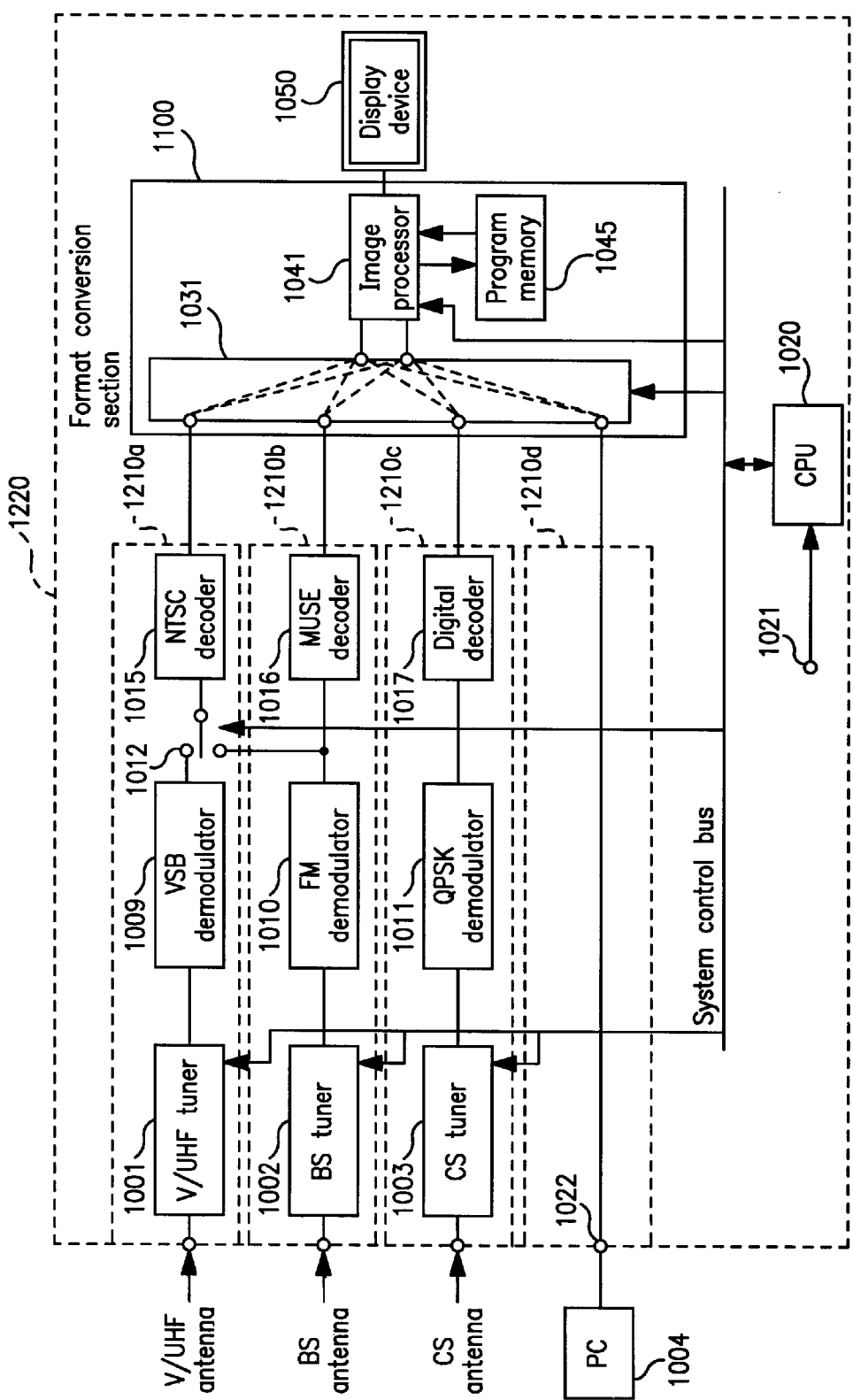
FIG. 2 is a block diagram illustrating a configuration of a television receiver of Example 2 according to the present invention.

FIG. 2 illustrates a configuration of a television receiver 1220 of Example 2 according to the present invention. The same components as those shown in FIG. 1 are denoted by the same reference numerals, and the descriptions thereof are omitted here.

A format conversion section 1100 includes: a selection circuit 1031 which selects two of a plurality of video signals output from a plurality of video signal sources 1210a to 1210d; and an image processor 1041 which converts the formats of the two video signals selected by the selection circuit 1031 into a predetermined display format capable of being displayed by a display device 1050 in accordance with a program, and processes the two video signal so that synthesized images can be displayed on the display device 1050.

The selection circuit 1031 selects two of the plurality of video signals in accordance with a control signal output from a CPU 1020. The two video signals selected by the selection circuit 1031 are supplied to the image processor 1041. The two video signals selected by the selection circuit 1031 may be an arbitrary combination of two of the plurality of video signals.

The image processor 1041 reads programs corresponding to the formats of the two video signals selected by the selection circuit 1031 from the program memory 1045 in accordance with a control signal output from the CPU 1020, to execute the programs. This converts the formats of the two video signals selected by the selection circuit 1031 into a predetermined display format which can be displayed by the display device 1050. Moreover, the image processor 1041 synthesizes the two video signals selected by the selection circuits 1031 in accordance with a synthesization program, so that synthesized images are displayed on the display device 1050.

Figure 3:
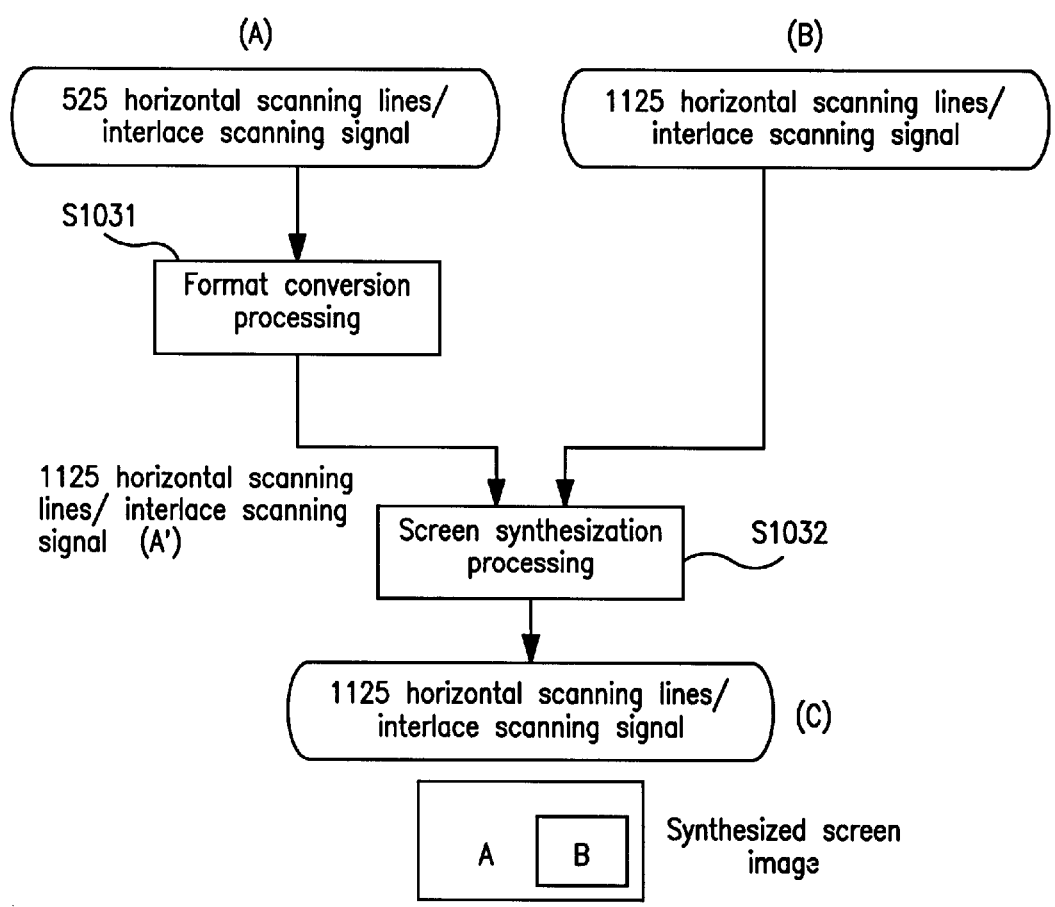
FIG. 3 is a flowchart showing a procedure of a format conversion processing and a screen synthesization processing performed by an image processor of the television receiver of Example 2.

FIG. 3 shows a procedure of the format conversion processing and the screen synthesization processing performed by the image processor 1041.

In the procedure shown in FIG. 3, it is assumed that the RGB signal (A) output from the NTSC decoder 1015 and the high-definition RGB signal (B) output from the MUSE decoder 1016 have been selected by the selection circuit 1031. Under this situation, the image processor 1041 converts the format of the RGB signal (A) (525 horizontal scanning lines/interlace scanning) into a predetermined display format (1125 horizontal scanning lines/interlace scanning) (step S1031). Subsequently, the image processor 1041 synthesizes a format-converted RGB signal (A') and the high-definition RGB signal (B) in accordance with a synthesization program (step S1032). As a result, a synthesized video signal (C) having a display format of 1125 horizontal scanning lines/interlace scanning is obtained. The format conversion of the high-definition RGB signal (B) is not necessary since the signal (B) has the same format as the display format.

Figure 4:
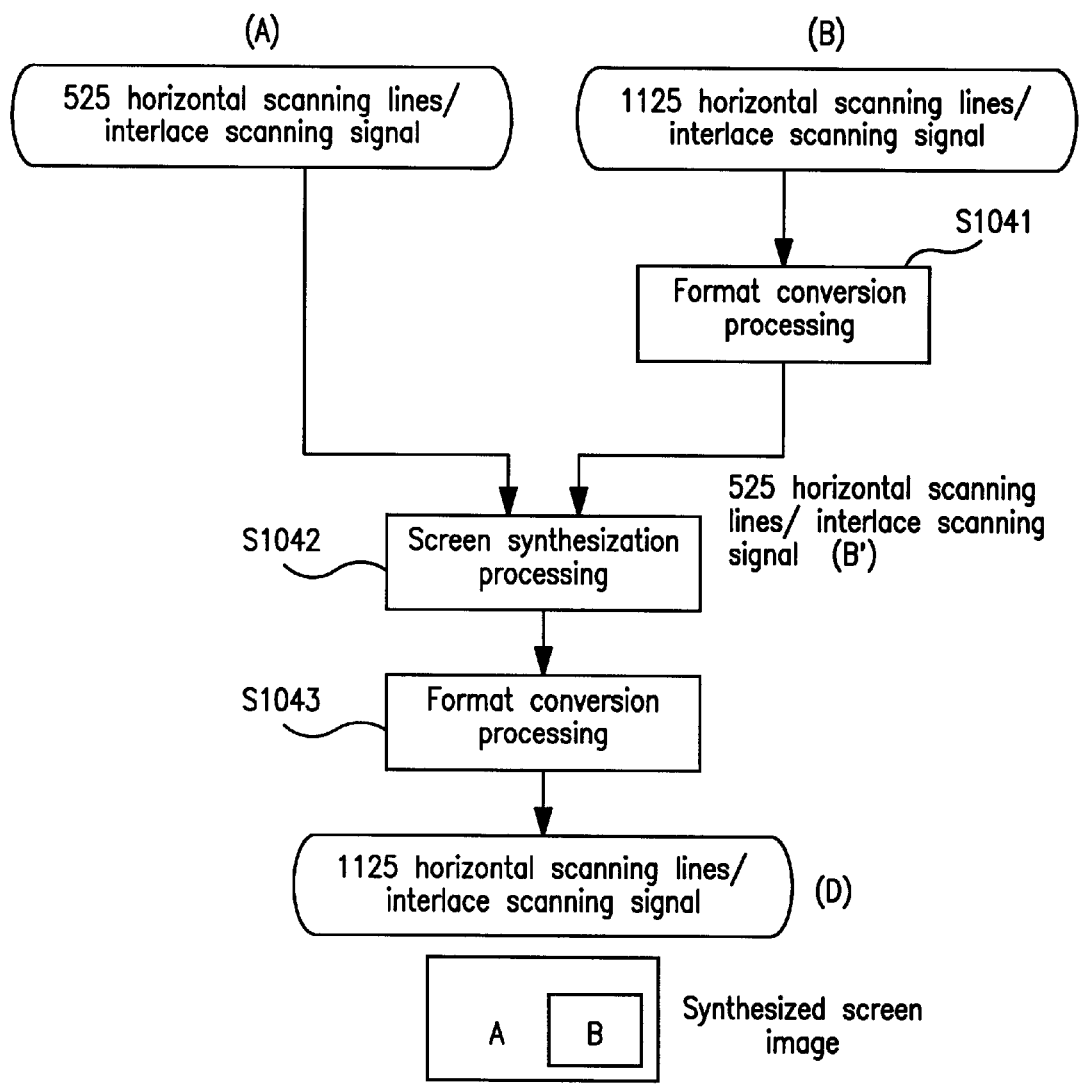
FIG. 4 is a flowchart showing another procedure of the format conversion processing and the screen synthesization processing performed by the image processor of the television receiver of Example 2.

FIG. 4 shows another procedure of the format conversion processing and the screen synthesization processing performed by the image processor 1041.

In the procedure shown in FIG. 4, it is assumed that the RGB signal (A) output from the NTSC decoder 1015 and the high-definition RGB signal (B) output from the MUSE decoder 1016 are selected by the selection circuit 1031. Under this situation, the image processor 1041 converts the format of the high-definition RGB signal (B) (1125 horizontal scanning lines/interlace scanning) into the format of the RGB signal (A) (525 horizontal scanning lines/interlace scanning) (step S1041). Subsequently, the image processor 1041 synthesizes a format-converted high-definition RGB signal (B') and the RGB signal (A) in accordance with a synthesization program (step S1042). As a result, a synthesized video signal (C) having a display format of 525 horizontal scanning lines/interlace scanning is obtained. Thereafter, the image processor 1041 converts the format of the synthesized video signal (C) (525 horizontal scanning lines/interlace scanning) into a predetermined display format (1125 horizontal scanning lines/interlace scanning) (step S1043). As a result, a synthesized video signal (D) having a display format of 1125 horizontal scanning lines/interlace scanning is obtained.

The screen synthesization processing is performed by use of a field memory (not shown). The procedure shown in FIG. 4 is advantageous over the procedure shown in FIG. 3 in that the data amount stored in the field memory is small. More specifically, in the procedure shown in FIG. 3, a data amount corresponding to one field in the format of 1125 horizontal scanning lines/interlace scanning must be stored in the field memory. On the other hand, in the procedure shown in FIG. 4, only a data amount corresponding to one field in the format of 525 horizontal scanning lines/interlace scanning is required to be stored in the field memory. In the procedure shown in FIG. 4, however, the image quality is degraded, compared with the procedure shown in FIG. 3, because the format of 1125 horizontal scanning lines/interlace scanning is once converted into the format of 525 horizontal scanning lines/interlace scanning.

As described above, the procedures shown in FIGS. 3 and 4 have their merits and demerits. Accordingly, which procedure should be employed, the procedure shown in FIG. 3 or the procedure shown in FIG. 4, is determined in consideration of the cost of the field memory and the image quality required.

Thus, according to the television receiver 1220 of this example, video signals having different video formats can be converted into video signals having a predetermined display format by executing format conversion programs corresponding to the respective formats of the video signals. As a result, one television receiver becomes adaptive to a variety of broadcasting methods without increasing the circuit size and the cost. Moreover, synthesized images can be displayed on the display device 1050 by synthesizing a plurality of video signals.

Although two video signals are selected from a plurality of video signals in this example, the number of video signals selected is not limited to two. The present invention also allows for selecting more than two video signals from a plurality of video signals and performing the format conversion processing and the synthesizing processing for the more than two video signals selected.

EXAMPLE 3

Figure 5:
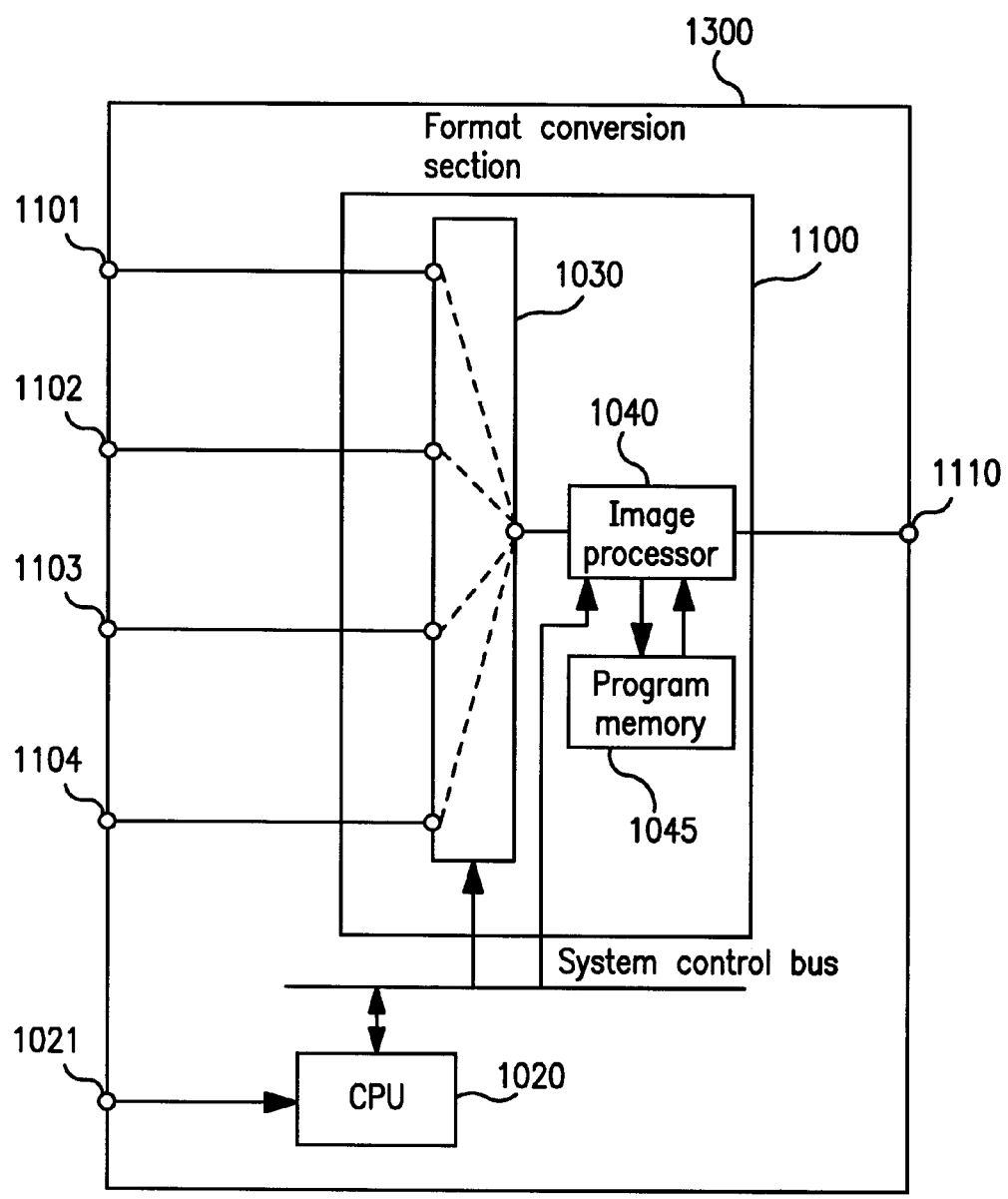
FIG. 5 is a block diagram illustrating a configuration of a video signal processing device of Example 3 according to the present invention.

FIG. 5 illustrates a configuration of a video signal processing device 1300 of Example 3 according to the present invention. The video signal processing device 1300 includes the format conversion section 1100 of the television receiver 1200 shown in FIG. 1. The CPU 1020 and the control input terminal 1021 for system control also constitute the video signal processing device 1300.

The video signal processing device 1300 includes a plurality of video signal input terminals 1101, 1102, 1103, 1104 for receiving a plurality of video signals. The plurality of video signals typically have different video formats from one another. For example, the RGB signal output from the NTSC decoder 1015 (FIG. 1) is input into the video signal input terminal 1101, and the high-definition RGB signal output from the MUSE decoder 1016 (FIG. 1) is output into the video signal input terminal 1102.

The plurality of video signals input via the plurality of video signal input terminals 1101 to 1104 are supplied to the format conversion section 1100.

The format conversion section 1100 includes the selection circuit 1030 and the image processor 1040. The configurations and operations of the selection circuit 1030 and the image processor 1040 are as described in Example 1.

Video signals of which formats have been converted by the image processor 1040 are output from the video signal processing device 1300 via a video signal output terminal 1110.

Thus, the video signal processing device 1300 is adaptive to a variety of broadcasting methods without increasing the circuit size and the cost.

The video signal processing device 1300 shown in FIG. 5 is applicable to a large-screen projection type display system. In recent years, an increasing number of large-screen projection type display systems have been installed in public facilities and the like. Such a system is basically constructed in combination of a projection type display device and a signal reproduction device. The video signal processing device 1300 of this example may be used as the signal reproduction device. In such an application, the video signal processing device 1300 converts the formats of video signals input via the video signal input terminals into a predetermined display format, and supplies format-converted video signals to the projection type display device. The format conversion is performed by executing programs corresponding to the formats of the video signals. This realizes a system which is adaptive to a variety of broadcasting methods without increasing the circuit size and the cost. Additionally, the resultant system can programmably respond to a change in the format of an input video signal and a change in the projection type display device. Thus, the video signal processing circuit 1300 is highly versatile.

EXAMPLE 4

Figure 6:
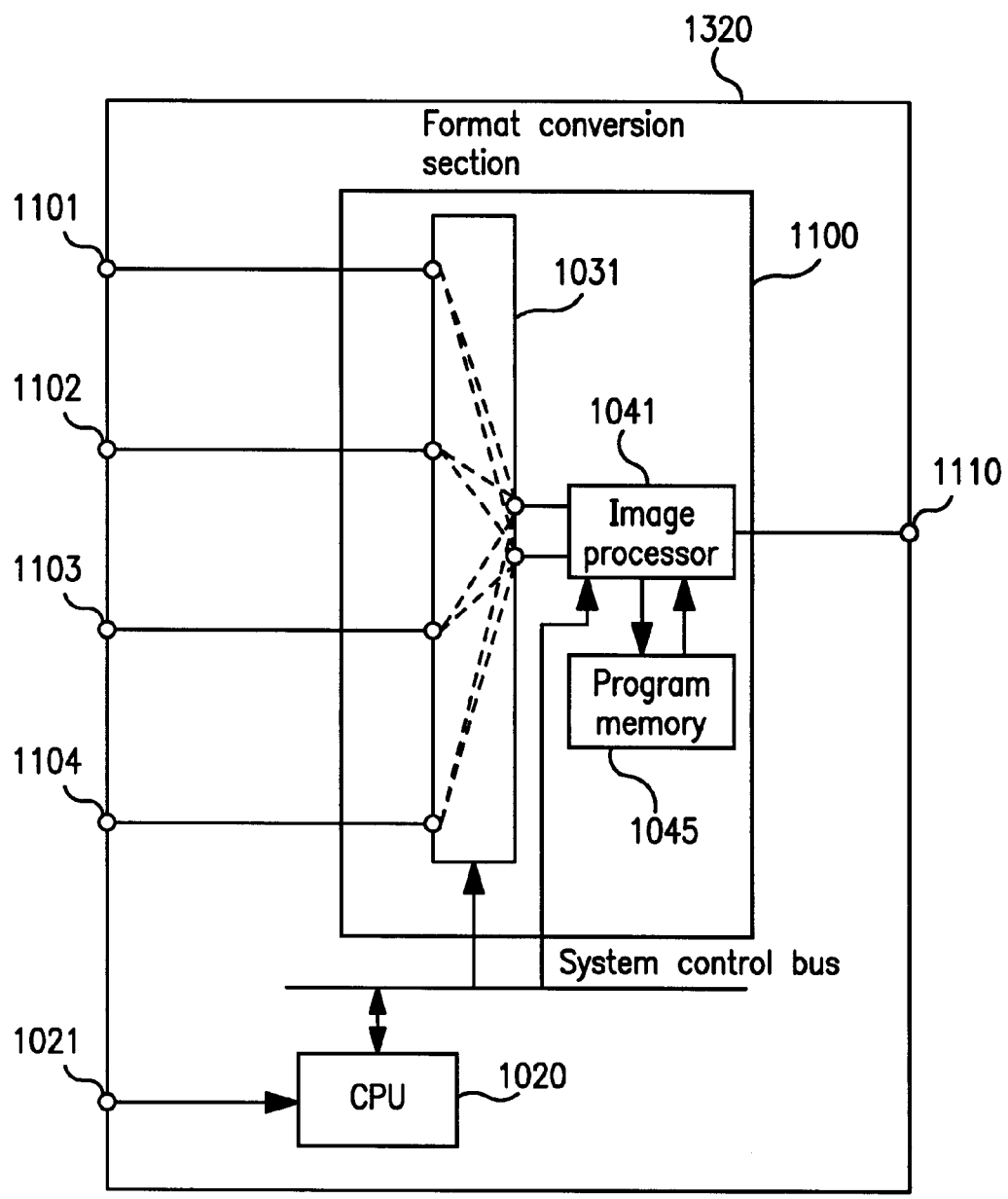
FIG. 6 is a block diagram illustrating a configuration of a video signal processing device of Example 4 according to the present invention.

FIG. 6 illustrates a configuration of a video signal processing device 1320 of Example 4 according to the present invention. The video signal processing device 1320 includes the format conversion section 1100 of the television receiver 1220 shown in FIG. 2. The CPU 1020 and the control input terminal 1021 for system control also constitute the video signal processing device 1320.

The video signal processing device 1320 includes a plurality of video signal input terminals 1101 to 1104 for receiving a plurality of video signals. The plurality of video signals have different video formats from one another. For example, the RGB signal output from the NTSC decoder 1015 (FIG. 1) is input into the video signal input terminal 1101, and the high-definition RGB signal output from the MUSE decoder 1016 (FIG. 1) is input into the video signal input terminal 1102.

The plurality of video signals input via the plurality of video signal input terminals 1101 to 1104 are supplied to the format conversion section 1100.

The format conversion section 1100 includes the selection circuit 1031, the image processor 1041, and the program memory 1045. The configurations and operations of the selection circuit 1031, the image processor 1041, and the program memory 1045 are as described in Example 2.

Video signals of which formats have been converted by the image processor 1041 are output from the video signal processing device 1320 via a video signal output terminal 1110.

Thus, the video signal processing device 1320 is adaptive to a variety of broadcasting methods without increasing the circuit size and the cost.

The video signal processing device 1320 shown in FIG. 6 is applicable to a large-screen projection type display system for the same reason as that described in Example 3.

Thus, in Examples 1 and 2 above, the television receiver according to the present invention selects one of a plurality of video signals output from a plurality of video signal sources. The format of the selected video signal is converted into a display format capable of being displayed by the display device in accordance with a relevant program. Thus, even if the plurality of video signals output from the plurality of video signal sources have different formats from one another, the plurality of video signals can be converted into a predetermined display format by executing programs corresponding to the respective formats. As a result, a television receiver which is adaptive to a variety of broadcasting methods without increasing the circuit size and the cost is realized.

Specifically with respect to Example 2 above, the television receiver selects at least two of a plurality of video signals output from a plurality of video signal sources. The formats of the selected at least two video signals are converted into a predetermined display format capable of being displayed by the display device in accordance with relevant programs. Additionally, the selected at least two video signals are processed so that synthesized images are displayed on the display device. As a result, a television receiver which is adaptive to a variety of broadcasting methods without increasing the circuit size and the cost and which also displays synthesized images on the screen of the display device is realized.

In Examples 3 and 4 above, the video signal processing device according to the present invention selects one of a plurality of video signals input via a plurality of video signal input terminals. The format of the selected video signal is converted into a predetermined display format in accordance with a relevant program. Thus, even if the plurality of video signals input via the plurality of video signal input terminals have different formats from one another, the plurality of video signals can be converted into a predetermined display format by executing programs corresponding to the respective formats. As a result, a video signal processing device which is adaptive to a variety of broadcasting methods without increasing the circuit size and the cost is realized.

Specifically with respect to Example 4 above, the video signal processing device selects at least two of a plurality of video signals input via a plurality of video signal input terminals. The formats of the selected at least two video signals are converted into a predetermined display format in accordance with relevant programs. Additionally, the selected at least two video signals can be synthesized. As a result, a video signal processing device which is adaptive to a variety of broadcasting methods without increasing the circuit size and the cost and outputs a synthesized video signal is realized.

EXAMPLE 5

Figure 7:
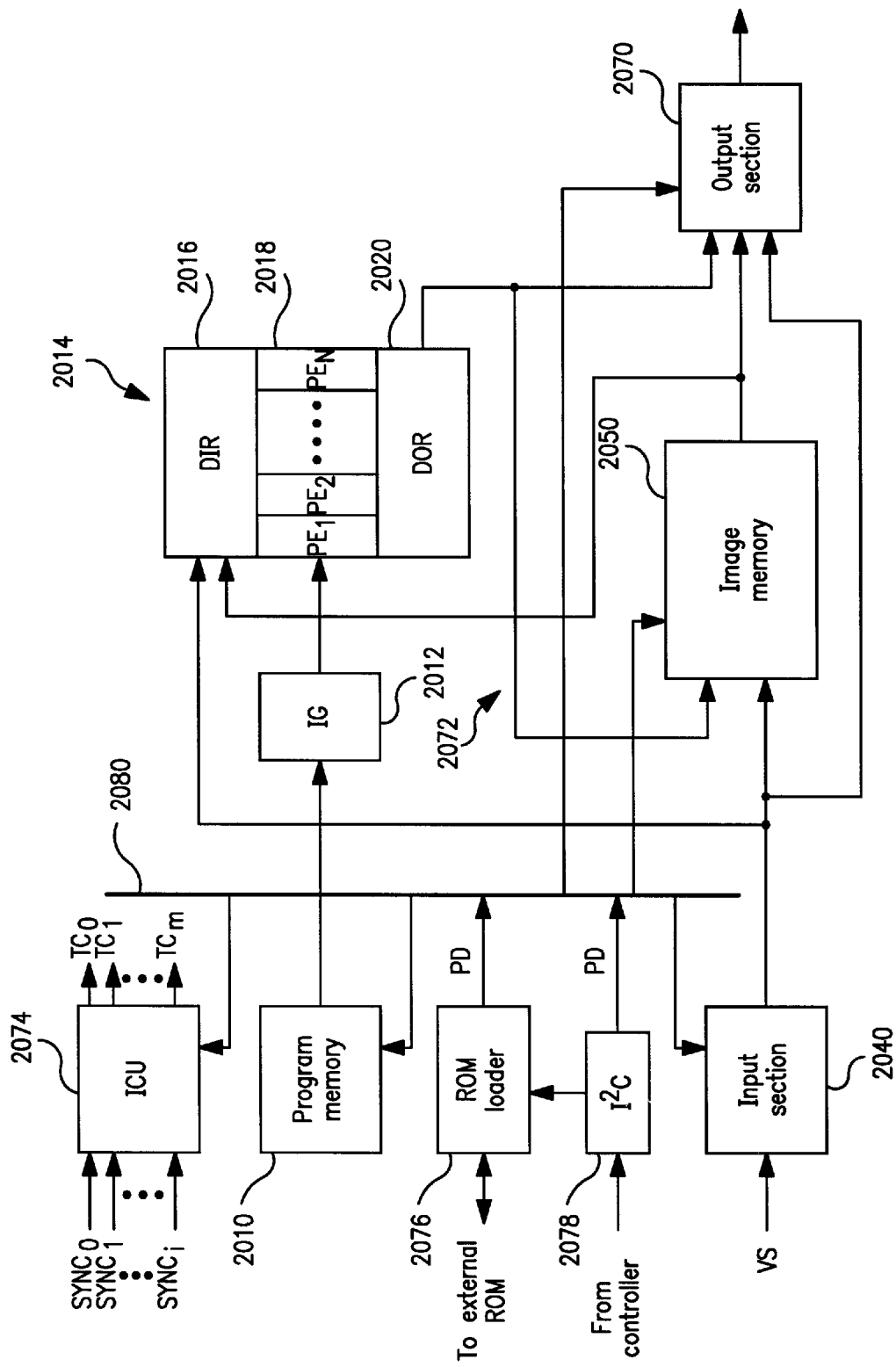
FIG. 7 is a block diagram illustrating an overall circuit configuration of an image processor of Example 5 according to the present invention.

FIG. 7 illustrates a circuit configuration of an image processor of Example 5 according to the present invention.

The image processor of this example includes: an input section 2040 which receives a digital video signal from outside as image data to be processed; a scan-line video processor (SVP) 2014 which receives, processes, and outputs the image data for each scanning line; an image memory 2050 in/from which the image data is written/read for each scanning line; an output section 2070 which outputs processed image data outside; and data buses 2072 which connect the input section 2040, the SVP 2014, the image memory 2050, and the output section 2070 with one another. Each of the data buses 2072 may, for example, be formed on one semiconductor chip.

The image processor of this example also includes: a program memory 2010 made of a RAM which holds a program for the SVP 2014; and an instruction generation circuit (IG) 2012 which retrieves instructions one by one from the program memory 2010 and supplies a control signal such as a microinstruction corresponding to the retrieved instruction to the SVP 2014. These components are provided to enable the SVP 2014 to operate as a single-instruction multiple-data (SIMD) type digital signal processing section.

The image processor further includes a timing control unit (TCU) 2074 serving as a control means which supplies necessary timing control signals to the input section 2040, the SVP 2014, the image memory 2050, the output section 2070, and the IG 2012.

The image processor also includes a ROM loader 2076 and an inter IC-bus ($I^2C$ bus) interface circuit 2078, which serve to distribute external program data to program data holding portions (memories, registers, etc.) disposed sporadically in the components of the image processor, i.e., the input section 2040, the SIMD type digital signal processing section (the program memory 2010, the IG 2012, and the SVP 2014), the image memory 2050, and the output section 2070, via an internal bus 2080. A clock circuit (not shown) composed of a PLL circuit, for example, for supplying necessary clocks to the respective components of the image processor is also included.

The program data holding portion of the SIMD type digital signal processing section is the program memory 2010. The $I^2C$ bus interface circuit 2078 is connected to an external controller (not shown) under the $I^2C$ bus standard, so as to receive program data from the controller by serial transmission, for example, and after converting the received data into parallel data, transfer a relevant portion of the converted program data to a designated destination (program data holding portion).

The ROM loader 2076 is connected to an external ROM (not shown). Upon receipt of a desired program number from the external controller via the $I^2C$ bus interface circuit 2078, the ROM loader 2076 reads data of a predetermined application program corresponding to the program number, and loads the data to the program data holding portions of the respective components. Although the external ROM is required for the ROM loader 2076, this data distribution method is advantageous in that the program data can be distributed in a significantly short time compared with the method where the program data is distributed to the respective portions by an external controller via the $I^2C$ bus interface circuit 2078.

Figure 8:
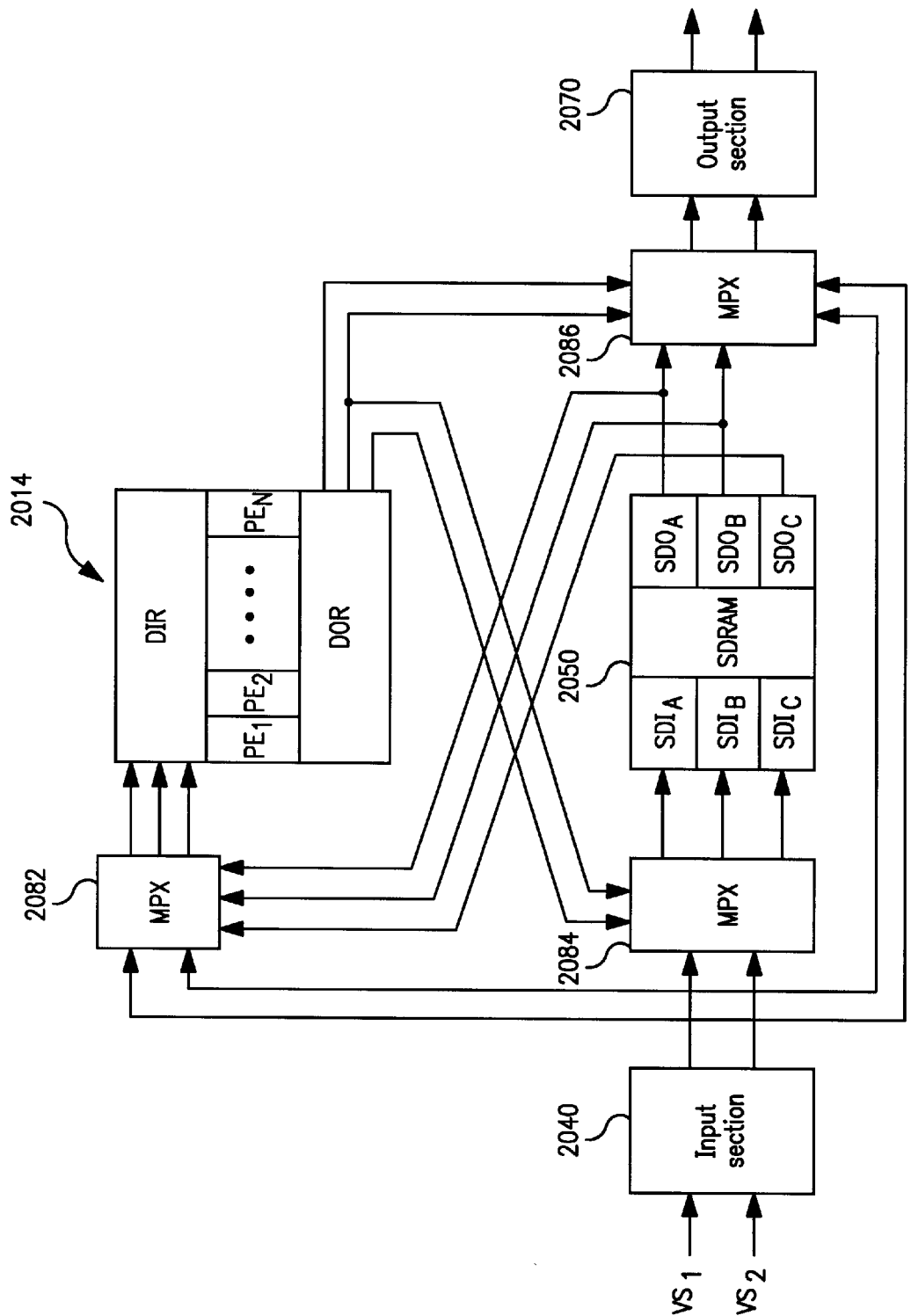
FIG. 8 is a block diagram illustrating an exemplary configuration of data buses of the image processor of Example 5.

FIG. 8 illustrates a concrete example of the data bus arrangement of the image processor shown in FIG. 7. As shown in FIG. 8, multiplexers 2082, 2084, and 2086 are disposed at stages preceding the input terminals of the SVP 2014, the image memory 2050, and the output section 2070, respectively.

In the illustrated example, the input section 2040 is configured to be able to receive up to two sets of 16-bit digital video signals, for example, simultaneously from outside as image data VS to be processed by the processor.

The SVP 2014 includes input ports for receiving up to three digital video signals (image data units) simultaneously and output ports for outputting up to three image data units simultaneously. The image memory 2050 includes three input ports/input buffers $SDI_A$, $SDI_B$, and $SDI_C$ for receiving up to three image data units simultaneously and three output ports/output buffers $SDO_A$, $SDO_B$, $SDO_C$ for outputting up to three image data units simultaneously.

Two-channel output ports of the input section 2040 are connected to input terminals of the first multiplexer 2082 and also connected to input terminals of the second multiplexer 2084. The first and second output ports of the three-channel output ports of the SVP 2014 are connected to the input terminals of the second multiplexer 2084, while the first and third output ports thereof are connected to input terminals of the third multiplexer 2086. The first, second, and third output ports of the three-channel output ports of the image memory 2050 are connected to the input terminals of the first multiplexer 2082, while the first and second output ports thereof are connected to the input terminals of the third multiplexer 2086.

The three-channel output terminals of the first multiplexer 2082 are connected to the input ports of the SVP 2014. The three-channel output terminals of the second multiplexer 2084 are connected to the input ports of the image memory 2050. The two-channel output terminals of the third multiplexer 2086 are connected to the input ports of the output section 2070.

With the data bus configuration described above, the input ports and the outputs ports of the SVP 2014 and the image memory 2050 are connected with each other in the crossing relationship via the multiplexers 2082 and 2084. The switching in each of the multiplexers 2082, 2084, and 2086 is controlled by a timing control signal supplied from the TCU 2074 (FIG. 7).

Figure 9:
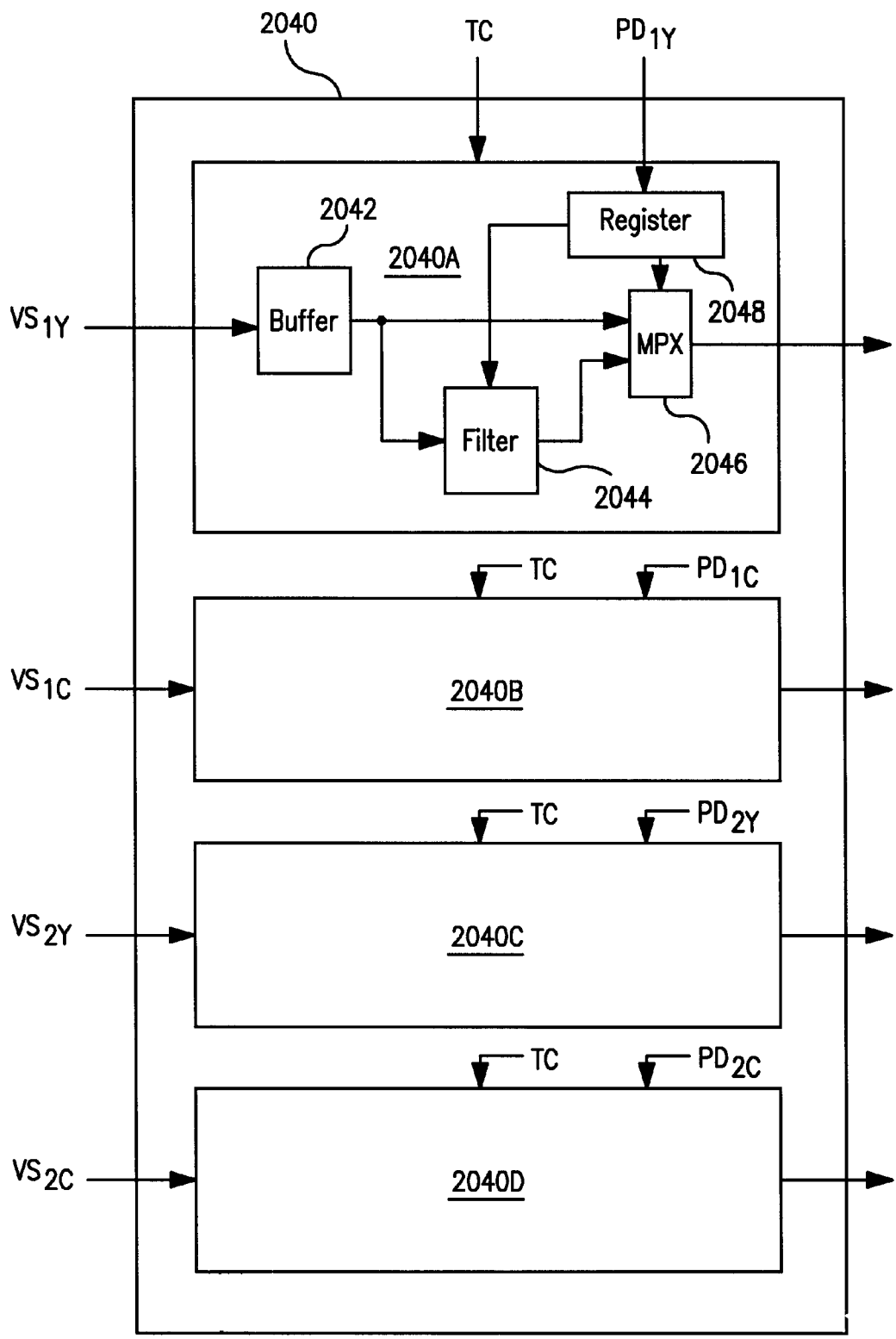
FIG. 9 is a block diagram illustrating an exemplary circuit configuration of an input section of the image processor of Example 5.

FIG. 9 illustrates an exemplary circuit configuration of the input section 2040. In the illustrated example, the input section 2040 includes four input portions 2040A, 2040B, 2040C, and 2040D corresponding to four signals $VS_{1Y}$, $VS_{1C}$, $VS_{2Y}$, $VS_{2C}$, i.e., a luminance signal (Y) and a color signal (C) for each of the two series of input video signals. Each input portion includes a buffer 2042, a filter 2044, a multiplexer 2046, and a setting value register 2048. Each input image data unit is first input into the buffer 2042. Then, the image data unit is supplied directly to the multiplexer 2046 to be output outside or sent to the filter 2044 to be subjected to low-pass filtering for band limit, for example, before being supplied to the multiplexer 2046 to be output outside, depending on the switching position of the multiplexer 2046.

The above switching of the multiplexer 2046 and the filtering of the filter 2044 are controlled by setting values (i.e., program data PD and a timing control signal TC supplied from the TCU 2074) loaded into the setting value register 2048 of the relevant input portion from the ROM loader 2076 of the I²C bus interface circuit 2078 via the internal bus 2080 as described above.

Referring back to FIGS. 7 and 8, the SVP 2014 includes a three-layer structure composed of a data input register (DIR) 2016, a processing portion 2018, and a data output register (DOR) 2020.

Figure 10:
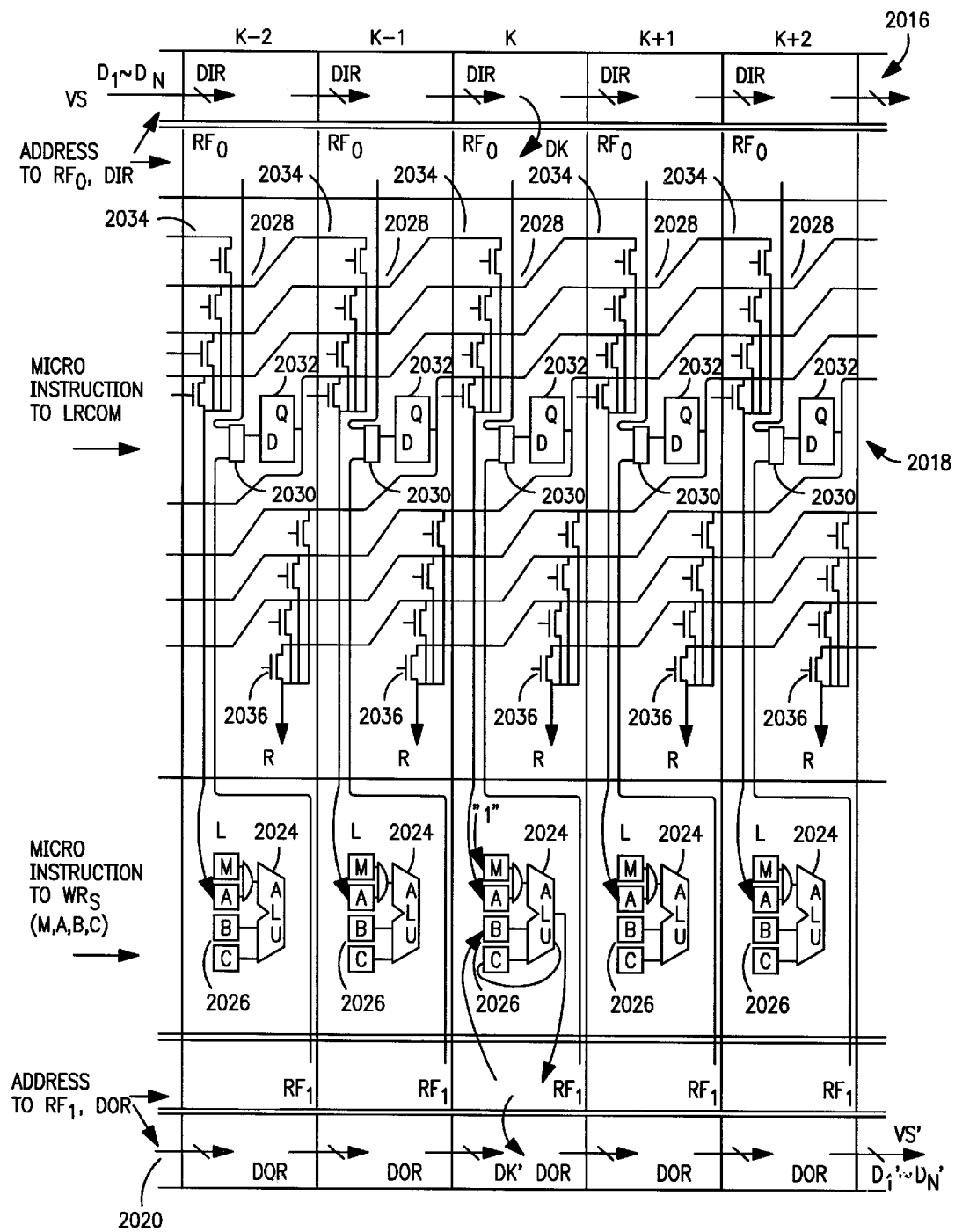
FIG. 10 is a block diagram illustrating an exemplary configuration of a scan video processor (SVP) of the image processor of Example 5.

FIG. 10 illustrates an exemplary internal configuration of the SVP 2014. The DIR 2016 operates in accordance with a timing control signal from the TCU 2074, a clock from the clock circuit, and an address (ADDRESS) from the IG 2012, and receives three channels (e.g., 48 bits) of image data units $D_1$ to $D_N$ for each scanning line repeatedly.

The processing portion 2018 is composed of processing elements $PE_1$ to $PE_N$ (FIG. 7) arranged in parallel, the number of which is equal to the number N of pixels connected to one horizontal scanning line (e.g., 864). The processing elements $PE_1$, $PE_2$, ..., $PE_N$ operate in parallel in accordance with the address (ADDRESS) and a microinstruction (MICROINSTRUCTION) from the IG 2012 and a clock from the clock circuit, and perform the same image processing operation for the corresponding pixel data units $D_1$, $D_2$, ..., $D_N$ within one horizontal scanning period.

The DOR 2020 operates in accordance with a control signal from the TCU 2074, a clock from the clock circuit, and an address (ADDRESS) from the IG 2012, and outputs data units of the operation results from the processing elements $PE_1$ to $PE_N$ as three channels at maximum of image data units $D_1'$ to $D_N'$ for each scanning line.

The clocks supplied to the DIR 2016, the processing portion 2018, and the DOR 2020 may be asynchronous from one another. Each of the data transfer from the DIR 2016 to the processing portion 2018 and the data transfer from the processing portion 2018 to the DOR 2020 is performed within one horizontal blanking period.

Thus, the data input, the parallel operation, and the data output for pixel data units corresponding to one horizontal scanning line are performed by the DIR 2016, the processing portion 2018, and the DOR 2020, respectively. Each of these processes are performed asynchronously and in parallel in a pipeline manner, to realize real-time image processing.

The operations of the respective portions of the SVP 2014 will be briefly described with reference to FIG. 10. As described above, the operations of the respective portions of the SVP 2014 are controlled by the addresses and microinstructions from the IG 2012, the timing control signal from the TCU 2074, the clocks from the clock circuits, and the like.

Referring to FIG. 10, the DIR 2016 has a memory capacity capable of storing up to three channels of the input image data units VS ($D_1$ to $D_N$) for one line, and is blocked for each pixel. During the transfer of the input image data units $D_1$ to $D_N$ inside the DIR 2016, the image data units $D_{K-2}$, $D_{K-1}$, $D_K$, $D_{K+1}$, $D_{K+2}$, ... are received by corresponding register groups of blocks K−2, K−1, K, K+1, K+2, ... of the DIR 2016 one by one.

Each processing element $PE_K$ of the processing portion 2018 includes: a pair of register files $RF_0$ and $RF_1$; a 1-bit arithmetic logic unit (ALU) 2024; a plurality of (e.g. four) working registers (WRs) (M, A, B, C) 2026; and a left/right (L/R) communication portion (LRCOM) 2028 which exchanges data with a plurality of left and right adjacent (e.g. four each) processing elements ($PE_{K-4}$, $PE_{K-3}$, $PE_{K-2}$, $PE_{K-1}$, $PE_{K+1}$, $PE_{K+2}$, $PE_{K+3}$, $PE_{K+4}$).

The register file $RF_0$ is connected to the register groups of the corresponding block of the DIR 2016, while the register file $RF_1$ is connected to register groups of the corresponding block of the DOR 2020. One-bit data read from one or both of the register files $RF_0$ and $RF_1$ is supplied to either of the working registers (M, A, B, C) 2026 and also supplied to the eight left and right adjacent processing elements ($PE_{K-4}$, $PE_{K-3}$, $PE_{K-2}$, $PE_{K-1}$, $PE_{K+1}$, $PE_{K+2}$, $PE_{K+3}$, $PE_{K+4}$) via a multiplexer 2030 and a latch circuit 2032 of the L/R communication portion 2028.

Simultaneously with the above operation, data units from the left and right adjacent processing elements ($PE_{K-4}$, $PE_{K-3}$, $PE_{K-2}$, $PE_{K-1}$, $PE_{K+1}$, $PE_{K+2}$, $PE_{K+3}$, $PE_{K+4}$) are supplied to multiplexers 2034 and 2036 of the L/R communication portion 2028 of the current processing element $PE_K$.

One of these data units is selected and input into one of the working registers (M, A, B, C) 2026. In FIG. 10, one of the data units from the left adjacent processing elements ($PE_{K-4}$, $PE_{K-3}$, $PE_{K-2}$, $PE_{K-1}$) is selected and input into the working register (A).

The ALU 2024 performs a predetermined operation for data supplied from the working registers (M, A, B, C) 2026 and outputs the operation results. Data of the operation results is written in either one of the register files $RF_0$ and $RF_1$. In general, data of the last operation result during each horizontal scanning period is written in the register file RF on the output side as the pixel data unit DK', and transferred from the register file RF to the register of the corresponding block of the DOR 2020 during the immediately following horizontal blanking period.

The DOR 2020 has a capacity corresponding to the number of channels, the number of bits, and the number of pixels of the output image data units $D_1'$ to $D_N'$, and is blocked for each pixel. The pixel data units VS' ($D_1'$ to $D_N'$) as the operation results are supplied from the processing portion 2018 to the blocks of the DOR 2020, and output sequentially from the blocks of the DOR 2020 during one horizontal scanning period, starting from the leftmost pixel data unit $D_1'$ followed by the subsequent pixel data units $D_2'$, $D_3'$, . . . in succession.

The register files $RF_0$ and $RF_1$ of the processing portion 2018 can accumulate the image data corresponding to one or two lines. This realizes the function of a line memory. The processing portion 2018 can also perform individual processing for a plurality of channels of image data units within one horizontal scanning period in a time-sharing manner.

Figure 11:
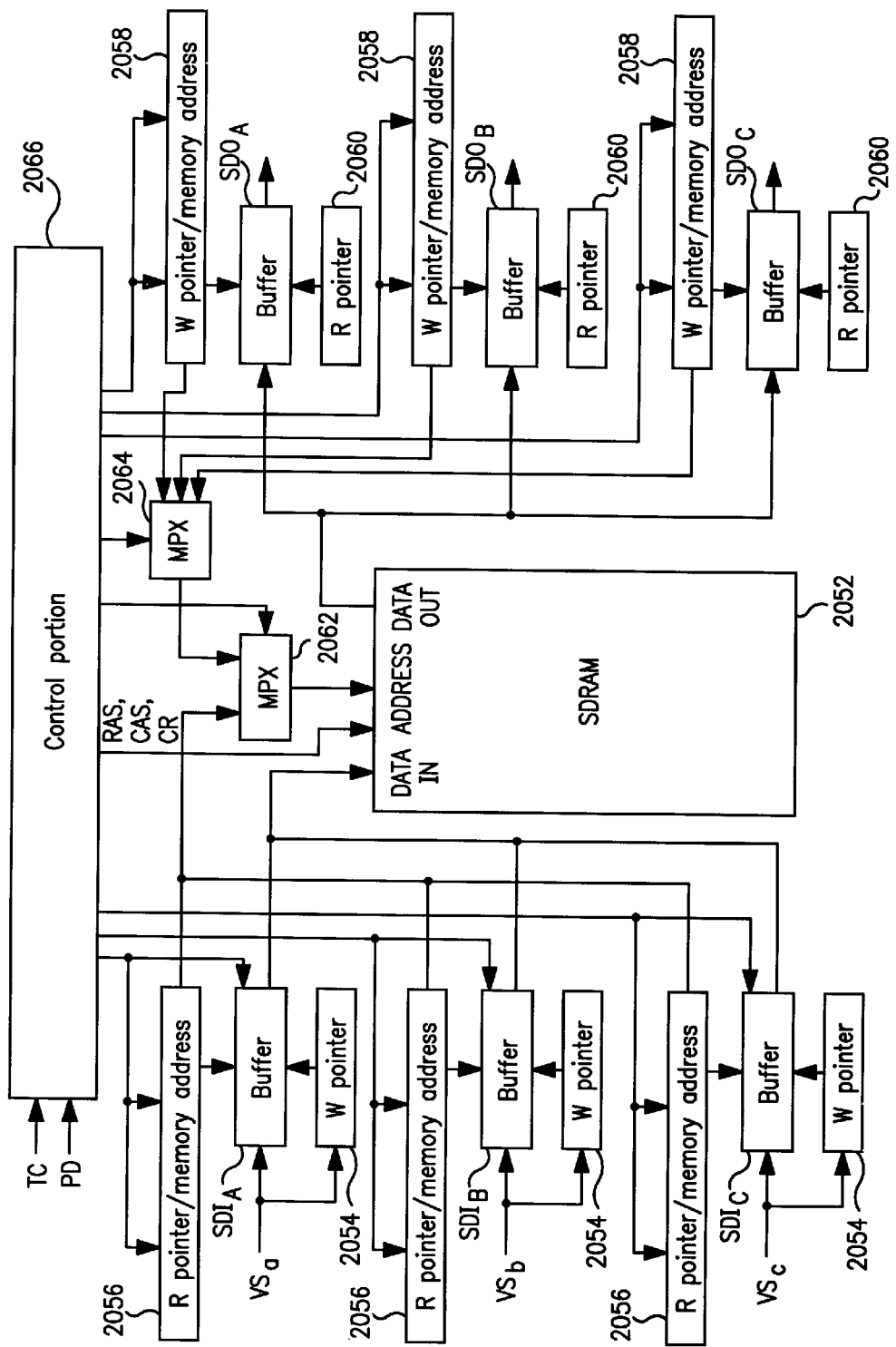
FIG. 11 is a block diagram illustrating an exemplary configuration of an image memory of the image processor of Example 5.

FIG. 11 illustrates a specific configuration of the image memory 2050 (FIG. 7). The illustrated image memory 2050 uses a synchronous dynamic random access memory (SDRAM) 2052 as a high-speed memory for temporarily storing image data. The SDRAM 2052 has a memory capacity of about 16M bits, for example, and includes a mapped memory region in a continuous address space. During memory accessing, a high-speed clock CK is supplied to the SDRAM 2052, in addition to an memory address and control signals (RAS, CAS), so that the SDRAM 2052 can performs data strobing at a timing of the clock CK.

The other portions of the image memory 2050 other than the SDRAM 2052 constitute an interface portion (SDRAM interface).

Each of the input buffers $SDI_A$, $SDI_B$, $SDI_C$ and the output buffers $SDO_A$, $SDO_B$, $SDO_C$ is provided with a write (W) pointer register 2054 or 2058 for supplying pointing information indicating a write address (position) in the buffer and a read (R) pointer register 2056 or 2060 for supplying pointing information indicating a read address (position) in the buffer. The read pointer register 2056 on the input side also has a write address generation function for SDRAM accessing. The write pointer register 2058 on the output side also has a read address generation function for SDRAM accessing.

The output terminals of the input buffers $SDI_A$, $SDI_B$, and $SDI_C$ are connected to a data input terminal of the SDRAM 2052. SDRAM addresses generated by the read pointer registers 2056 on the input side are supplied to an address terminal of the SDRAM 2052 via a multiplexer 2062. SRAM addresses generated by the write pointer registers 2058 on the output side are supplied to the address terminal of the SDRAM 2052 via a multiplexer 2064 and the multiplexer 2062.

A control portion 2066 includes a setting value register which receives program data for defining the operation mode of the image memory 2050 from the ROM loader 2076 or from an external controller via the $I^2C$ interface circuit 2078 and holds the program data therein (FIG. 7). The control portion 2066, serving as a means for controlling the input buffers and the output buffers, controls the operations of the buffers and the pointer registers on the input and output sides, the switching of the multiplexers 2062 and 2064, and the memory accessing to the SDRAM 2052 in accordance with the program data stored in the setting value register thereof and various timing control signals from the TCU 2074.

Each of the input buffers $SDI_A$, $SDI_B$, and $SDI_C$ has a memory capacity corresponding to 128 pixels when the image data unit of one pixel is 16 bits, for example, and this memory capacity is divided into two portions, forming first and second input buffer portions.

Figure 12A:
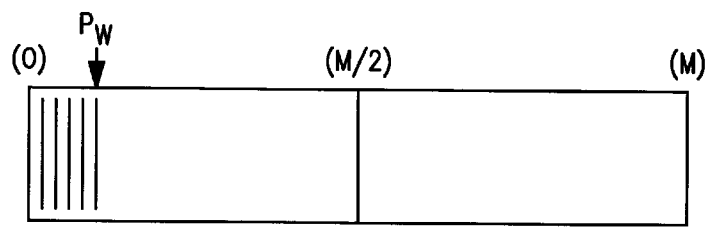
FIGS. 12A to 12E are views for describing the write/read operations of an input buffer of the image memory of the image processor of Example 5.

The write/read operations of the input buffers $SDI_A$, $SDI_B$, and $SDI_C$ will be described with reference to FIGS. 12A to 12E. First, data is sequentially written in the first (left) input buffer portion starting from a head address (FIG. 12A). A write pointer $P_W$ increments in accordance with a clock synchronized with the input image data VS (FIG. 11).

Figure 12B:
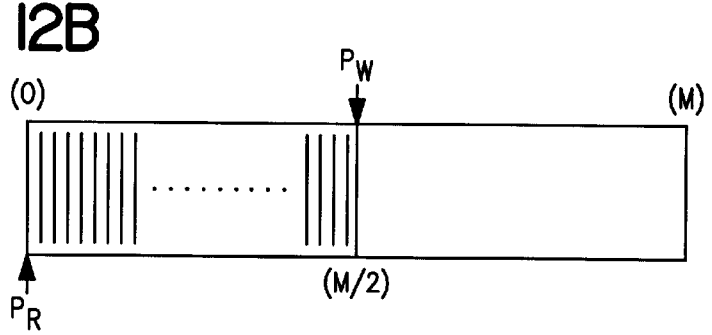

Once the first input buffer portion is filled with the input image data, the write pointer $P_W$ points to the head address of the second (right) input buffer portion which is vacant. Upon start of the writing of the input image data into the second input buffer portion, a read pointer $P_R$ points to the head address of the first input buffer portion, starting the read of the input image data from the first input buffer portion (FIG. 12B).

The image data read from the input buffer is supplied to the data input terminal of the SDRAM 2052. The memory address generated by the address generation function of the read pointer register 2056 is supplied to the address terminal of the SDRAM 2052 via the multiplexer 2062 simultaneously with the supply of the image data to the data input terminal of the SDRAM 2052. At the same time, the address value increments as the read pointer $P_R$ increments. The control portion 2066 selectively activates the read operations of the input buffers $SDI_A$, $SDI_B$, and $SDI_C$ by its arbitration function.

Figure 12C:
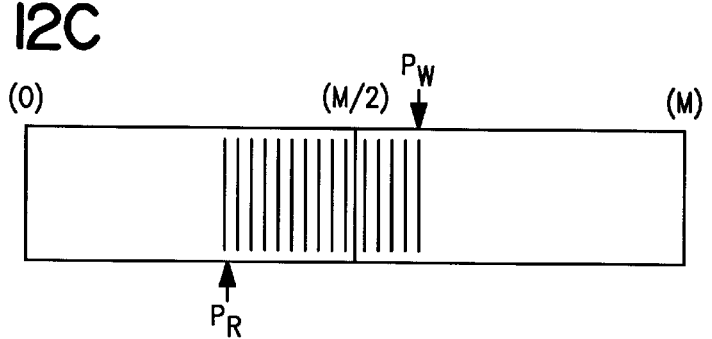

The read pointer $P_R$ is synchronous with a data write clock for the SDRAM 2052. While the transmission rate of normal image data is 10 MHz, the operation clock CK for the SDRAM 2052 is several times as high as the above rate, e.g., 80 MHz. In the input buffer, therefore, the read pointer $P_K$ increments several times as fast as the write pointer $P_W$. Thus, the reading is performed at a data rate several times as high as the writing (FIG. 12C).

Figure 12D:
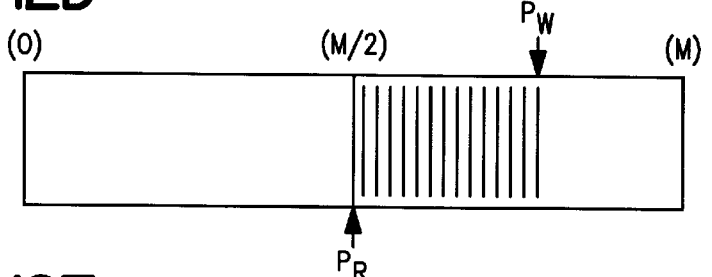
Figure 12E:
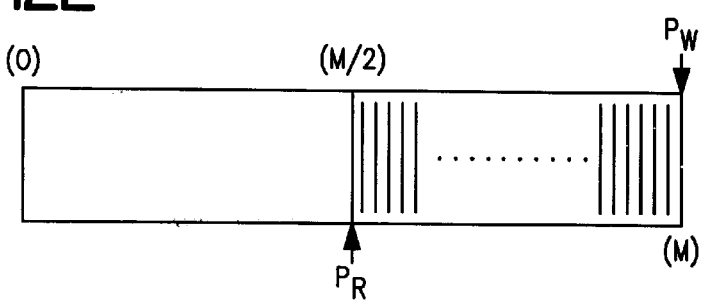

As a result, the reading from the first input buffer portion terminates before the completion of the writing into the second input buffer portion, and the read pointer $P_R$ stands by at the boundary position (FIG. 12D). Once the writing into the second input buffer portion is completed (FIG. 12E), the read pointer $P_R$ points to the head address of the second input buffer portion, starting the reading from the second input buffer portion. At this time, the write pointer $P_W$ returns to the head position of the first input buffer portion which is now vacant (in the state where all the image data has been read), and starts again the writing into the first input portion. In this way, the above procedure is repeated.

The read pointer $P_R$ is only required to read all data in the input buffer which is filled with the data. The order of the reading is not necessarily the same as that of the writing by the write pointer $P_W$. Incidentally, in the output buffers described hereinafter, the order of the writing by the write pointer $P_W$ follows the order of the reading by the read pointer $P_R$ in the input buffer.

In the image memory 2050 (FIG. 8), each of the output buffers $SDO_A$, $SDO_B$, and $SDO_C$ also has a memory capacity corresponding to 128 pixels, and the memory capacity is divided into two, forming first and second output buffer portions.

The write/read operations of the output buffers $SDO_A$, $SDO_B$, $SDO_C$ will be described with reference to FIGS. 13A to 13E. The operations of the output buffers are basically the same as those of the input buffers described above.

Figure 13A:
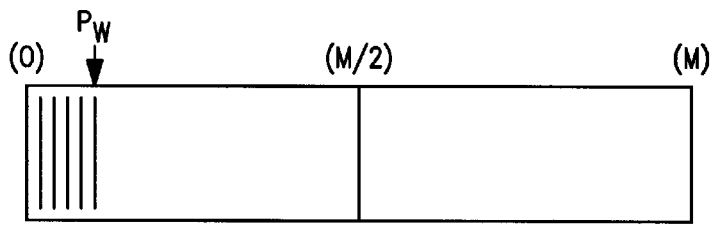
FIGS. 13A to 13E are views for describing the write/read operations of an output buffer of the image memory of the image processor of Example 5.

First, data is sequentially written in the first (left) output buffer portion starting from a head address (FIG. 13A). The data to be written is the image data read from the SDRAM 2052 (FIG. 11). The write pointer $P_W$ increments in synchronization with the high-speed clock CK for the SDRAM 2052.

The memory address generated by the address generation function of the write pointer register 2058 is supplied to the address terminal of the SDRAM 2052 via the multiplexers 2064 and 2062 in synchronization with a read clock of the SDRAM 2052. At the same time, the address value increments.

The control portion 2066 selectively activates the write operation of the output buffers $SDO_A$, $SDO_B$, $SDO_C$ (FIG. 8) by its arbitration function. The control portion 2066 also performs the arbitration between the write operation of the output buffers $SDO_A$, $SDO_B$, $SDO_C$ and the read operation of the input buffers $SDI_A$, $SDI_B$, $SDI_C$.

Figure 13B:
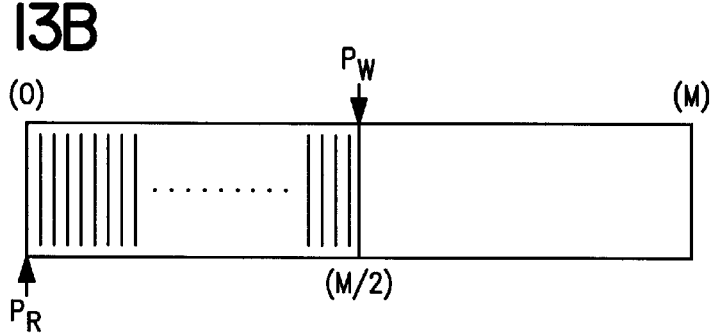

Once the first output buffer portion is filled with the output image data, the write pointer $P_W$ stands by at the termination position. Upon start of the reading from the output buffer, the read pointer $P_R$ points to the head address of the first output buffer portion, to perform the reading of the output image data from the first output buffer portion (FIG. 13B). At the same time, the writing of the output image data into the second output buffer portion is started. The read pointer $P_R$ increments in synchronization with a clock corresponding to the transmission rate of the image data set or selected by the control portion 2066, which is however lower than the rate of the write pointer $P_W$.

Figure 13C:
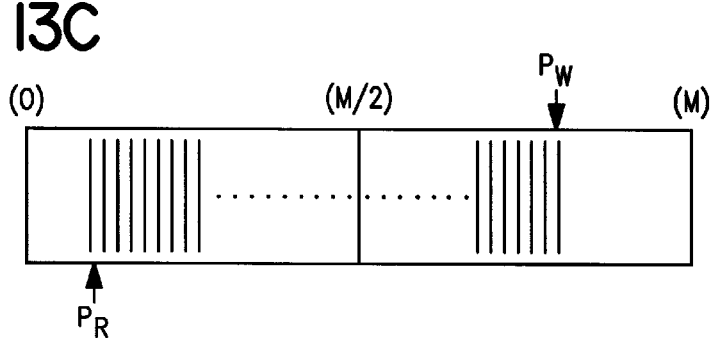
Figure 13D:
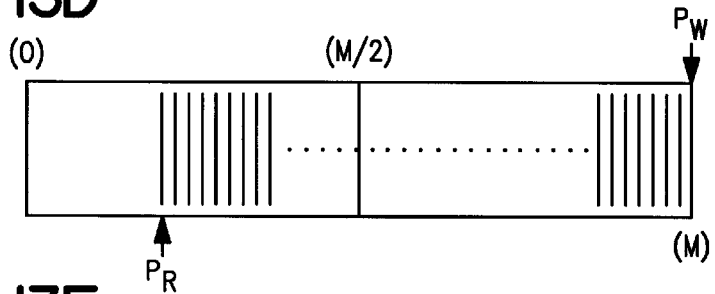
Figure 13E:
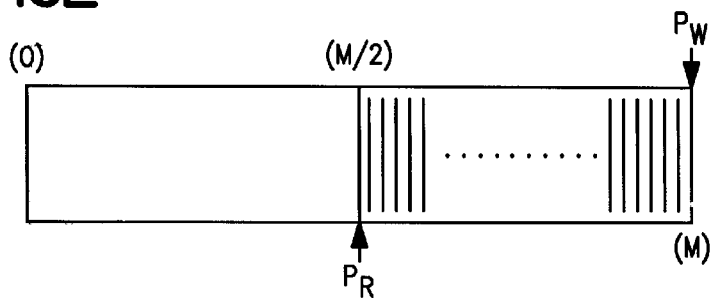

Accordingly, the writing into the second output buffer portion terminates before the completion of the reading from the first output buffer portion, and the write pointer $P_W$ stands by at the termination position (FIGS. 13C and 13D).

Once the reading from the first output buffer portion is completed (FIG. 13E), the read pointer $P_R$ points to the head address of the second output buffer portion, and starts the reading from the second output buffer portion. At this time, the write pointer $P_W$ returns to the head position of the first output buffer portion, and starts again the writing into the first output portion. In this way, the above procedure is repeated.

Thus, the image memory 2050 of this example can receive a plurality of channels of image data via the plurality of input ports or input buffers $SDI_A$, $SDI_B$, $SDI_C$ in parallel synchronously or asynchronously, and output a plurality of channels of image data via the plurality of output ports or output buffers $SDO_A$, $SDO_B$, $SDO_C$ in parallel synchronously or asynchronously.

In the image memory 2050, a single interface portion, in particular, the control portion 2066 efficiently controls under a unified management the exchanges of the image data between the input buffers $SDI_A$, $SDI_B$, $SDI_C$ and the common SDRAM 2052 and between the SDRAM 2052 and the output buffers $SDO_A$, $SDO_B$, $SDO_C$ in synchronization with the high-speed clock CK.

The image processor of this example can be constructed on a single semiconductor chip. Even when the SDRAM 2052 is externally mounted, the required number of terminal pins can be small, realizing a reduction of the device size.

Since the plurality of input/output ports are provided with the plurality of write pointers/read pointers and the relationships between the pointers can be programmably set, a variety of memory functions can be realized.

For example, as discussed below with respect to FIG. 14, one channel of image data may be written into the SDRAM 2052 via one input buffer, e.g. the input buffer $SDI_A$, and the image data written into the SDRAM 2052 may be read via the first and second output buffers $SDO_A$ and $SDO_B$ in parallel by using a time delay of a predetermined delay time. With this operation, the image data delayed by one field and the image data delayed by two fields can be obtained simultaneously.

Figure 14:
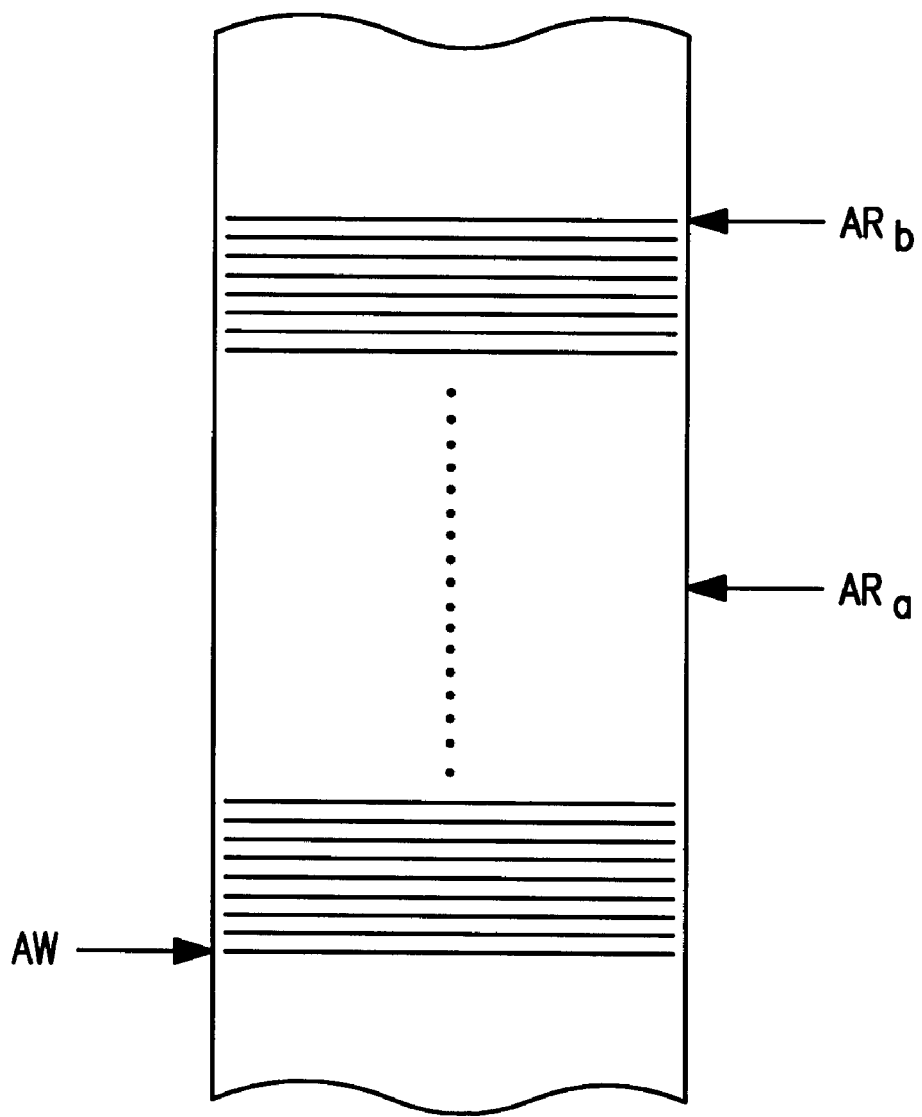
FIG. 14 is a view illustrating an exemplary pointer control in the image memory of the image processor of Example 5.

Referring to FIG. 14, a write address (pointer) AW of the SDRAM 2052 corresponds to the read pointer $P_R$ of the input buffer, and two read addresses (pointers) $AR_a$ and $AR_b$ correspond the write pointers $P_W$ of the output buffers $SDO_A$ and $SDO_B$.

In this example, the SDRAM 2052 is used for the image memory 2050. Any other memory which has the equivalent memory function may also be used. For example, Rambus memories may be used. Alternatively, the image memory 2050 may be composed of a plurality of memory chips.

Figure 15:
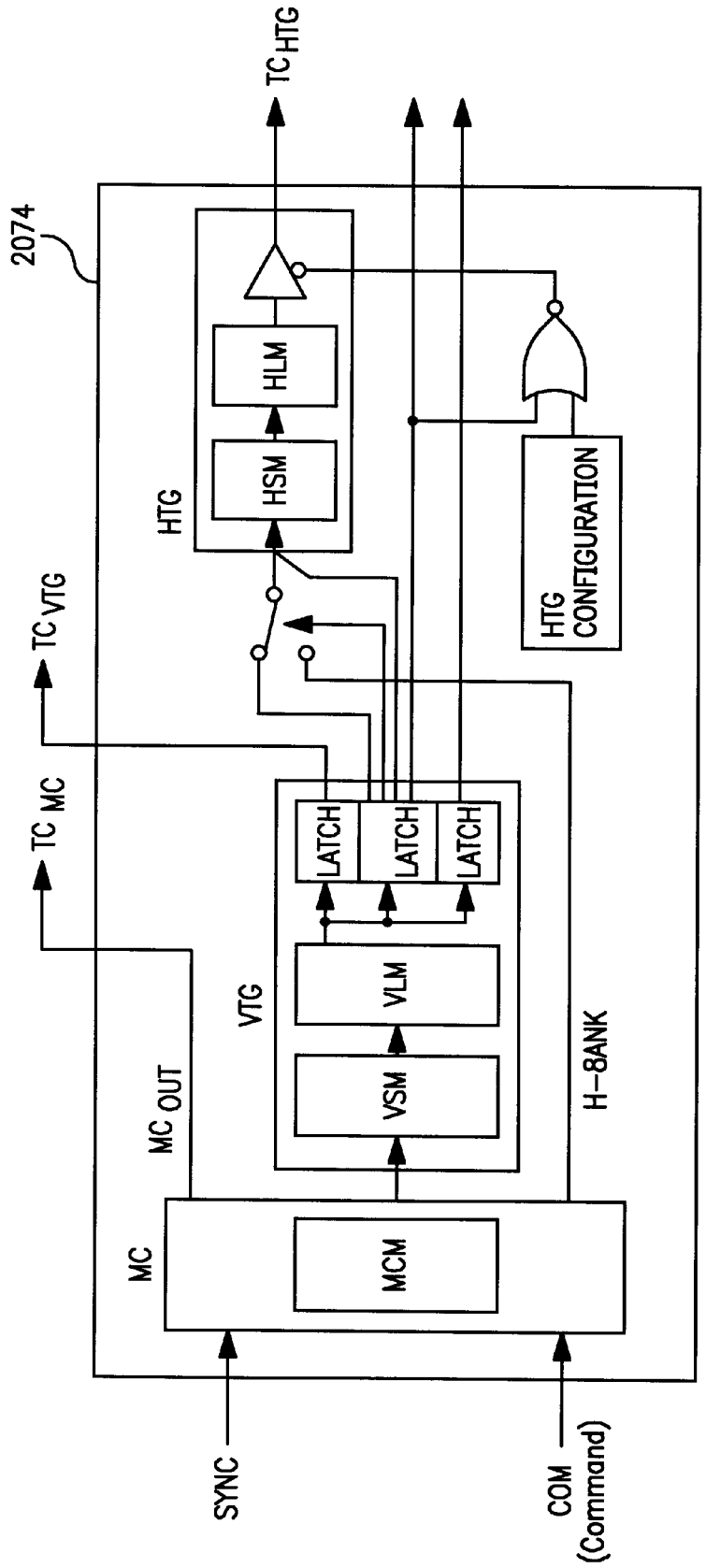
FIG. 15 is a block diagram illustrating an exemplary configuration of a timing control unit of the image processor of Example 5.

FIG. 15 illustrates a specific configuration of the TCU 2074. The illustrated TCU 2074 includes a main control portion MC, a vertical timing operation portion VTG, and a horizontal timing generation portion HTG. The TCU 2074 with the above configuration supplies timing control signals TC to the respective portions of the image processor shown in FIG. 7, i.e., the input section 2040, the SIMD type digital signal processing section (2010, 2012, 2014), the image memory 2050, the output section 2070, the data buses 2072 (the multiplexers 2082, 2084, and 2086), and the like in accordance with a vertical synchronous signal, a horizontal synchronous signal, and a pixel clock extracted from the video signals (the image data VS) input into the input section 2040.

The main control portion MC includes a program counter, a program memory, a control logic, and the like. The main control portion MC generates a frame-base timing control signal $TC_{MC}$ in accordance with the vertical synchronous signal, and controls the vertical timing generation portion VTG and the horizontal timing generation portion HTG of the TCU 2074. The vertical timing generation portion VTG includes a sequence memory VSM and a loop memory VLM, and generates a line-base timing control signal $TC_{VTG}$ and an internal control signal in accordance with the horizontal synchronous signal. The horizontal timing generation portion HTG includes a sequence memory HSM and a loop memory HLM, and generates a pixel-base timing control signal $TC_{HTG}$ in accordance with the pixel clock.

Various types of program data supplied from the ROM loader 2076 or the $I_2C$ interface circuit 2078 via the internal bus are stored in various memories such as the program memory and the sequence memories in the main control portion MC, the vertical timing generation portion VTG, and the horizontal timing generation portion HTG.

The output section 2070 is composed of the output buffers, circuits for inserting blanking signals into the output image data, and the like. The function of the output section 2070 is also controlled by the program data supplied from the ROM leader 2076 or the I²C interface circuit 2078 via the internal bus and the timing control signal TC from the TCU 2074.

Hereinbelow, the overall operation of the image processor with the above configuration will be described.

Figure 16:
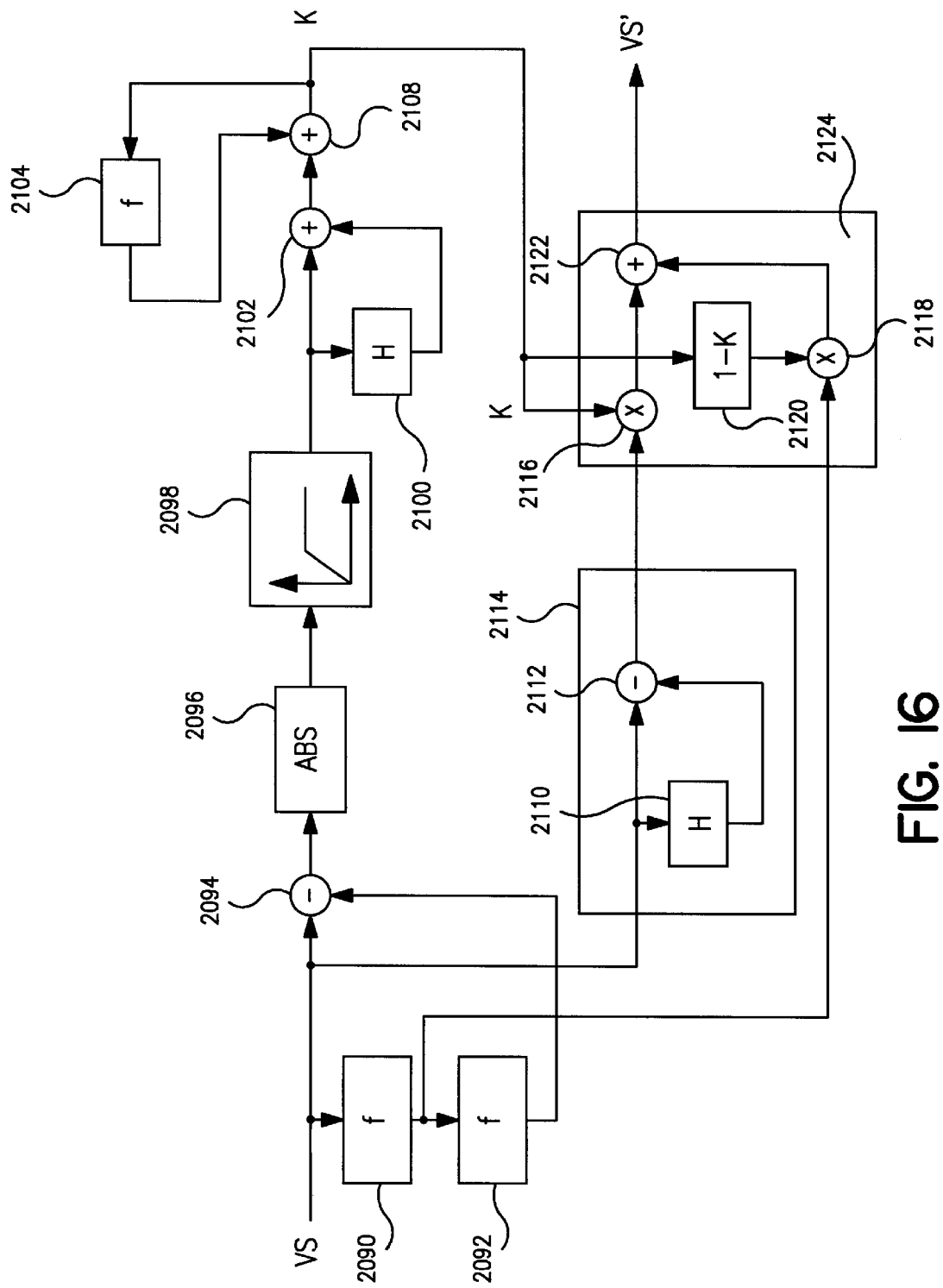
FIG. 16 is a block diagram illustrating a functional configuration of a moving-image real-time processing system which can be realized by the image processor of Example 5.

FIG. 16 is a functional block diagram of an exemplary moving-image real-time processing system for illustrating the moving-image real-time processing to be performed by the image processor of this example.

In the illustrated moving-image real-time processing system, two field memories 2090 and 2092 at the input stage constitute one frame memory. A subtracter 2094 calculates a difference Δ between the input image data VS and image data output from the field memory 2092. The difference Δ is supplied to an absolute circuit (ABS) 2096 and then to a nonlinearization circuit 2098, so as to obtain a signal ΔS representing the degree of the change of the current screen from a screen preceding one frame for each pixel.

The signal ΔS is then supplied to an averaging circuit in the two-dimensional direction composed of a line memory 2100 and an adder 2102 and then to an averaging circuit in the time-axis direction composed of a field memory 2104 and an adder 2108. These two averaging circuits constitute a three-dimensional low-pass filtering portion, where noise is removed and a motion detection signal K (0≦K≦1) is obtained.

On the other hand, the input image data VS is supplied to a moving-image processing portion 2114, i.e., an averaging circuit in the vertical direction composed of a line memory 2110 and an adder 2112, to perform a moving-image processing. A mixing circuit 2124 for motion compensation composed of multipliers 2116 and 2118, a coefficient converter 2120, and an adder 2122 is disposed at the subsequent stage of the moving-image processing portion 2114.

The motion detection amount if maximum when the motion detection signal K is 1. In such a case, the image data from the moving-image processing portion 2114 is output through the multiplier 2116 and the adder 2122 without any processing. At this time, the image data delayed by one field supplied from the field memory 2090 is blocked at the multiplier 2118.

Conversely, the motion detection amount is minimum when the motion detection signal K is 0. In such a case, the image data from the moving-image processing portion 2114 is blocked at the multiplier 2116, and the image data delayed by one field from the field memory 2090 is output through the multiplier 2118 and the adder 2122 as still-image processed image data.

When the motion detection signal K is a value between 0 and 1, the image data from the moving-image processing portion 2114 and the image data delayed by one field from the field memory 2090 are mixed with a weighting corresponding to the value, and averaged image data is output.

In order to realize the moving-image real-time processing system as described above, the respective portions of the image processor perform the following processing and operations.

First, the function of the field memories 2090 and 2092 at the input stage is realized by the image memory 2050 by being controlled as described above with reference to FIG. 14. More specifically, the input into the field memory 2090 is realized via the first input buffer $SDI_A$, for example, while the outputs from the field memories 2090 and 2092 are realized via the first and second output buffers $SDO_A$ and $SDO_B$.

The processing by the subtracter 2094, the absolute circuit 2096, and the nonlinearization circuit 2098 are performed by the SMID type digital signal processing section (2010, 2012, 2014). More specifically, the DIR 2016 of the SVP receives the input image data from the input section 2040 (FIG. 7) and the image data delayed by one frame from the image memory 2050 (frame memory 2090) simultaneously for each line by synchronizing the one-frame delayed image data with the input image data from the input section 2040. This synchronization can be realized by matching the timing of the reading from the output buffer SDO of the image memory 2050 with the input image data.

After the image data corresponding to one line has been input into the DIR 2016, the SVP 2014 (FIG. 7) performs all the processing by the portions 2094, 2096, 2098, 2100, 2102, 2108 of the system shown in FIG. 16 described above during the subsequent horizontal scanning period, and temporarily outputs data of the processing results, i.e., data of the motion detection signal K via one output port of the DOR 2020.

The field memory 2104 of the three-dimensional low-pass filtering portion is realized by the image memory 2050. Accordingly, the data of the motion detection signal K output from the SVP 2104 as described above is written in the SDRAM 2052 via the third input buffer $SDI_C$ of the image memory 2050, read after one field from the SDRAM 2052 via the third output buffer $SDO_C$, and input into the DIR 2016 of the SVP 2014.

The processing by the moving-image processing portion 2114 and the mixing circuit 2124 are also performed by the SVP 2014 within the same horizontal scanning period as the above-described processing by the three-dimensional low-pass filtering portion. More specifically, the SVP 2014 receives the image data delayed by one field from the first output port of the image memory 2050 at the third input port thereof. The processed image data VS' is then output from one output port of the DOR 2020 different from the one mentioned above to the output section 2070.

As described above, in the image processor of this example, while one channel or a plurality of channels of image data or other intermediate data is transferred a plurality of times mainly between the SVP 2014 and the image memory 2050 via the data buses 2072, the SVP 2014 performs required processing in accordance with the program stored in the program memory 2010. In this way, the image processor can realize the moving-image real-time processing system.

The number of field or frame memory functions can be increased by increasing the number of input ports (input buffers) and output ports (output buffers) of the image memory 2050. In this way, in the above-described moving-image real-time processing system, for example, a noise reduction function may be additionally provided by subjecting the image data output from the mixing circuit 2124 to a low-pass filter composed of a field memory.

Alternatively, by increasing the input/output data rates in the SVP 2014 and the image memory 2050, a plurality of series or a plurality of channels of image data or intermediate data may be input/output via a single port in a time-sharing manner within one unit period (e.g., one horizontal scanning period).

The above-described moving-image real-time processing is only an example. The image processor of the present invention can realize a variety of image processing depending on the programs installed therein from outside. Some of such processing will be described hereinbelow.

Figure 17:
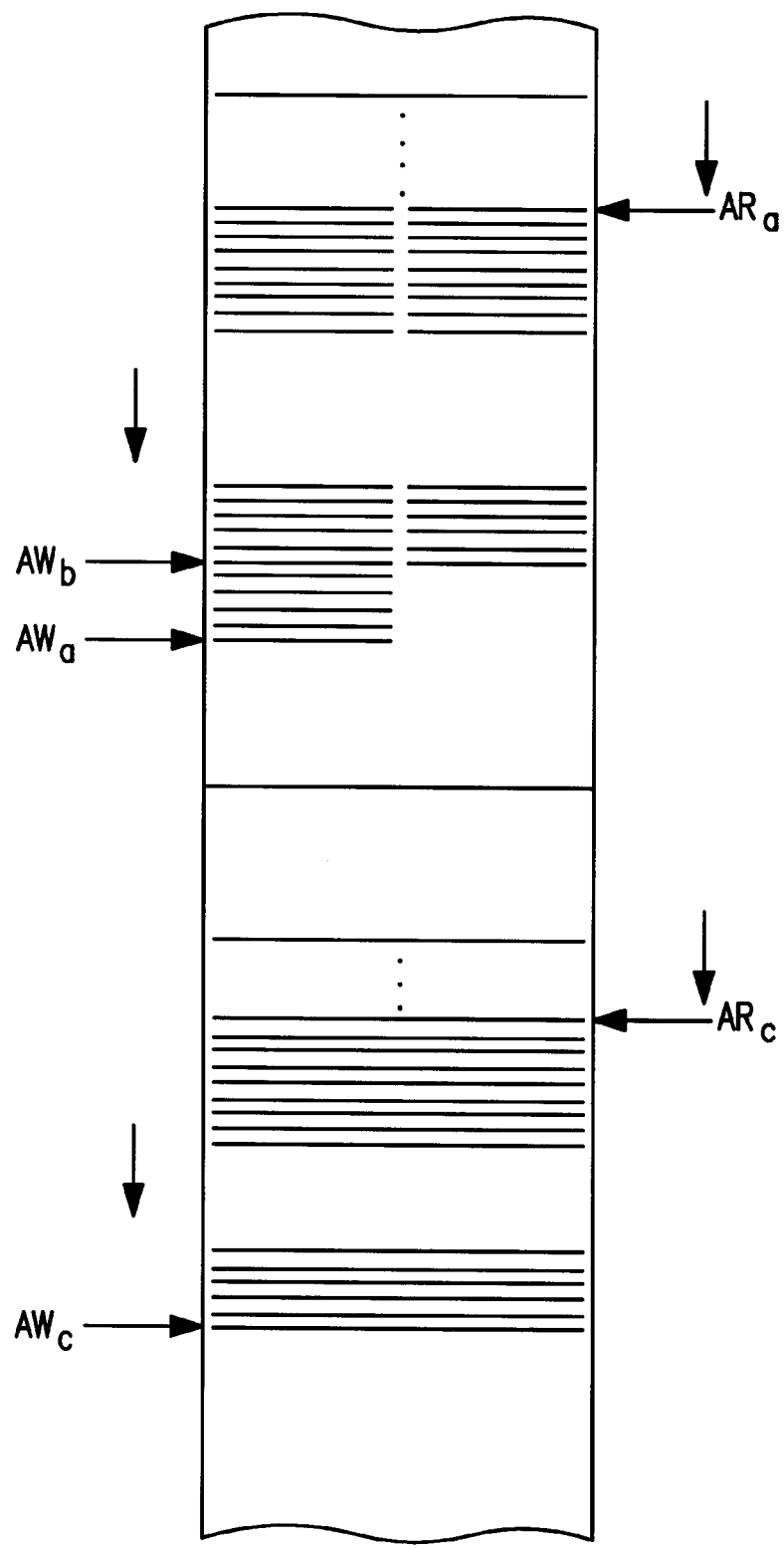
FIG. 17 is a view illustrating another exemplary pointer control in the image memory of the image processor of Example 5.

FIG. 17 illustrates a pointing control of the image memory 2050 (FIG. 8) for displaying different series or channels of images simultaneously by dividing the screen into two. In the illustrated example, the first channel of image data is compressed to be written into the left half of each line in the SDRAM 2052 using a first write pointer $AW_a$. At the same time, the second channel of image data is compressed to be written into the right half of each line using a second write pointer $AW_b$. These two channels of image data may be written asynchronously, but the head write positions of the fields should be matched with one another.

The image data written in the SDRAM 2052 in the above-described manner is read for each line after a delay of a predetermined time using a first read pointer $AR_a$, for example. The read image data is sent to a display device for screen display. As a result, an image corresponding to the first channel is displayed on the left half of the screen, while an image corresponding to the second channel is displayed on the right half of the screen. A large and small window display can also be realized in a similar manner.

As shown in FIG. 17, in parallel with the double-screen display processing as described above, an arbitrary memory function, e.g., a field or frame memory function may be provided by utilizing remained ports and memory regions of the image memory 2050 and using another pair of write/read pointers ($AW_c$ and $AR_c$).

When one set or a plurality of sets of pointing operations are to be performed in the image memory 2050 as described above, a predetermined amount of memory portion is allocated to each set, so that each pointer may be turned in a loop within the memory portion. This enables to form many independent memory portions in the memory region of the SDRAM 2052.

As another application, in the writing of image data into the image memory 2050, the image data corresponding to only a portion of pixels or scanning lines may be selectively written. This reduces the number of pixels and the number of scanning lines for each image. In this way, a contracted screen as shown in FIG. 18 can be produced. In this case, however, the rate of image data when it is read from the image memory 2050 must be made equal to that when it is written into the image memory 2050.

In the above decimation processing, in consideration of the reproducibility of the pattern of an image, the image data is preferably first supplied to the SVP 2014 (FIG. 8) first to be subjected to a low-pass filtering, and then written into the image memory 2050 in the above-described manner.

Alternatively, as shown in FIG. 19, in the reading of image data from the image memory 2050, the image data may be read intermittently with respect to a read clock CL for pixels or scanning lines. This enables to expand the space between pixels or scanning lines as shown in FIG. 20. In this case, the image data read from the image memory 2050 may be input into the SVP 2014 to perform horizontal and vertical interpolations, so that image data may be added or inserted to the positions of the pixels or scanning lines which had been skipped in the above intermittent reading, as shown by the dotted lines in FIG. 20.

Figure 21:
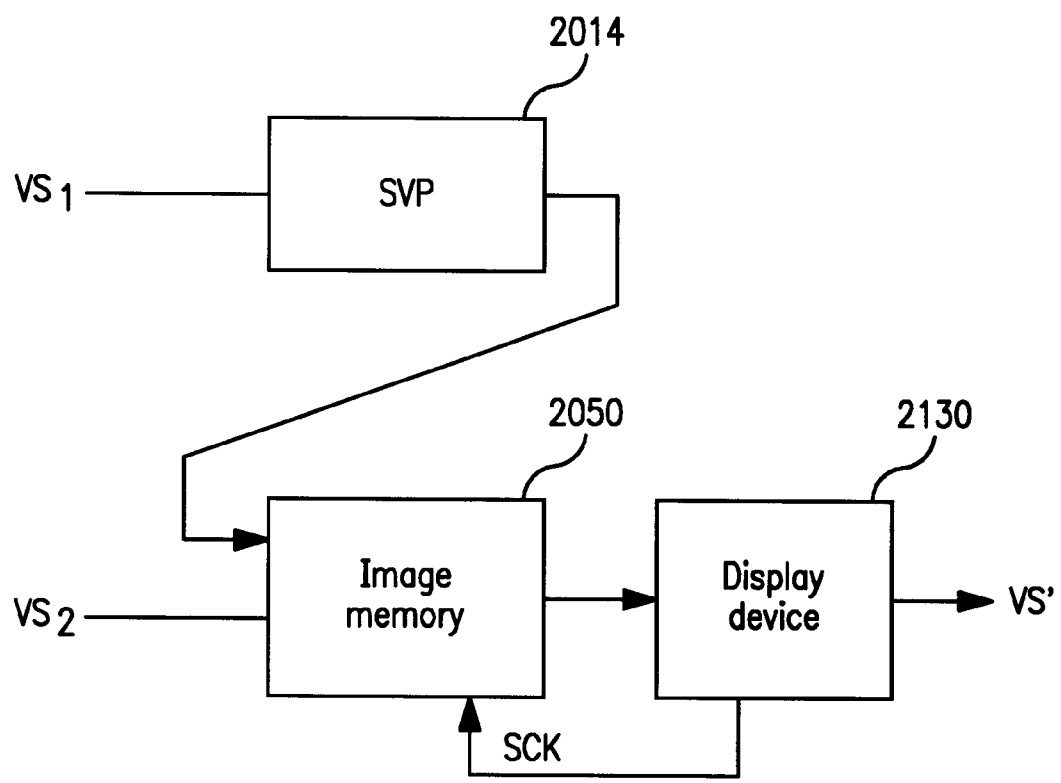
FIG. 21 is a block diagram illustrating one exemplary application of the image processor of Example 5.

As shown in FIG. 21, two series of asynchronous image data units $VS_1$ and $VS_2$ may be input into the SVP 2014 and the image memory 2050, respectively, and the image data units $VS_1$ and $VS_2$ may be read in synchronization with a synchronous signal other than synchronous signals for the image data units $VS_1$ and $VS_2$, for example, a synchronous signal on the side of a display device 2130. At this time, the image data units $VS_1$ and $VS_2$ may be read as image data for a double-screen synthesized display as shown in FIG. 17.

Figure 22:
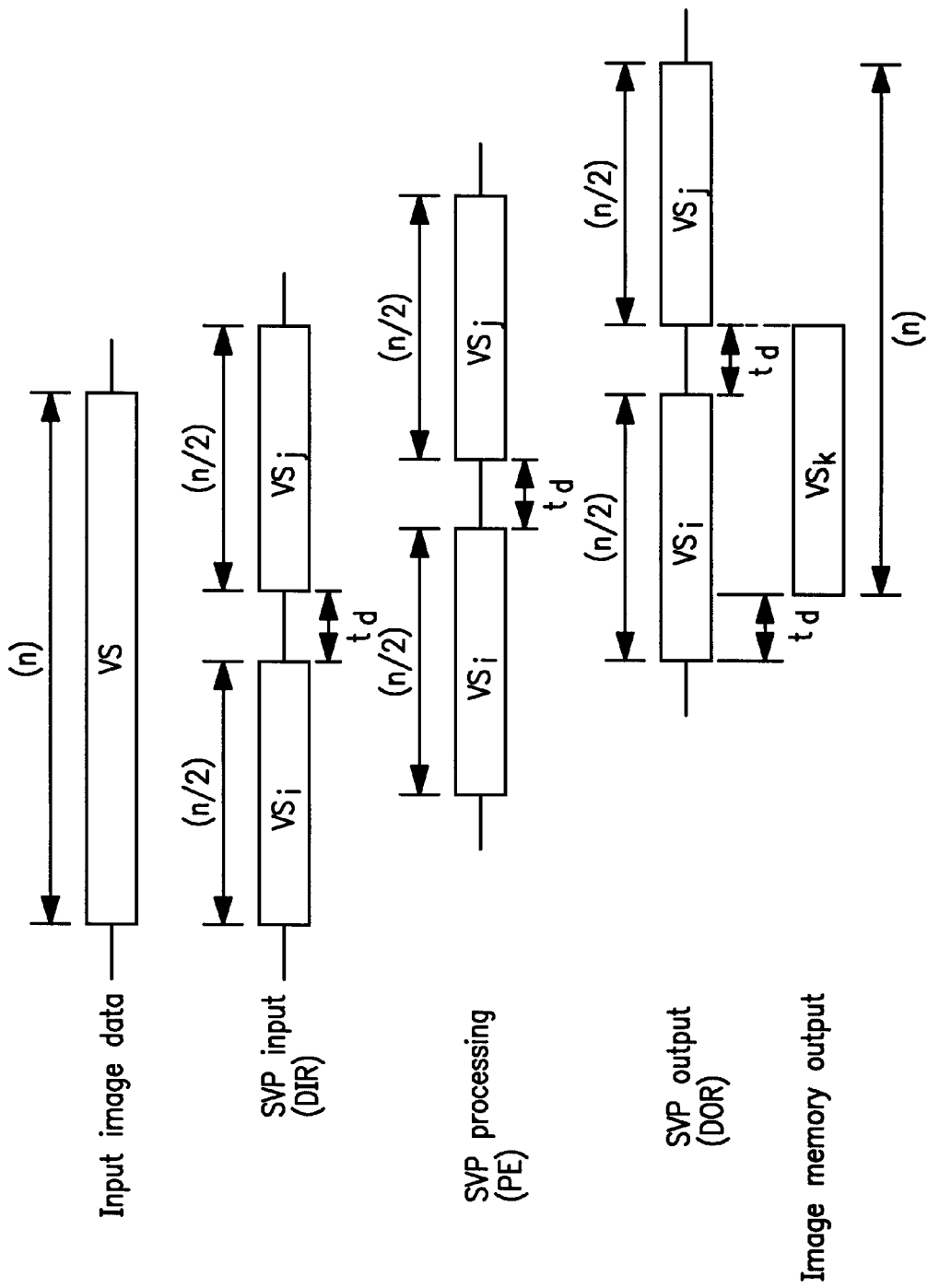
FIG. 22 is a timing chart for describing still another image processing method in the image processor of Example 5.
Figure 23:
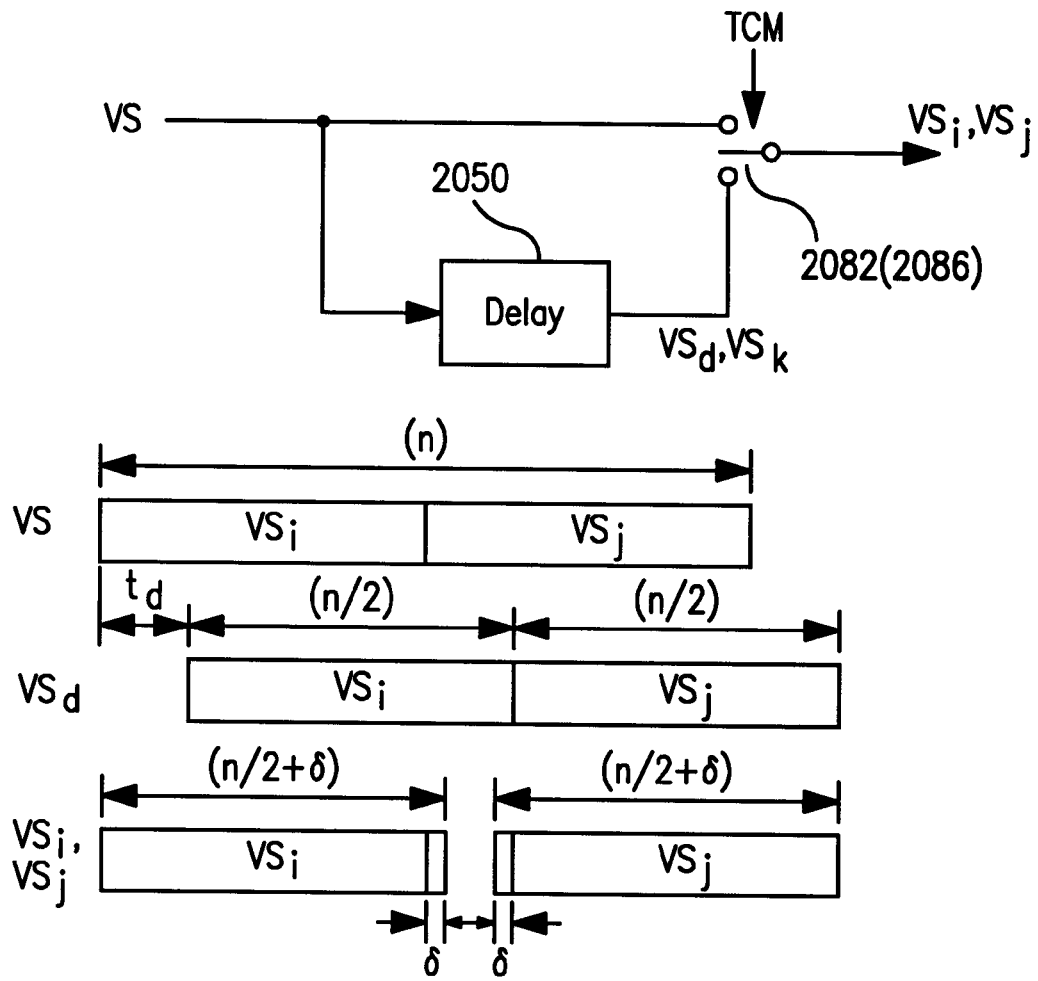
FIG. 23 is a view illustrating means and function for realizing the method of FIG. 22.

In the image processor in this example, when the number n of pixels per line of the input image data VS is remarkably larger than the number of pixels per line which can be processed at one time by the SVP 2014, i.e., when n=1600 the number N of processing elements PE=864, a method as shown in FIGS. 22 and 23 may be employed.

Conceptually, as shown in FIG. 22, the input image data VS is divided into two portions, a former half $VS_i$ and a latter half $VS_j$, with a time gap td of an appropriate amount (e.g., a gap corresponding to 100 pixels) interposed therebetween. The image data unit of each of the former half $VS_i$ and the latter half $VS_j$ is then sequentially input into the DIR 2016 (FIG. 7) of the SVP 2014 as a pixel data unit having n/2 (800) pixels per line.

The processing portion 2018 of the SVP 2014 allocates separate processing periods for the image data units of the former half $VS_i$ and the latter half $VS_j$, and performs the same processing repeatedly. The DOR 2020 outputs the processed image data unit in series.

In the output operation, the image data unit of the former half $VS_i$ is delayed by a time corresponding to the above time gap, while the image data unit of the latter half $VS_j$ is output without any delay from the same port of the output section 2070. As a result, the head of the image data unit of the latter half $VS_j$ comes in contact with the tail of the image data unit of the former half $VS_i$, so that the processing image data having n (1600) pixels per line which is the same as the original input image data VS is obtained.

As described above, one line may be divided into two for high-precision image data having a remarkably large number n of pixels per line.

In the above series of processing, the process of dividing the input image data VS into the former half $VS_i$ and the latter half $VS_j$ and forming the time gap td therebetween is performed by using the image memory 2050 and the multiplexer 2082 as a delay line as shown in FIG. 23.

More specifically, the input image data VS from the input section 2040 is directly sent to a first input terminal of the multiplexer 2082 (FIG. 8), and is simultaneously input into the image memory 2050. Delayed image data $VS_D$ delayed by a time corresponding to the fixed time gap td behind the input image data VS is output from one output port of the image memory 2050, to be sent to a second input terminal of the multiplexer 2082.

The multiplexer 2082 switches to the first input terminal for a predetermined time starting from the timing at the head of the input image data VS in accordance with a timing control $TC_M$ from the TCU 2074 (FIG. 7). Then, after a predetermined shut-off time, the multiplexer 2082 switches to the second input terminal. As a result, the input image data VS is divided into the former half $VS_i$ and the latter half $VS_j$ with the time gap td of a predetermined among therebetween, and supplied to the SVP 2014.

By providing the time gap td of an appropriate amount between the former half $VS_i$ and the latter half $VS_j$, the tail portion of the former half $VS_i$ and the head portion of the latter half $VS_j$ are prevented from interfering or colliding against each other. Thus, data is prevented from being lost.

As shown in FIG. 23, while securing the time gap td of an appropriate amount, preferably, a portion δ which overlaps the head portion of the latter half $VS_j$ by a predetermined number of pixels (e.g., 10 pixels) may be added to the tail of the former half $VS_i$, and a portion δ which overlaps the tail portion of the former half $VS_i$ by a predetermined number of pixels (e.g., 10 pixels) is added to the head of the latter half $VS_j$. These overlap portions are also input into the SVP 2014, so that the processing portion 2018 of the SVP 2014 can perform a high-precision processing for the tail portion of the former half $VS_i$ and the head portion of the latter half $VS_j$ as is performed for the intermediate portions.

The processing of making the head of the latter half $VS_j$ in contact with the tail of the former half $VS_i$ as the last output processing is performed by using the image memory 2050 and the multiplexer 2086 as the delay line in a configuration similar to that shown in FIG. 23.

The image processor of this example can realize image compression of the image data using the decimation function of the SVP 2014 or the image memory 2050 as described above. At this information compression, the input image data is first subjected to the low-pass filtering in the input section 2040 before being supplied to the SVP 2014 or the image memory 2050, so as to avoid a degradation in image quality such as a folding distortion caused by the information compression.

Figure 24:
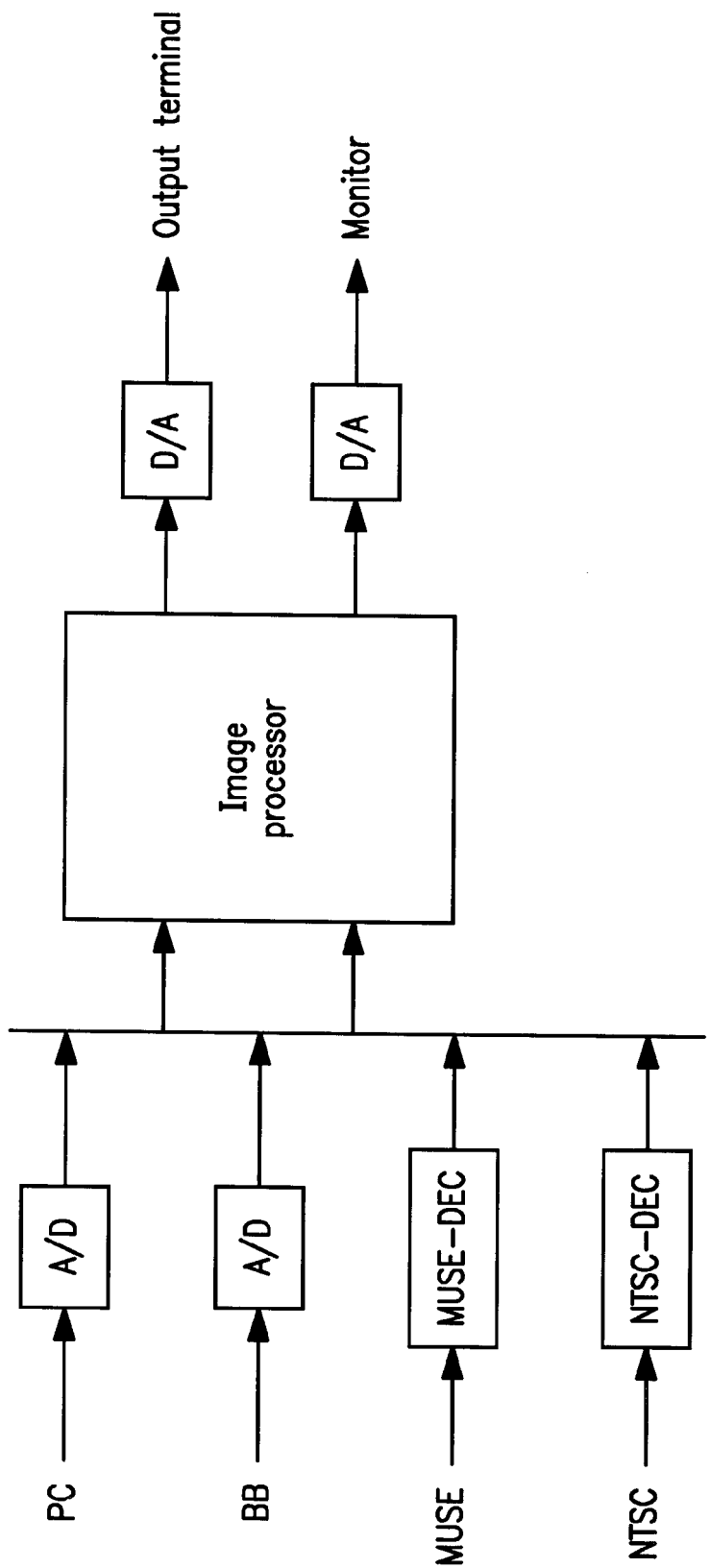
FIG. 24 is a block diagram illustrating a configuration of a main portion of a television receiver using the image processor of Example 5.

FIG. 24 illustrates an exemplary circuit configuration of a main portion of a television receiver which uses the image processor of this example.

The television receiver with the image processor of this example incorporated therein is adaptive to a variety of video signals such as a monitor output signal PC from a personal computer, a base-band signal BB from a VTR and the like, a high-definition signal MUSE, and an NTSC signal NTSC. For example, a variety of modes may be set, including a mode where the NTSC signal is displayed on a monitor after passing through a D/A converter and simultaneously another arbitrary video signal is output via a D/A converter and recorded to a VTR or the like, and a mode where the high-definition signal and the NTSC signal are synthesized to display both signals on a monitor. When one of these modes is selected, corresponding program data may be loaded in the respective sections of the image processor by a download method as described above.

Figure 25:
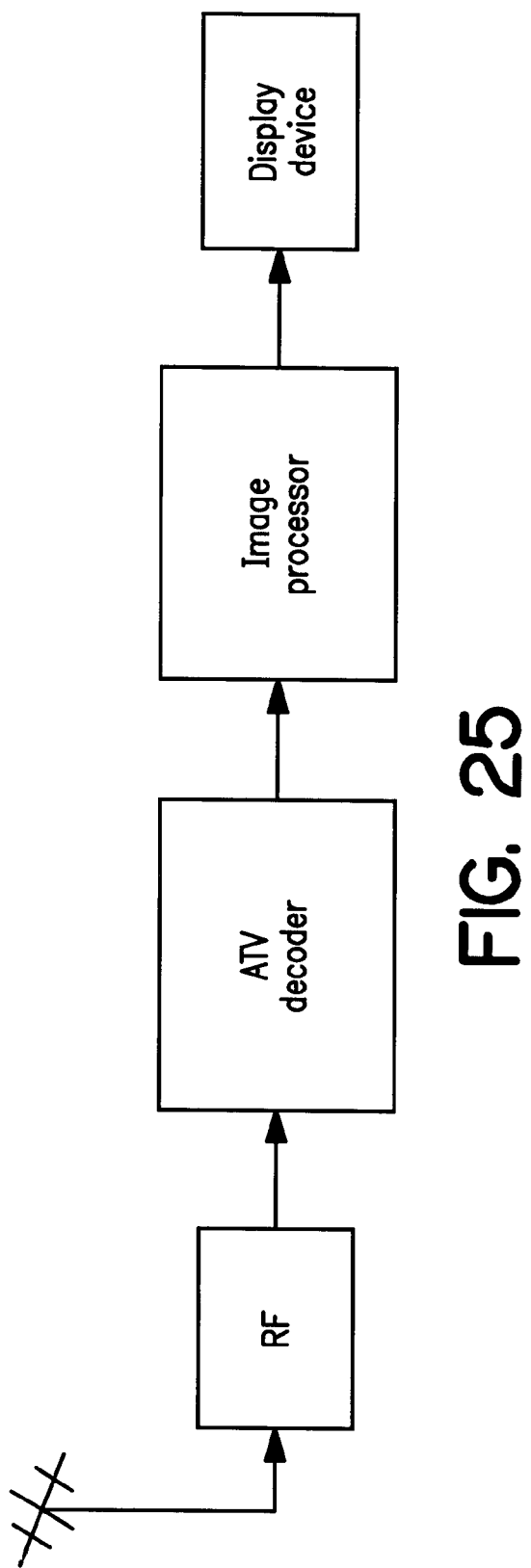
FIG. 25 is a block diagram illustrating a configuration of a main portion of another television receiver using the image processor of Example 5.
Figure 26:
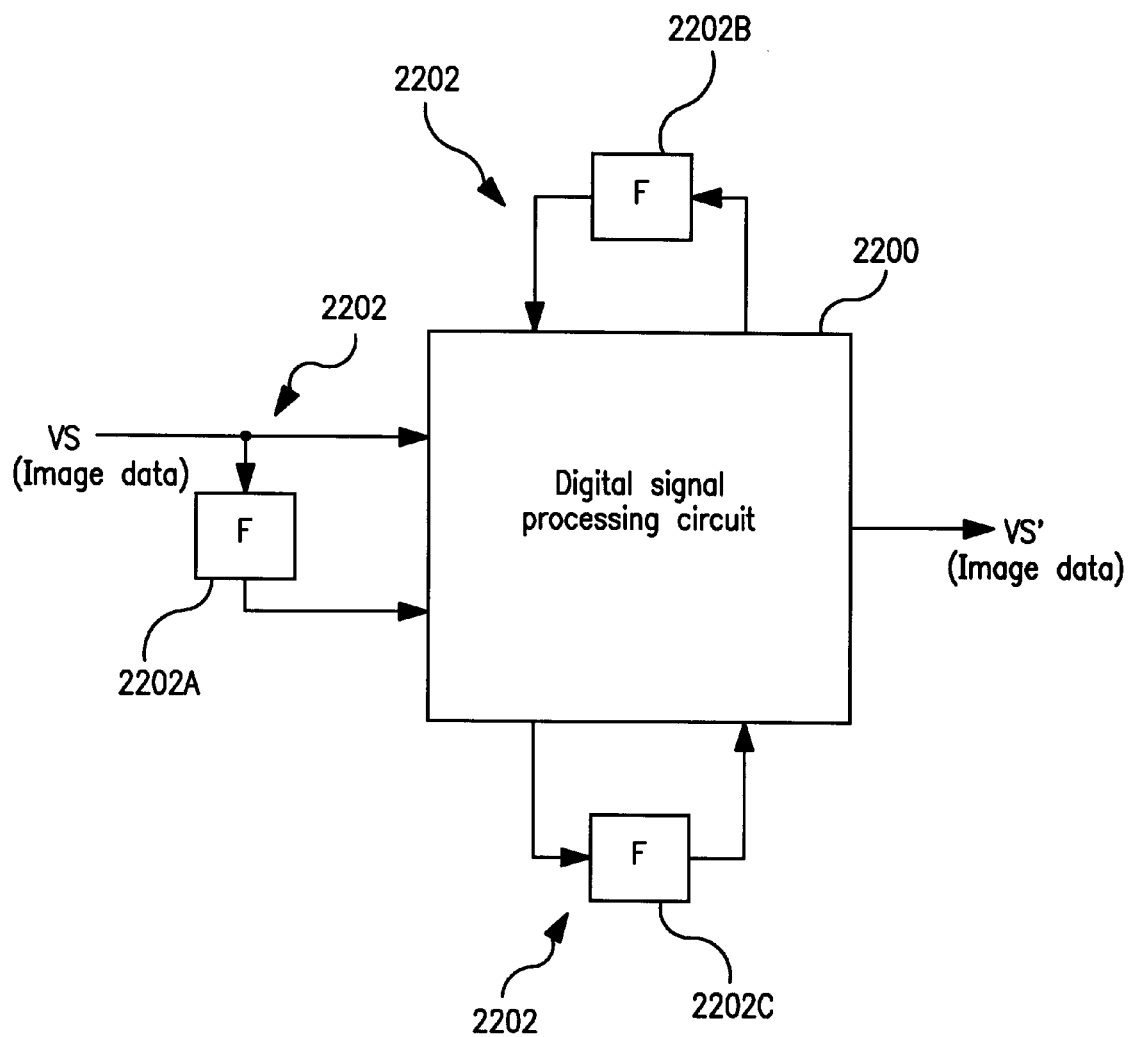
FIG. 26 is a block diagram illustrating a configuration of a conventional image processing device.

FIG. 25 illustrates an exemplary circuit configuration of another television receiver which uses the image processor of this example.

The television receiver includes a US standard advanced TV (ATV) decoder incorporated therein. This ATV decoder can decode input video signal transmitted under any of 18 types of display formats (e.g., 480 lines×640 pixels, 600 lines×800 pixels, and 768 lines×1024 pixels).

However, although a reproduced video signal having any of the 18 types of display formats is output from the ATV decoder, a display device incorporated in the television receiver (e.g., a CRT, an LCD, and a plasma display) is only allowed to display the image data under one type of format (e.g., 768 lines×1024 pixels).

The image processor of this example converts the reproduced video signal from the ATV decoder into a display format used by the display device before supplying the signal to the display device.

Thus, as described above, according to the image processing device of the present invention, the SIMD type digital signal processing section and the image memory which can perform the write operation and the read operation in parallel and independently are connected with each other via the data buses, so that the respective sections of the device can be programmably operated. Accordingly, the device can be adaptive to a variety of applications with a reduced-size circuit configuration. Further, the resources inside the device can be effectively utilized, to realize an effective high-level image processing.

EXAMPLE 6

Figure 27:
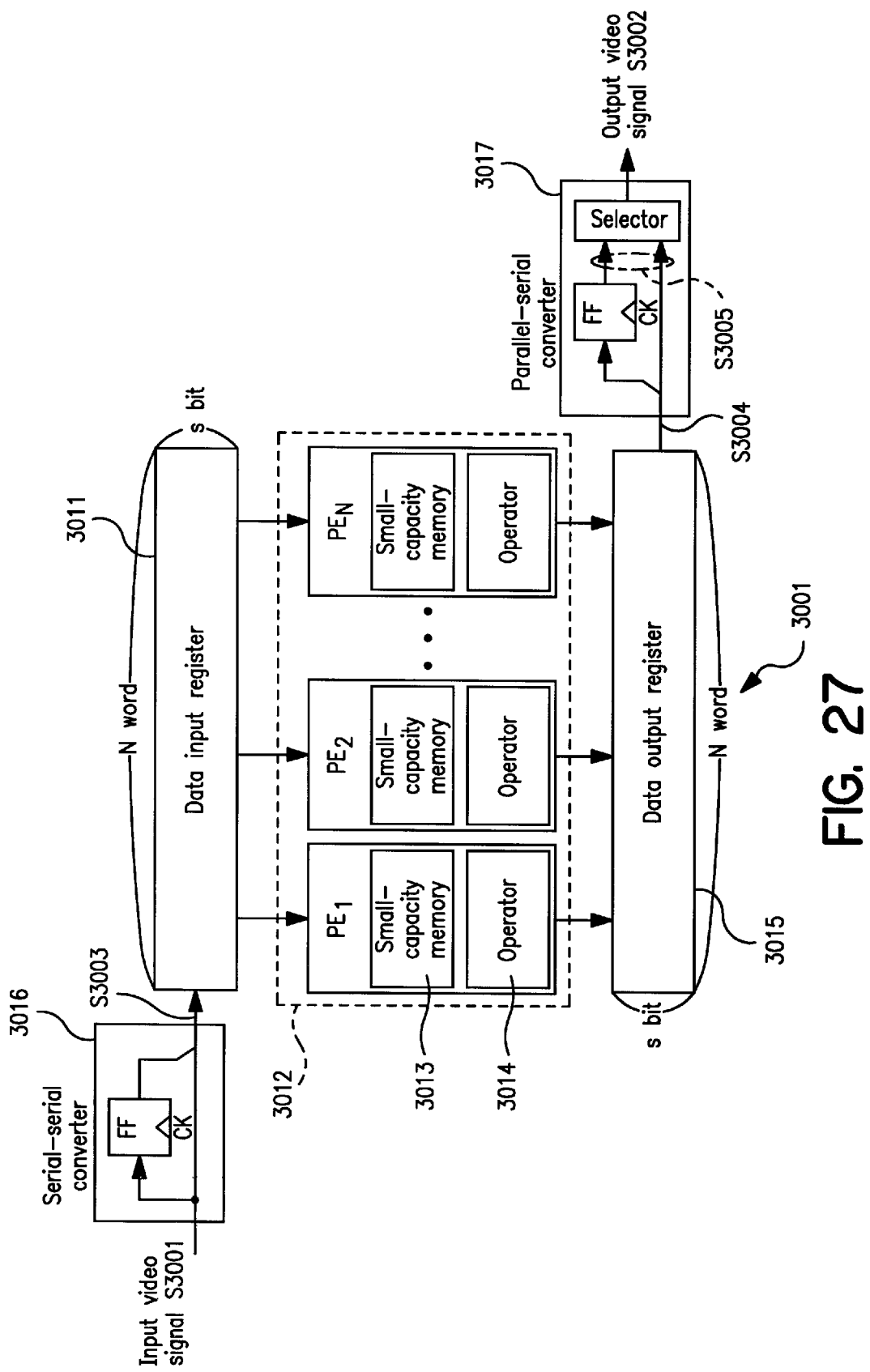
FIG. 27 is a block diagram illustrating a configuration of a video signal processor of Example 6 according to the present invention.

FIG. 27 illustrates a configuration of a video signal processor 3001 of Example 6 according to the present invention. The video signal processor 3001 includes a serial-parallel converter 3016, a data input register 3011, an operator 3012, a data output register 3015, and a parallel-serial converter 3017.

The serial-parallel converter 3016 receives a plurality of video data units corresponding to a plurality of effective pixels connected to one horizontal scanning line sent in series as an input video signal S3001. The serial-parallel converter 3016 converts the plurality of video data units into a plurality of video data sets. For example, the serial-parallel converter 3016 generates the video data sets by coupling the current video data unit among the plurality of video data units with a video data unit which has been delayed by a flipflop (FF) by one cycle of a video clock. In this case, when the bit width of the video data unit is eight bits, the bit width of the video data set is 16 (=8×2) bits. The current video data and the video data delayed by one cycle of the video clock constituting the video data set are input into the data input register 3011 in parallel, and a plurality of such video data sets are input into the data input register 3011 in series as a video signal S3003.

The data input register 3011 outputs the plurality of serially input video data sets in parallel. The data input register 3011 has a width of s bits and a depth of N words. The bit width s of the data input register 3011 needs to be n times or more as large as the bit width of the video data unit wherein n is an integer equal to or more than 2 representing the number of video data units included in the video data set. The value n also represents the degree of parallelism when a plurality of video data units are arranged in parallel.

The operator 3012 performs predetermined operations on the plurality of video data sets output from the data input register 3011 in parallel. The operator 3012 includes N processor elements $PE_1$ to $PE_N$. Each of the processor elements $PE_1$ to $PE_N$ includes a small-capacity memory 3013 which holds the input data and an operation result and an operating element 3014 which performs a predetermined signal processing operation.

The data output register 3015 outputs the plurality of video data sets processed by the operator 3012 in series. The data output register 3015 has a width of t bits and a depth of N words. The bit width t of the data output register 3015 needs to be n times or more as large as the bit width of the video data unit wherein n is an integer equal to or more than 2 representing the number of video data units included in the video data set.

The parallel-serial converter 3017 receives the plurality of video data sets output in series from the data output register 3015 as a video signal S3004, and converts the plurality of video data sets into a plurality of video data units. For example, the parallel-serial converter 3017 converts the plurality of video data sets into a plurality of video data units by alternately selecting the current video data units and the video data units delayed by one cycle of the video clock included in the plurality of video data sets. The plurality of video data units are output in series as an output video signal S3002.

Hereinbelow, the operation of the video signal processor 3001 will be described, taking the LPF (low-pass filtering) processing as an example.

Figure 28:
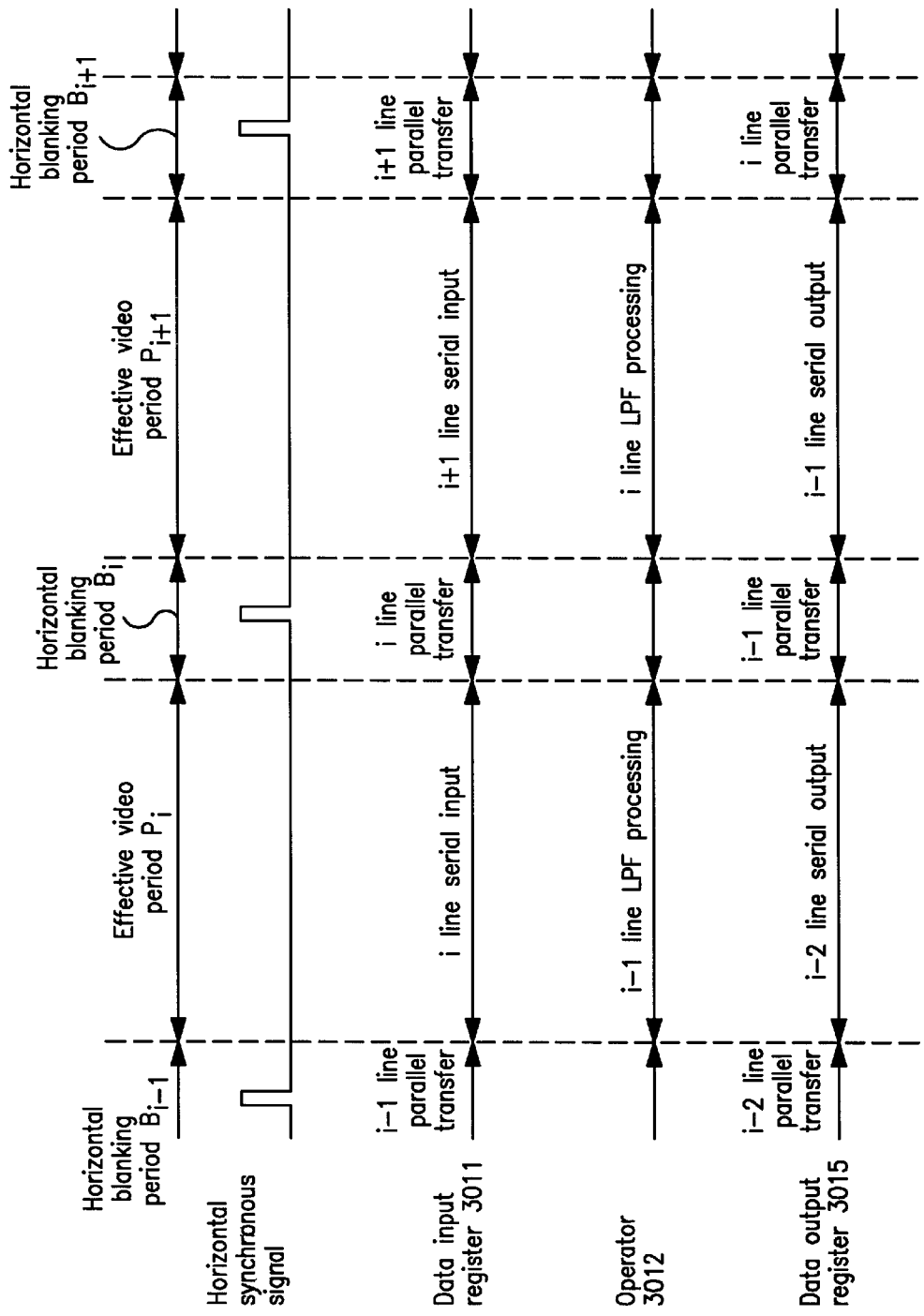
FIG. 28 is a timing chart showing the operations of a data input register, an operator, and a data output register in an LPF processing in Example 6.

FIG. 28 is a timing chart illustrating the operations of the data input register 3011, the operator 3012, and the data output register 3015 in the LPF processing.

The video signal processor 3001 operates in accordance with a horizontal synchronous signal, which defines a horizontal blanking period and an effective video period as shown in FIG. 28.

During an effective video period $P_i$, a plurality of video data sets corresponding to one horizontal scanning line are input into the data input register 3011 in series. For example, one horizontal scanning line may be the i-th horizontal scanning line. Hereinbelow, the i-th horizontal scanning line is referred to as the i line wherein i is an arbitrary integer.

During a horizontal blanking period $B_i$ following the effective video period $P_i$, the plurality of video data sets corresponding to the i line input into the data input register 3011 are transferred to the operator 3012 in parallel.

During an effective video period $P_{i+1}$ following the horizontal blanking period $B_i$, the LPF processing is performed for the plurality of video data sets corresponding to the i line.

During a horizontal blanking period $B_{i+1}$ following the effective video period $P_{i+1}$, a plurality of LPF-processed video data sets corresponding to the i line are transferred to the data output register 3015 in parallel.

During an effective video period $P_{i+2}$ following the horizontal blanking period $B_{i+1}$ (not shown in FIG. 28), the plurality of LPF-processed video data sets corresponding to the i line are output from the data output register 3015 in series.

The above-described processing are also performed for a plurality of video data sets corresponding to an (i−1) line and a plurality of video data units corresponding to an (i+1) line.

FIGS. 29A to 29E illustrate the operations of the serial-parallel converter 3016 and the data input register 3011.

The serial-parallel converter 3016 operates in accordance with the video clock of which waveform is shown in FIG. 29A.

The serial-parallel converter 3016 receives a plurality of video data units $D_j$ (j is an integer equal to or more than 0) corresponding to a plurality of effective pixels connected to one horizontal scanning line input in series as the input video signal S3001. The waveform of the input video signal S3001 is shown in FIG. 29B.

The serial-parallel converter 3016 couples a current video data unit $D_{2j+1}$ with a video data unit $D_{2j}$ which has been delayed by a flipflop (FF) by one cycle of the video clock, so as to generate a video data set ($D_{2j}$, $D_{2j+1}$). For example, when the bit width of the video data unit $D_{2j+1}$ is eight bits, the bit width of the video data set ($D_{2j}$, $D_{2j+1}$) is 16 (=8×2) bits. The current video data unit $D_{2j+1}$ and the video data $D_{2j}$ delayed by one cycle of the video clock are input into the data input register 3011 in parallel, and the plurality of video data sets ($D_{2j}$, $D_{2j+1}$) are input into the data input register 3011 in series as the video signal S3003. The waveform of the video signal S3003 is shown in FIG. 29C.

The data input register 3011 controls the writing of the video signal S3003 into the data input register 3011 in accordance with a write enable signal WE. In other words, the data input register 3011 permits the video signal S3003 to be written thereinto when the write enable signal WE is in a high level, and prohibits the video signal S3003 to be written thereinto when the write enable signal WE is in a low level. The waveform of the write enable signal WE is shown in FIG. 29D.

By using the write enable signal WE having the waveform shown in FIG. 29D, the video signal S3003 is written into the data input register 3011 for each cycle of the write enable signal WE. In this way, the video data $D_{2j}$ and the video data unit $D_{2j+1}$ included in the video data set ($D_{2j}$, $D_{2j+1}$) are input into the data input register 3011 in parallel.

Figure 30:
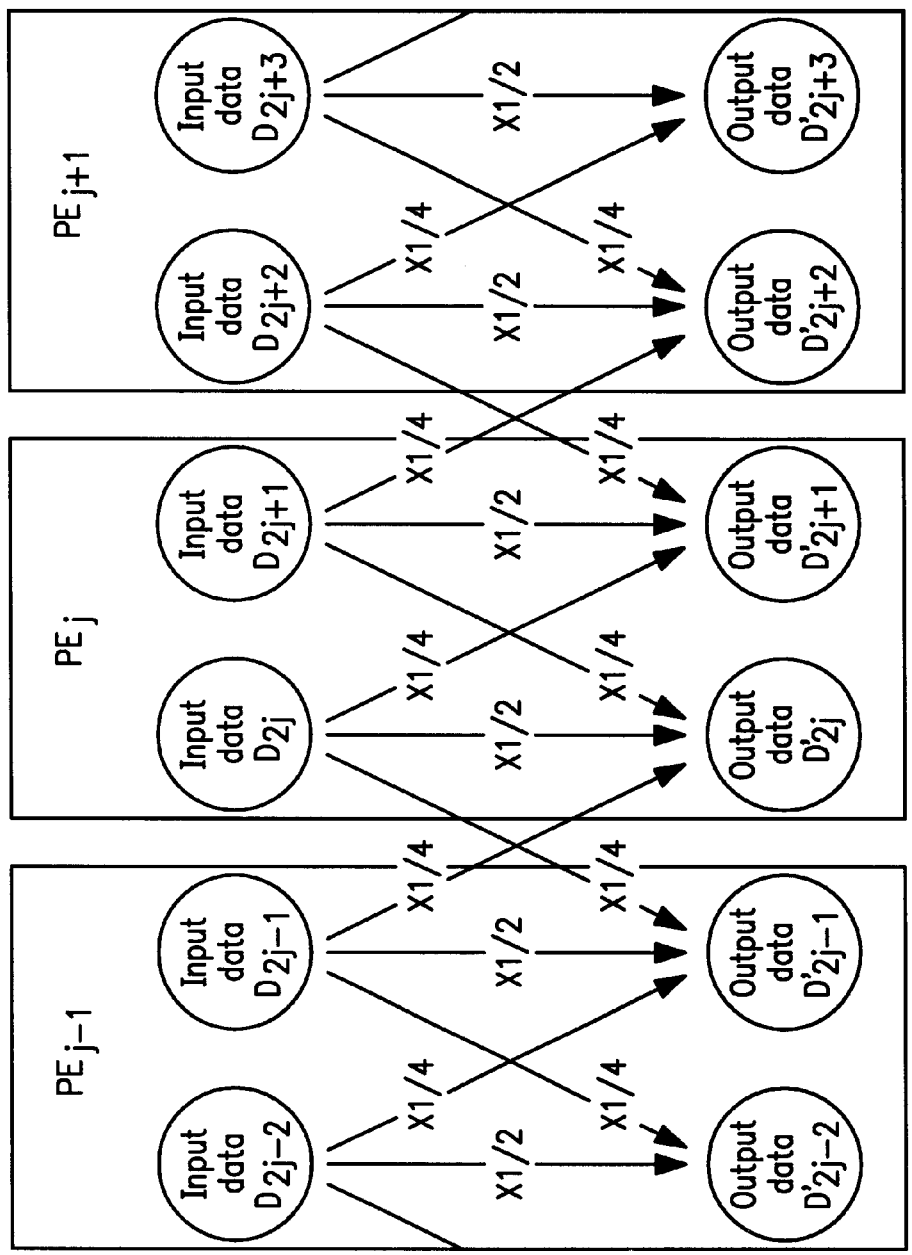
FIG. 30 is a view diagrammatically illustrating the LPF processing performed by the operator in Example 6.

FIG. 30 diagrammatically illustrates the LPF processing performed by the operator 3012. In the example shown in FIG. 30, the operator 3012 performs the LPF processing for the video data units $D_{2j-2}$, $D_{2j-1}$, $D_{2j}$, $D_{2j+1}$, $D_{2j+2}$, $D_{2j+3}$ corresponding to the i line, and outputs the LPF-processed video data units $D'_{2j-2}$, $D'_{2j-1}$, $D'_{2j}$, $D'_{2j+1}$, $D'_{2j+2}$, $D'_{2j+3}$ corresponding to the i line.

The LPF-processed video data $D'_{2j}$ is obtained by the calculation of expression (2) below, and the LPF-processed video data $D'_{2j+1}$ is obtained by the calculation of expression (3) below.

$$D'_{2j} = 1/4 \cdot D_{2j-1} + 1/2 \cdot D_{2j} + 1/4 \cdot D_{2j+1} \quad (2)$$

$$D'_{2j+1} = 1/4 \cdot D_{2j} + 1/2 \cdot D_{2j-1} + 1/4 \cdot D_{2j-2} \quad (3)$$

The calculations of expression (2) and (3) are performed by the processor element $PE_j$. Similar calculations to those of expressions (2) and (3) are performed by each of the processor elements $PE_{j-1}$ and $PE_{j+1}$. The number of LPF processing performed by each of the processor elements $PE_{j-1}$, $PE_j$, and $PE_{j+1}$ is two for one line. In this way, the LPF-processed video data units $D'_{2j-2}$, $D'_{2j-1}$, $D'_{2j}$, $D'_{2j+1}$, $D'_{2j+2}$, $D'_{2j+2}$ corresponding to the i line are obtained.

When the number of video data units included in the video data set is n, the number of LPF processing performed by each processor element is n.

FIGS. 31A to 31E illustrates the operations of the parallel-serial converter 3017 and the data output register 3015.

Figure 31:
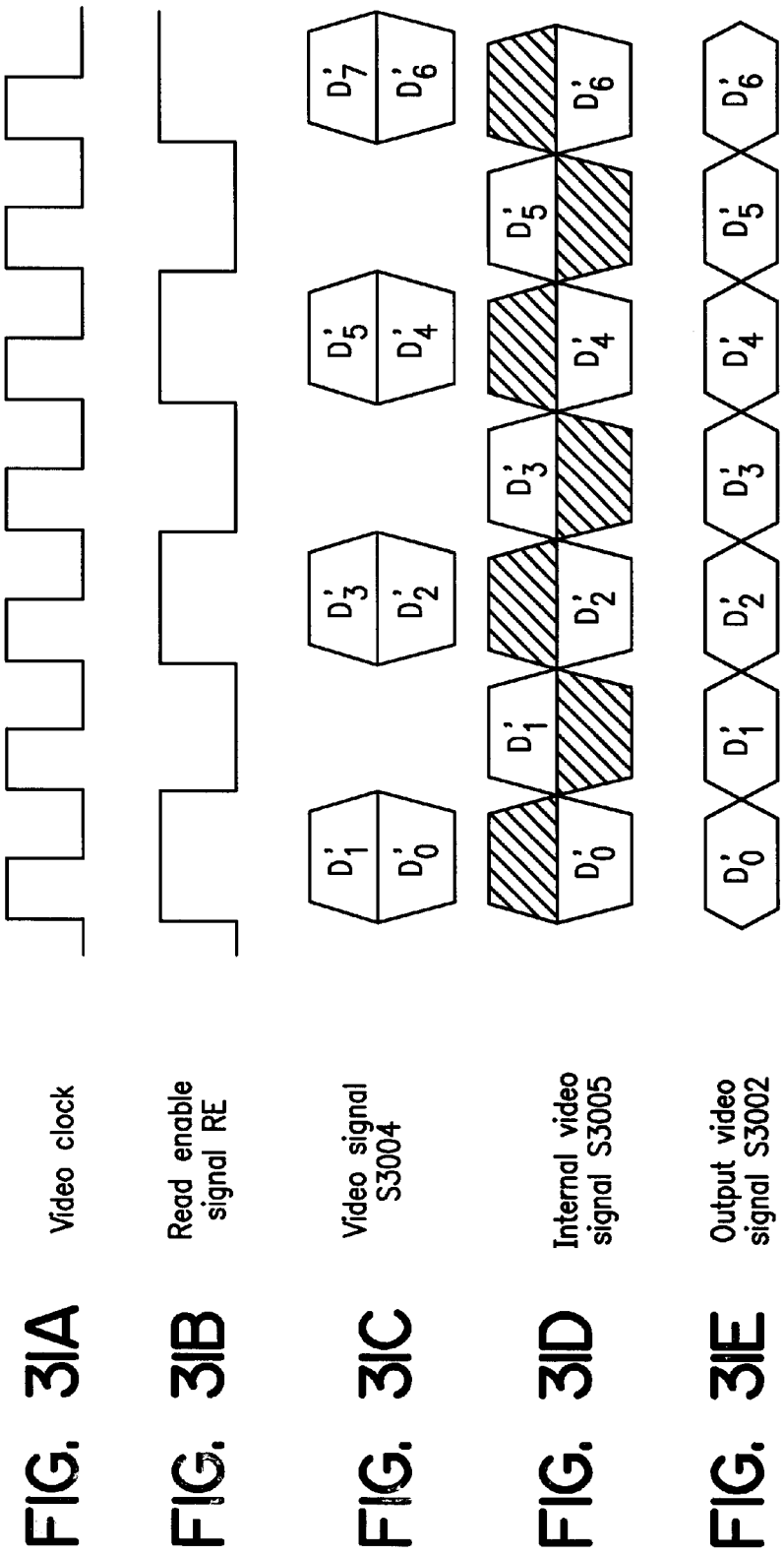
FIGS. 31A to 31E are timing charts showing the operations of a parallel-serial converter and the data output register in Example 6.
Figure 32:
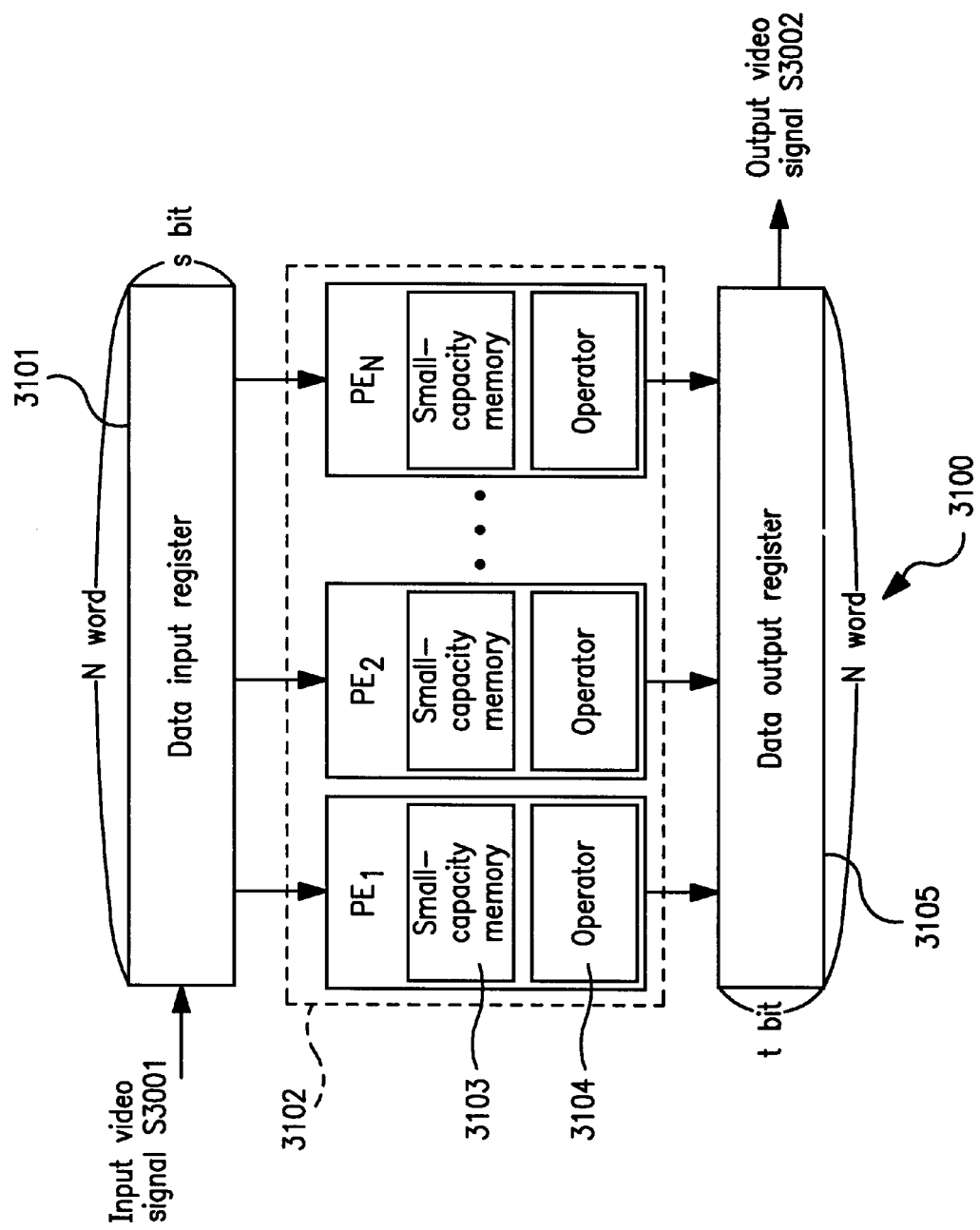
FIG. 32 is a block diagram illustrating a configuration of a conventional video signal processor.
Figure 33:
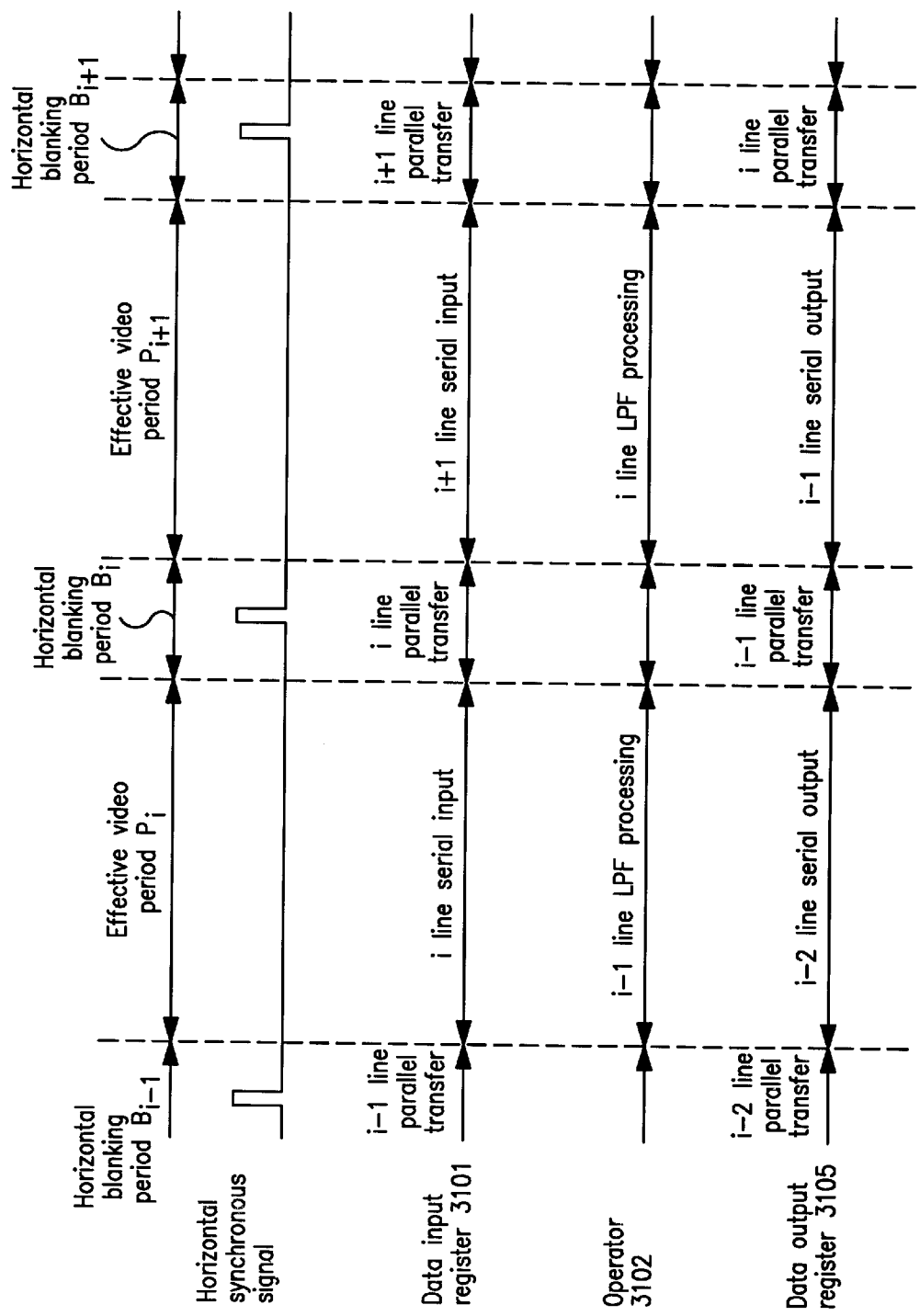
FIG. 33 is a timing chart showing the operations of a data input register, an operator, and a data output register of the conventional video signal processor in the LPF processing.
Figure 34:
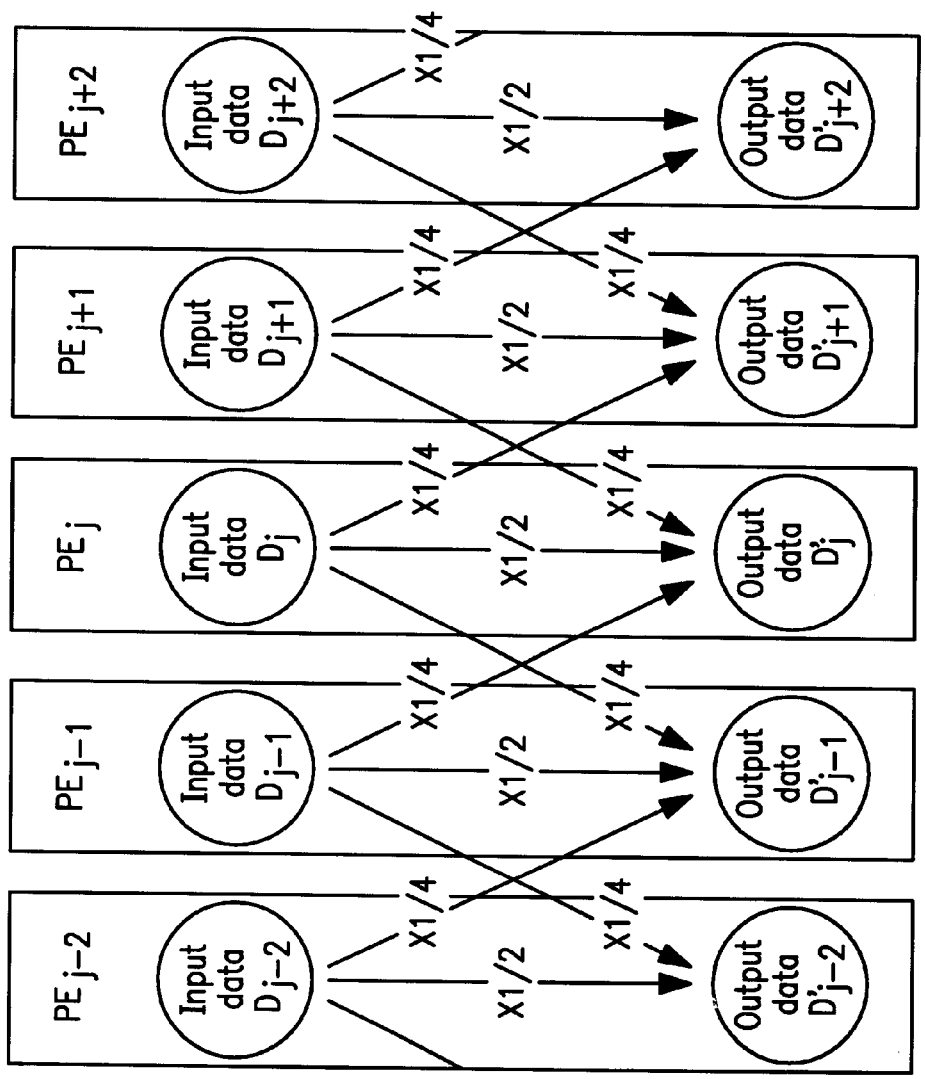
FIG. 34 is a view diagrammatically illustrating the LPF processing performed by the operator of the conventional video signal processor.

The parallel-serial converter 3017 operates in accordance with a video clock of which waveform is shown in FIG. 31A.

The data output register 3015 controls the reading of the LPF-processed video data set ($D'_{2j}$, $D'_{2j+1}$) stored in the data output register 3015 in accordance with a read enable signal RE. In other words, the data output register 3015 permits the LPF-processed video data set ($D'_{2j}$, $D'_{2j+1}$) to be read therefrom when the read enable signal RE is in a high level, and prohibits the LPF-processed video data set ($D'_{2j}$, $D'_{2j-1}$) to be read therefrom when the read enable signal RE is in a low level. The waveform of the read enable signal RE is shown in FIG. 31B.

The parallel-serial converter 3017 receives the plurality of LPF-processed video data sets ($D'_{2j}$, $D'_{2j+1}$) input in series as the video signal S3004. The waveform of the video signal S3004 is shown in FIG. 31C.

The parallel-serial converter 3017 delays the LPF-processed video data $D'_{2j+1}$ among the LPF-processed video data sets ($D'_{2j}$, $D'_{2j+1}$) input as the video signal S3004 by one cycle of the video clock, so as to generate an internal video signal S3005. The waveform of the internal video signal S3005 is shown in FIG. 31D. The LPF-processed video data $D'_{2j+1}$ can be delayed by the flipflop (FF), for example.

The parallel-serial converter 3017 outputs a plurality of LPF-processed video data units $D'_j$ (j is an integer equal to or more than 0) in series as the output video signal S3002 by alternately selecting the most significant bit portion and the least significant bit portion of the internal video signal S3005 for each cycle of the video clock. The waveform of the output video signal S3002 is shown in FIG. 31E. The selection of the internal video signal S3005 is realized by a selector, for example.

Thus, in this example, a plurality of video data units corresponding to a plurality of effective pixels connected to one horizontal line are converted into a plurality of video data sets by the serial-parallel converter 3016. At least two video data units included in each video data set are processed by each processor element $PE_j$, and the plurality of video data sets are converted into the plurality of video data units corresponding to the plurality of effective pixels connected to one horizontal scanning line by the parallel-serial converter 3017. In this way, the video data units corresponding to one horizontal scanning line can be processed using the number of processor elements $PE_j$ smaller than the number of effective pixels connected to one horizontal scanning line. For example, when each video data set includes n video data units, the number of processor elements $PE_j$ can be 1/n of the number of effective pixels connected to one horizontal scanning line.

The processing performed by the operator 3012 is not restricted to the LPF processing. The LPF processing is merely an example of the processing which can be performed by the operator 3012. The operator 3012 may perform an arbitrary processing other than the LPF processing, such as other filtering processing and image processing.

In this example, the degree of parallelism where a plurality of video data units are arranged in parallel for the serial-parallel converter 3016 and the parallel-serial converter 3017 is set at 2. The degree of parallelism is not restricted to 2, but can be an arbitrary integer equal to or more than 3 as well.

In the video signal processor according to the present invention, a plurality of video data units corresponding to a plurality of effective pixels connected to one scanning line are converted into a plurality of video data sets. Each of the plurality of video data sets includes at least two video data units. The plurality of video data sets are processed, and the plurality of processed video data sets are converted into the plurality of processed video data units. In this way, since the processing is performed for the video data set including at least two video data units as a unit, the processing efficiency is improved.

Each of the plurality of processor elements of the operator processes at least two video data units included in one video data set. Accordingly, the number of processor elements of the operator can be made smaller than the number of effective pixels connected to one scanning line. For example, when each video data set includes n video data units, the number of processor elements of the operator can be 1/n of the number of effective pixels connected to one scanning line. By reducing the number of processor elements required to process one scanning line, the cost of the entire video signal processor can be reduced.

It will be appreciated that the video signal processor of this example may also be used in conjunction with the television receivers discussed above with respect to FIGS. 24 and 25.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing device comprising:
   an input section for receiving image data to be processed;
   a digital signal processing section including (a) a data input portion for receiving in parallel for each scanning line at least one image data unit corresponding to at least one respective video signal; (b) a plurality of processing elements allocated to respective pixels corresponding to one scanning line in a one-to-one relationship for performing a same operation in accordance with a common instruction, and (c) a data output portion for outputting in parallel for each scanning line the at least one image data unit processed for each scanning line by the plurality of processing elements, the digital signal receiving, processing and outputting the image data for each scanning line,
   an image memory having a fixed memory region and capable of performing a write operation and a read operation in parallel and independently, the image memory receiving and outputting the image data for each scanning line;
   an output section for outputting processed image data;
   data but means for connecting the input section, the digital signal processing section, the image memory, and the output section with one another; and
   control means for controlling the input section, the digital signal processing section, the image memory, and the output section in accordance with program data,
   wherein a data input operation for each scanning line by the data input portion, a processing operation for each scanning line by the plurality of processing elements, and a data output operation for each scanning line by the data output section are performed in a pipeline manner.

2. An image processing device comprising:
   an input section for receiving image data to be processed;
   a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;
   an image memory having a fixed memory region and capable of performing a write operation and a read operation in parallel and independently, the image memory receiving and outputting the image data for each scanning line and including data write means for sequentially writing the input image data into the memory region in sequential addresses; data read means for reading the image data to be output from the memory region in sequential addresses; and pointer control means for controlling a write pointer and a read pointer for indicating a write address and a read address in the memory region, respectively, in accordance with program data;
   an output section for outputting processed image data;
   data bus means for connecting the input section, the digital signal processing section, the image memory, and the output section with one another; and
   control means for controlling the input section, the digital signal processing section, the image memory, and the output section in accordance with program data.

3. An image processing device according to claim 2, wherein the image memory further includes: a plurality of input buffers each having at least first and second input buffer portions with a respective predetermined memory capacity; and
   means for controlling the plurality of input buffers such that when the first input buffer portion of the input buffer is filled with image data, writing of input image data into the second input buffer portion is started, and image data is read from the first input buffer portion to be written into the memory region, and
   when the second input buffer portion is filled with image data, writing of input image data into the first input buffer portion is started, and image data is read from the second input buffer portion to be written into the memory region.

4. An image processing device according to claim 3, wherein a data rate at which image data is written into the memory region from the input buffer is selected to be different from a data rate at which image data is written into the input buffer.

5. An image processing device according to claim 2, wherein the image memory further includes: a plurality of output buffers each having at least first and second output buffer portions with a respective predetermined memory capacity; and means for controlling the plurality of output buffers such that when the first output buffer portion of the output buffer has no image data, reading of image data from the second output buffer portion is started, and image data read from the memory region is written into the first output buffer portion, and when the second output buffer portion has no image data, reading of image data from the first output buffer portion is started, and image data read from the memory region is written into the second output buffer portion.

6. An image processing device according to claim 5, wherein a data rate at which image data is written into the output buffer from the memory region is selected to be different from a data rate at which image data is read from the output buffer.

7. An image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another and including a first data bus portion for electrically connecting a data output terminal of the input section with a data input terminal of the digital signal processing section; a second data bus portion for electrically connecting a data output terminal of the input section with a data input terminal of the image memory; a third data bus portion for electrically connecting a data output terminal of the digital signal processing section with a data input terminal of the image memory; a fourth data bus portion for electrically connecting a data output terminal of the image memory with a data input terminal of the digital signal processing section; a fifth data bus portion for electrically connecting a data output terminal of the input section with a data input terminal of the output section; a sixth data bus portion for electrically connecting a data output terminal of the digital signal processing section with a data input terminal of the output section; and a seventh data bus portion for electrically connecting a data output terminal of the image memory with a data input terminal of the output section; and control means for controlling the input section, the digital signal processing section, the image memory, and the output section in accordance with program data.

8. An image processing device according to claim 7, wherein all of the first to seventh data bus portions are formed on a semiconductor chip.

9. An image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data and including program data holding means for holding program data defining operation modes for the input section, the digital signal processing section, the image memory, the output section, and the data bus means; and program data distribution means for receiving program data and distributing the program data into the program data holding means.

10. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving image data corresponding to one video signal by the input section;

performing a first processing for the image data output from the input section to the digital signal processing section by the digital signal processing section;

writing the image data output from the digital signal processing section after the first processing into the image memory to temporarily store the image data in the image memory; and receiving the image data read from the image memory by the digital signal processing section again to perform a second processing.

11. An image processing method according to claim 10, further comprising the steps of:

writing the image data output from the digital signal processing section after the second processing into the image memory to temporarily store the image data in the image memory; and receiving the image data read from the image memory by the digital signal processing section again to perform a third processing.

12. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving image data corresponding to one video signal by the input section;

writing the image data output from the input section into the image memory to temporarily store the image data in the image memory;

supplying the image data from the input section and the image data read from the image memory to the digital signal processing section in parallel, and performing a predetermined processing between these image data.

13. An image processing method according to claim 11, wherein the image data is read from two output ports of the image memory by delaying the image data by a predetermined delay amount and input in parallel into the digital signal processing section, and the predetermined processing is performed between the two units of image data from the image memory and the image data from the input section.

14. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

writing only a portion of the image data corresponding to a portion of pixels for each scanning line and/or a portion of scanning lines for each field among the image data corresponding to one video signal into the image memory to temporarily store the portion of the image data in the image memory; and reading from the image memory the image data in order in which the pixels and scanning lines have been written to the image memory.

15. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

writing image data corresponding to one video signal into the image memory to temporarily store the image data in the image memory;

reading the image data from the image memory intermittently for each pixel or for each scanning line; and supplying the image data read from the image memory to the digital signal processing section, and interpolating image data at positions of pixels or scanning lines which had been skipped in the intermittent reading of the image memory.

16. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving first and second image data units corresponding to two image signals which are asynchronous from each other by the input section;

writing the first image data unit output from the input section into the image memory to temporarily store the first image data in the image memory;

supplying the second image data unit output from the input section to the digital signal processing section, and simultaneously reading the first image data unit from the image memory to supply to the digital signal processing section in synchronization with the supply of the second image data unit; and performing a predetermined processing for the first and second image data units input in synchronization with each other by the digital signal processing section.

17. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving first and second image data units corresponding to two image signals which are asynchronous from each other by the input section;

supplying the first image data unit output from the input section to the digital signal processing section to perform a predetermined processing;

supplying the first image data unit output from the digital signal processing section to the image memory, and simultaneously supplying the second image data unit output from the input section to the image memory; and reading the first and second image data units from the image memory in synchronization with a synchronous signal other than synchronous signals relating to the first and second image data units.

18. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving image data corresponding to one video signal by the input section;

supplying a former half of the image data output from the input section to the digital signal processing section during a first period;

writing the image data output from the input section into the image memory and reading the written image data after a predetermined delay time; and supplying a latter half of the image data output from the image memory to the digital signal processing section during a second period.

19. An image processing method according to claim 18, further comprising the steps of:

writing the former half of the image data output from the digital signal processing section into the image memory and reading the written image data after a predetermined delay time;

outputting the former half of the image data read from the image memory from the output section;

outputting the latter half of the image data from the digital signal processing section; and outputting the latter half of the image data output from the digital signal processing section from the output section in succession with the former half of the image data.

20. An image processing method according to claim 19, further comprising the steps of:

adding a first overlap portion which overlaps a head portion of the latter half of the image data by a predetermined number of pixels to a tail portion of the former half of the image data input into the digital signal processing section during the first period;

adding a second overlap portion which overlaps a tail portion of the former half of the image data by a predetermined number of pixels to a head portion of the latter half of the image data input into the digital signal processing section during the second period; and removing the first and second overlap portions at a stage of outputting the image data outside from the output section.

21. An image processing method for processing image data by an image processing device comprising:

an input section for receiving image data to be processed;

a digital signal processing section including a plurality of processing elements allocated to respective pixels corresponding to one scanning line in a one-to-one relationship for performing a same operation in accordance with a common instruction, the digital signal receiving, processing and outputting the image data for each scanning line;

an image memory having a fixed memory region and capable of performing a write operation and a read operation in parallel and independently, the image memory receiving and outputting the image data for each scanning line;

an output section for outputting processed image data;

data bus means for connecting the input section, the digital signal processing section, the image memory, and the output section with one another; and control means for controlling the input section, the digital signal processing section, the image memory, and the output section in accordance with program data, the method comprising the steps of:

receiving image data corresponding to one video signal by the input section and performing a low-pass filtering processing by the input section; and supplying the image data output from the input section to the digital signal processing section or the image memory, and performing a decimation processing for information compression of the image data.

22. A video signal processing device comprising:

a first converter for receiving a plurality of video data units corresponding to a plurality of pixels connected to one scanning line as an input video signal, and converting the plurality of video data units into a plurality of video data sets, each of the plurality of video data sets including at least two video data units;

an operator for processing the plurality of video data sets and outputting a plurality of processed video data sets; and a second converter for converting the plurality of processed video data sets into a plurality of processed video data units corresponding to a plurality of pixels connected to one scanning line, and outputting the plurality of processed video data units as an output video signal.

23. A video signal processing device according to claim 22, wherein the operator includes a plurality of processor elements, and each of the plurality of processor elements processes at least two image data units included in each of the plurality of video data sets.

* * * * *

UNITED STATES PATENT AND TRADEMARK OFFICE
CERTIFICATE OF CORRECTION

PATENT NO.    : 6,353,460 B1
DATED         : March 5, 2002
INVENTOR(S)   : Sokawa et al.

It is certified that error appears in the above-identified patent and that said Letters Patent is hereby corrected as shown below:

<u>Title page,</u>
Item [57], ABSTRACT,
Line 3, "former" should read -- format --.

<u>Column 34,</u>
Line 11, "but" should read -- bus --.

Signed and Sealed this

First Day of October, 2002

*Attest:*

*Attesting Officer*

JAMES E. ROGAN
*Director of the United States Patent and Trademark Office*